US011081934B2

(12) United States Patent
Paritee et al.

(10) Patent No.: US 11,081,934 B2
(45) Date of Patent: Aug. 3, 2021

(54) FIN-COOLED AXIAL FLUX ROTATING ELECTRICAL MACHINE, AND APPLICATIONS THEREOF

(71) Applicant: Maxxwell Motors, Inc., Franklin, TN (US)

(72) Inventors: Michael Paritee, Princeton Junction, NJ (US); Maksym Pryimak, Kiev (UA)

(73) Assignee: Maxwell Motors, Inc., Franklin, TN (US)

( * ) Notice: Subject to any disclaimer, the term of this patent is extended or adjusted under 35 U.S.C. 154(b) by 0 days.

(21) Appl. No.: 17/034,538

(22) Filed: Sep. 28, 2020

(65) Prior Publication Data

US 2021/0135544 A1    May 6, 2021

Related U.S. Application Data

(60) Provisional application No. 62/928,282, filed on Oct. 30, 2019, provisional application No. 63/011,034, (Continued)

(51) Int. Cl.
*H02K 1/16*    (2006.01)
*H02K 1/18*    (2006.01)
(Continued)

(52) U.S. Cl.
CPC .............. *H02K 9/06* (2013.01); *H02K 1/16* (2013.01); *H02K 1/182* (2013.01); *H02K 3/12* (2013.01);
(Continued)

(58) Field of Classification Search
CPC ........ H02K 9/06; H02K 17/16; H02K 17/165; H02K 17/18; H02K 17/185; H02K 16/04;
(Continued)

(56) References Cited

U.S. PATENT DOCUMENTS 2,503,704 A * 4/1950 Bessiere .............. H02K 49/046
310/93
3,223,867 A * 12/1965 Shapiro .................. H02K 17/12
310/166
(Continued)

FOREIGN PATENT DOCUMENTS

GB    1421770 A  *  1/1976  ............. H02K 17/16
GB    2228626 A  *  8/1990  ............. H02K 17/16
(Continued)

OTHER PUBLICATIONS

Kurosaki, Machine Translation of JP58116043, Jul. 1983 (Year: 1983).*

(Continued)

*Primary Examiner* — Quyen P Leung
*Assistant Examiner* — Eric Johnson
(74) *Attorney, Agent, or Firm* — Sterne, Kessler, Goldstein & Fox P.L.L.C.

(57) ABSTRACT

Embodiments involve rotors for axial flux induction rotating electric machines that use a soft magnetic composite for the rotor core. A first embodiment is directed to a rotor for a rotating electrical machine that transmits magnetic flux parallel to a shaft of the rotor. The rotor includes a rotor winding and a plurality of cores. The rotor winding consists of a solid piece of conductive material that comprises a plurality of cavities. Each core is placed in a respective cavity and comprises a highly resistive isotropic ferromagnetic powder.

16 Claims, 37 Drawing Sheets

Related U.S. Application Data filed on Apr. 16, 2020, provisional application No. 63/046,868, filed on Jul. 1, 2020.

(51) Int. Cl.
| | | |
|---|---|---|
| *H02K 3/12* | (2006.01) | |
| *H02K 16/04* | (2006.01) | |
| *H02K 17/16* | (2006.01) | |
| *H02K 9/06* | (2006.01) | |
| *H02K 7/08* | (2006.01) | |

(52) U.S. Cl.
CPC ............. *H02K 7/083* (2013.01); *H02K 16/04* (2013.01); *H02K 17/165* (2013.01)

(58) Field of Classification Search
CPC ........ H02K 1/16; H02K 1/182; H02K 1/2793; H02K 3/12; H02K 9/04; H02K 16/00
USPC ......................................................... 310/211
See application file for complete search history.

(56) References Cited

U.S. PATENT DOCUMENTS

| | | | | |
|---|---|---|---|---|
| 3,296,475 | A | | 1/1967 | Parker |
| 4,320,645 | A | * | 3/1982 | Stanley ................ B21D 28/22 174/DIG. 20 |
| 8,390,157 | B2 | * | 3/2013 | Watanabe .............. H02K 3/522 310/64 |
| 2004/0051401 | A1 | * | 3/2004 | Hansen ................. H02K 41/02 310/268 |
| 2007/0063594 | A1 | * | 3/2007 | Huynh .................... H02K 9/06 310/59 |
| 2008/0001488 | A1 | | 1/2008 | Pyrhonen et al. |
| 2011/0142694 | A1 | * | 6/2011 | Fagotti ................. F04B 39/121 417/410.1 |
| 2016/0072362 | A1 | * | 3/2016 | Kube .................... H02K 1/141 310/67 R |
| 2016/0352201 | A1 | * | 12/2016 | Ranjan ................ H02K 17/165 |

FOREIGN PATENT DOCUMENTS

| | | | | |
|---|---|---|---|---|
| JP | 58116043 A | * | 7/1983 | ............. H02K 17/16 |
| WO | WO-9604094 A2 | * | 2/1996 | ............. H02K 17/16 |

OTHER PUBLICATIONS

Jacek F. Gieras, et al., Axial Flux Permanent Magnet Brushless Machines (2nd ed. 2008).

\* cited by examiner

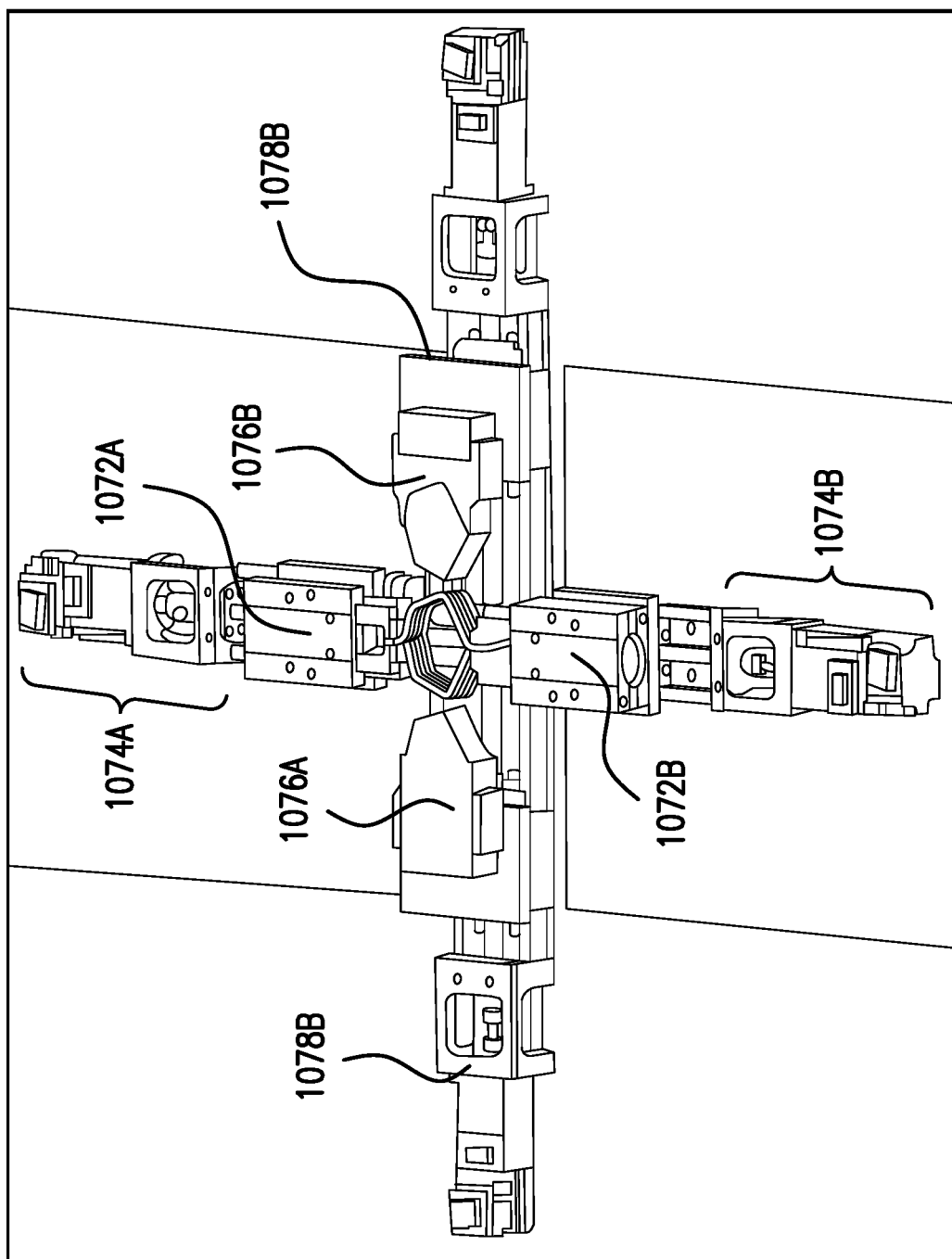

1095

FIN-COOLED AXIAL FLUX ROTATING ELECTRICAL MACHINE, AND APPLICATIONS THEREOF

CROSS-REFERENCE TO RELATED APPLICATIONS

This application claims priority to U.S. Provisional Patent Application No. 62/928,282, filed Oct. 30, 2019, U.S. Provisional Patent Application No. 63/011,034, filed Apr. 16, 2020, and U.S. Provisional Patent Application No. 63/046,868, filed Jul. 1, 2020, each of which is incorporated by reference in its entirety.

FIELD OF THE INVENTION

This application generally relates to rotating electrical machines, such as motors and generators.

BACKGROUND

Rotating electrical machines, such as motors and generators, are known to exist in various different types and geometries. For example, some rotating electric machines rely on permanent magnets for magnetic pole pieces. These permanent magnets, for performance reasons, typically include rare earth elements such as neodymium, samarium, cerium, terbium, praseodymium, gadolinium, and dysprosium. Permanent magnet synchronous machines are often desirable because they exhibit a high starting torque, high efficiency, and high power density.

However, the rare earth metals that high performance permanent rotating electrical machines rely on are produced primarily by mines in only a few regions of the world. The rare earth elements used for the magnets add considerable cost to the machine, and the process of mining them is nearly always very damaging to the environment. They introduce vulnerabilities in the supply chain. Finally, when heat is applied there is a risk they could lose their magnetic properties.

An alternative to a permanent magnet rotating electrical machine is an induction rotating electrical machine. Induction machines do not rely on permanent magnets. Instead, induction machines use induced magnetic fields brought about by changing currents to operate. The cores of an induction machine may simply be iron, or other material that is magnetically permeable. While induction machines avoid the need for rare earths, widely available induction machines are thought to be unsuitable for many applications because of their lower power density and lower starting torque.

In general, rotating electrical machines exist in two geometries: radial and axial. Radial flux motors transmit magnetic flux perpendicular to the motor's shaft. With these radial flux motors, the rotor—the component of the motor that rotates—and the stator—the component of the motor that remains stationary—both tend to be cylindrical in shape and concentric with one another. For example, the stator may enclose the rotor and transmit magnetic flux inward toward the rotor. The magnetic flux applies torque to the rotor, making it turn. An example is a conventional squirrel cage motor.

In contrast, axial flux motors transmit magnetic flux parallel to the motor shaft. Instead of being concentric cylinders, in an axial flux motor the rotor and stator may be discs mounted parallel to one another and perpendicular to the motor shaft. The stator applies magnetic flux through the rotor, creating torque. An example of such an axial flux motor was disclosed by Pyrhonen et al. in U.S. Pat. Pub. No. 2008/0001488, entitled "Axial Flux Induction Electric Machine."

In general, axial flux motors tend to be more compact than radial flux motors having the same power. In other words, an axial flux geometry tends to produce a higher power density. All other things, including axial length, being equal, increasing a radius of a radial flux motor may increase power output by the difference in radius squared. In contrast, all other things being equal, increasing a radius of an axial flux motor may increase power output by the difference in radius cubed. The result is that greater power output can be achieved by using less materials than would be required for a radial machine of equivalent power.

In electric cars, permanent magnet machines have conventionally been used due to their high power density, superior starting torque, and compact size. Permanent magnet motors in general are thought to provide greater starting torque than induction motors because the permanent magnets are already excited. However, the torque from a permanent magnet motor at a given excitation voltage is inversely proportional to rotor rotational speed owing to back EMF (electromagnetic flux) induced in the stator coils (e.g., as a consequence of Faraday's Law). More specifically, while the efficiency of a permanent magnet (PM) motor initially increases with rotational velocity (from zero), once it is close to rated speed, the efficiency drops precipitously owing to the lack of torque (from back EMF) and the increased iron losses (hysteresis and eddy losses). Thus, at high speeds, the efficiency of permanent magnet machines can fall off dramatically, which can result in wasted electricity and limited torque. It is the (nearly) linear loss of torque with velocity, however, that is the major design limitation for PM motors in traction motor applications such as electric cars. Indeed, it is for this reason that some electric vehicles use a pair of motors: a PM motor for low driving speeds, and an induction motor for high driving speeds.

Conventionally, induction machines are thought to have poor starting torque. While induction machines are typically preferable to PM motors at higher RPMs, conventionally, an induction machine that gives greater than about 40% of full load torque when in a locked rotor state is difficult to design. This is in part because induction machines tend to perform poorly at high slip.

Eddy currents can be present in any type of rotating electrical machine, but are conventionally thought to be particularly problematic in axial machines. Eddy currents are electrical currents that circulate around inside conductive materials in a manner similar to swirling eddies in a river. They generate unwanted losses (and thus heat) in the systems, particularly in high frequency applications. For example, some eddy currents may be currents that are induced in the metal core material itself by the changing magnetic field as alternating current produces a changing flux. In addition, eddy currents may be caused in large conductors by interactions with other conductors and current loops in the rotating machine.

To reduce eddy currents, lamination stacks are used in the rotor and stator assemblies. Lamination stacks include a plurality of thin steel layers and insulation between them that increases resistivity of the magnetic material in a direction that is perpendicular to the insulation while maintaining magnetic properties of the laminated material in other directions. The laminated material may be for example iron or a permanent magnet material. Such lamination stacks can be used either in the rotor disk, such as in the rotor cores, or as the stator core. However, the lamination stack reduces the density of material, deteriorating the magnetic properties desired. They also can create a point of failure that reduces the machine's durability and reliability due to stress and fatigue.

For example, motors in electric scooters and bicycles may experience momentary high acceleration forces when these vehicles hit a street obstacle, such as a pothole. These high acceleration ("gee") forces can cause the weld that holds laminations together to experience fatigue or even brittle failure if the acceleration and jerk are sufficiently large. Should the lamination weld(s) fail, the motor itself would cease to function. This can create a severe safety hazard.

Recently, soft magnetic composite (SMC) materials have become available. These soft magnetic composites are mixtures of ferromagnetic powder particles coated with an electrically insulating layer (typically a steam-formed oxide) and nonmetallic binders (such as phosphorus). These composites can be formed into complex geometric shapes. The result is an electrically resistive, ferromagnetic material with isotropic properties. The isotropic properties allow it to carry magnetic flux in all directions inside a material, unlike a laminated stack. And, SMC's high resistivity enables the designer of a magnetic system to more precisely direct the flow of current within a magnetic system when compared to using a lower resistivity solution such as lamination stacks. An example of such a composite material is the SOMALOY composite powder available from Höganäs AB of Höganäs, Sweden.

However, these soft magnetic powders cannot be machined adequately. That is, they are difficult to machine with conventional methods, and cannot be machined at all by electric discharge methods (wire and die-sink EDM). They universally have very low tensile strength, impact strength, and bending modulus. When subjected to large amounts of compressive force, they have a tendency to convert from a consolidated form back into powder, or to chip or fragment. Thus, while these magnetic materials have been used in stators for electric motors, their utility has been limited.

Often, stators have teeth with wires, called windings, wrapped around them. The windings may be insulated from one another, allowing current to flow only along the wires. Such insulation reduces the density of the conductive materials, and ultimately can limit the power density of the rotating electric machine. Conventionally, stator teeth have, at their top, a tip that closes in toward adjacent teeth, making the teeth wider at the top and narrower at the bottom and making the stator slots partially closed. This is thought to provide special magnetic reluctance to the air gap. The tip is thought to allow the magnetic flux to be transmitted in a cleaner sine wave. Any harmonics away from that sine wave can cause additional losses in the rotor.

Consistent with partially closed slots, windings for axial induction machines are typically wound by hand. Doing so introduces a number of problems. First, it is a labor-intensive process that accounts for a significant portion of machine costs. Second, it introduces an opportunity for error. Third, the number and type of windings that can be fixed into or made within the interior annulus between the stator's teeth is limited by the operator's skill and the geometry of the wire, the wire's insulation, and the interior of the stator. Kinks can occur during the winding, increasing unwanted electrical resistance and dramatically increasing the risk of mechanical and thermomechanical fatigue failure in the winding. This is especially true for axial stators, because the endturns needed for the coils have a smaller bending radius. The fill factor of the stator's slots is also reduced, thus restricting the amount of H field (total magnetization) that can be generated in the slot. This limits the power density of the resulting machine.

Conventionally, air-cooled motors are thought to, in general, have lower performance than liquid-cooled motors, because air-cooled motors more easily overheat and fail. For that reason, most rotating electrical machines used to drive electric vehicles are liquid-cooled. Liquid-cooled motors have disadvantages in that they are more complicated and, in general, more expensive and less durable than air-cooled motors.

Rotating electrical machines that produce better efficiency, power density, cost-effectiveness, and durability relative to existing machines are needed.

SUMMARY

Embodiments involve rotors for axial flux induction rotating electric machines that use a soft magnetic composite (SMC) for the rotor core. A first embodiment is directed to a rotor for a rotating electrical machine that transmits magnetic flux parallel to a shaft of the rotor. The rotor includes a rotor winding and a plurality of cores arrayed within the rotor. The rotor winding consists of a solid piece of conductive material that comprises a plurality of cavities. Each core is placed in a respective cavity and comprises a highly resistive isotropic ferromagnetic SMC powder.

In a second embodiment, a rotor for an axial flux induction rotating electrical machine includes a rotor winding, a plurality of cores, and a plurality of supports. The rotor winding includes a plurality of cavities and has a first coefficient of expansion. Each core in the plurality of cores is inserted within a respective cavity from the plurality of cavities. Each core includes ferromagnetic powder and respective grains of the ferromagnetic powder are insulated from one another. Finally, each support from the plurality of supports attaches to a respective core from the plurality of cores to a respective cavity from the plurality of cavities such that the support remains attached to the respective core and the respective cavity at a given operating temperature range of the rotor given the different first and second coefficients of expansion.

In a third embodiment, a rotor for an axial flux rotating electrical machine includes a plurality of cores, a rotor winding, and a band. The rotor winding consists of a solid disc of conductive material that comprises a plurality of cavities. Each of the plurality of cores is located in a respective cavity of the plurality of cavities. The band engages an outer edge of the rotor winding and applies compression to the rotor winding.

In a fourth embodiment, a coil for a rotating electrical machine that transmits magnetic flux parallel to a shaft of the machine is manufactured in at least two steps. First, a wire is repeatedly bent at substantially 180 degree angles to stack the bent wire in an axial direction along the shaft of the rotating electrical machine. The wire is bent such that a number of bends in the wire corresponds to a number of turns of a winding for a stator of the rotating electrical machine. Second, the wire is pressed in a direction of rotation of the rotating electrical machine. The wire is pressed with a die having interlaced teeth with a shape to form the wire into the coil to fit over at least one tooth of a stator of the rotating electrical machine.

In a fifth embodiment, a stator for an axial flux rotating electrical machine includes a winding and a stator core. The winding is configured to produce a magnetic field and includes a plurality of coils lapped one atop another. The stator core includes a base portion and a plurality of teeth. The base portion shorts magnetic flux. And each tooth transmits the magnetic flux and separated by a slot and open such that during manufacture the winding is able to be slipped on the plurality of teeth.

In a sixth embodiment, an axial flux rotating electrical machine includes an endbell, a stator core and a bracket. The stator core is made of a soft magnetic composite (SMC) and includes a plurality of teeth, a base portion, and a lip. Each tooth transmits flux from a magnetic circuit that is separated from one another by a slot. The base portion connects the plurality of teeth and shorts the magnetic circuit. The lip extends from the base portion. Finally, the bracket attaches to the endbell and engages with the lip to hold stationary the single-piece stator in the endbell.

Method, device, and product-by-process claims are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 10A-K are diagrams illustrating an example operation for the method for manufacturing the coil.

The drawing in which an element first appears is typically indicated by the leftmost digit or digits in the corresponding reference number. In the drawings, like reference numbers may indicate identical or functionally similar elements.

DETAILED DESCRIPTION

Figure 1:
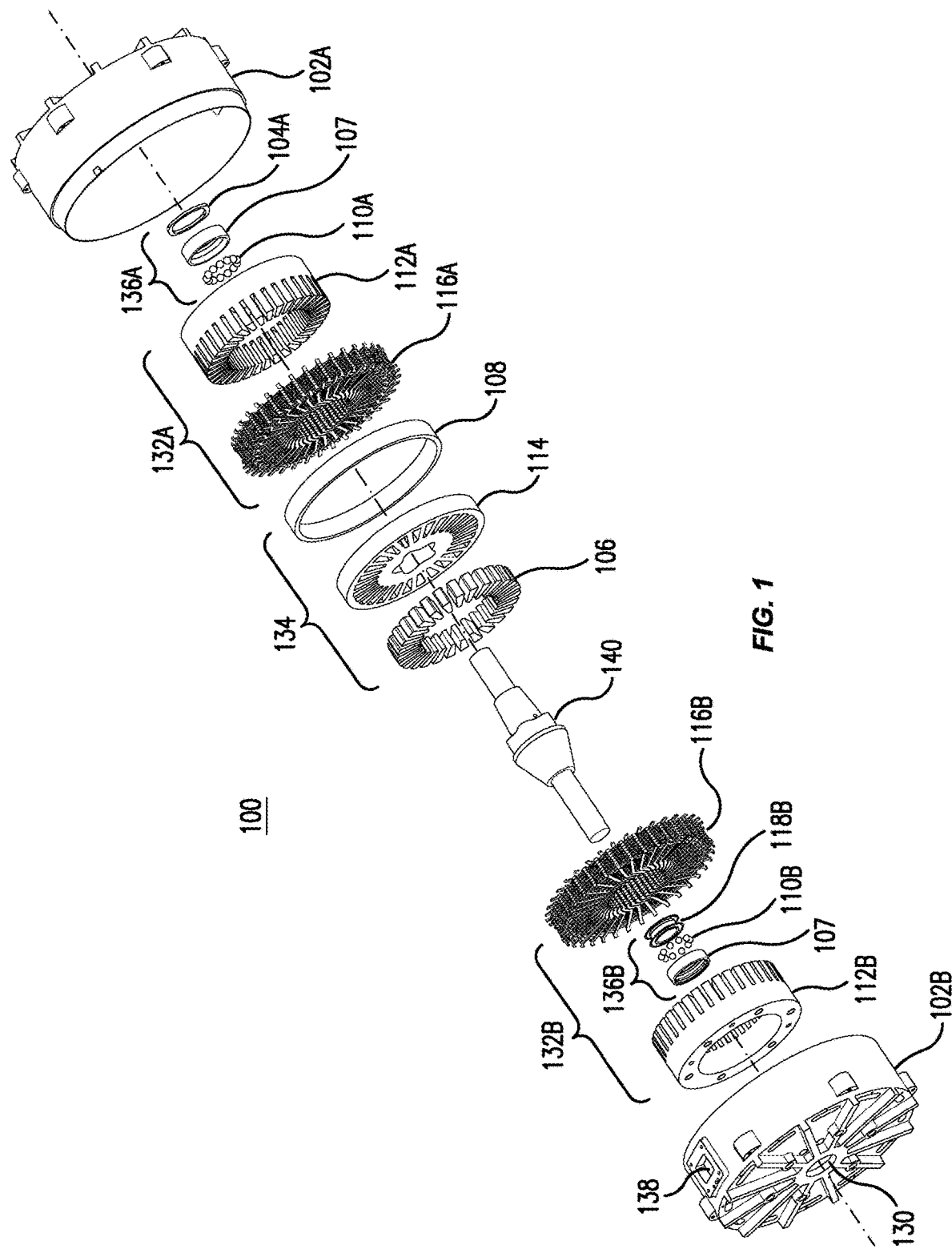
FIG. 1 shows an assembly for an axial flux machine according to some embodiments.

Disclosed herein is an axial flux induction rotating electrical machine that solves some of the shortcomings discussed above. For example, a rotor uses an insulated ferromagnetic powder for its cores. This allows for an axial induction machine that controls eddy currents while being cheaper, easier and faster to make, and possibly more durable than a comparable machine that uses lamination stacks. Also, being an axial machine, the machine provides good power density and efficiency, and, by avoiding permanent magnets, the machine provides improved cost-effectiveness and lessens the environmental impact of its production.

According to some embodiments, the rotor winding is a solid disc of conductive metal with cavities for the respective high permeability cores. In many applications, it is advantageous for the rotor to spin at a high velocity and therefore it must be able to withstand high centrifugal acceleration forces. The core within the rotor must be fit very tightly in the surrounding rotor winding to prevent motion that can lead to fatigue failure. As mentioned above, these ferromagnetic powders may be extremely brittle and difficult to machine because machining also alters the electrical integrity of the insulated powder. Thus, it may be difficult or impossible to machine or press a core made of these ferromagnetic powders to the adequate tolerances needed to maintain a tight enough fit so that the core remains secure in the rotor winding. This is particularly true given the fact that the core and the windings have different coefficients of expansion and thus expand or contract differently when exposed to temperature variations. For these reasons, an interference fit between a core and a rotor winding may be impossible.

To deal with this issue, embodiments disclosed herein surround at least a portion of the core with one or more supports made of a material that is rigid enough to hold the cores and at the same time accommodate the different coefficients of expansion for the cores and winding. Thus, the material must be flexible enough to adapt to the different manufacturing tolerances of the cores and winding. The material may be applied to attach the rotor winding with a core's inner portion, that is, a portion that is closer to a shaft, and the core's outer portion, that is, a portion that is closer to a perimeter of the rotor. On side portions, an air-gap may be allowed. In one example, the shims may be made of a vulcanized elastomer. This and other examples are described in greater detail below.

As mentioned above, the rotor needs to withstand significant centrifugal forces. A prior approach in an axial machine was disclosed by Pyrhonen et al. in U.S. Pat. Pub. No. 2008/0001488. To withstand these large centrifugal acceleration forces, Pyrhonen taught to mount the rotor winding onto a carbon fiber frame. This approach has significant downsides in terms of cost and difficulty of manufacture.

Embodiments disclosed herein, on the other hand, use a band to compress the rotor winding and counteract centrifugal forces, maintaining a frictional bond between the rotor winding and the respective cores. The band is made of a strong material, such as a maraging steel, and tightly surrounds the rotor winding disk, applying a compressive force that counteracts centrifugal forces. In this way, embodiments provide cost-effective ways of having a single disc of conductive metal as the winding while maintaining durability and allowing for higher rotational velocity.

As mentioned above, conventionally, windings for axial flux induction motors are wound by hand. Embodiments disclosed herein provide an automated way to manufacture coils for a stator and apply the coils onto the stator. According to embodiments, rectangular wire (also known as bar wire) is de-coiled and straightened. The rectangular wire is then repeatedly bent to stack the bent wire in an axial direction along the shaft of the rotating electrical machine. A number of bends in the wire corresponds to a number of turns of the coils for the rotating electrical machine. Then, in a direction of rotation of the rotating electrical machine, the wire is pressed with a die having interlaced teeth. In this way, the wire is formed into a shape to fit over at least one tooth of the stator, resulting in a coil. The coils can be lapped into one another, interleaved, and interconnected into phases to make the stator windings.

Moreover, according to an embodiment, coils are fabricated individually such that they can intermesh with one another upon assembly into coil groups. In this way, after fabrication, they can be assembled into a wiring apparatus that can be slipped onto an open stator, reducing labor in the manufacturing process and improving the slots' fill factor.

As mentioned before, one reason why stator windings are conventionally inserted by hand is that their slots are partially closed, resulting in a widening of the stator teeth at the top. Hence, according to an embodiment, the stator teeth are open in such a way that the assembled stator windings can be slipped directly down onto the stator, obviating any need to hand-wind the coil assembly.

Cost-effectiveness of the machine is provided for by avoiding the need for both expensive rare earth materials and by lowering wire insertion costs. Moreover, having equivalent or greater power density to conventional rare earth machines in a radial configuration results in lower mass. The lower mass results in knock on effects which provide additional cost savings for applications such as electric cars.

As mentioned above, most motors for electric cars are liquid-cooled. This is expensive and may introduce additional components, not found in air-cooled motors, that can have reliability issues. Some embodiments mount an impeller to the shaft to drive air through the air gap between the rotor and stator, whisking heat out of the rotor and cooling it. Alternatively or additionally, the rotor may have fins to enhance conduction and convection of heat.

Figure 24A:
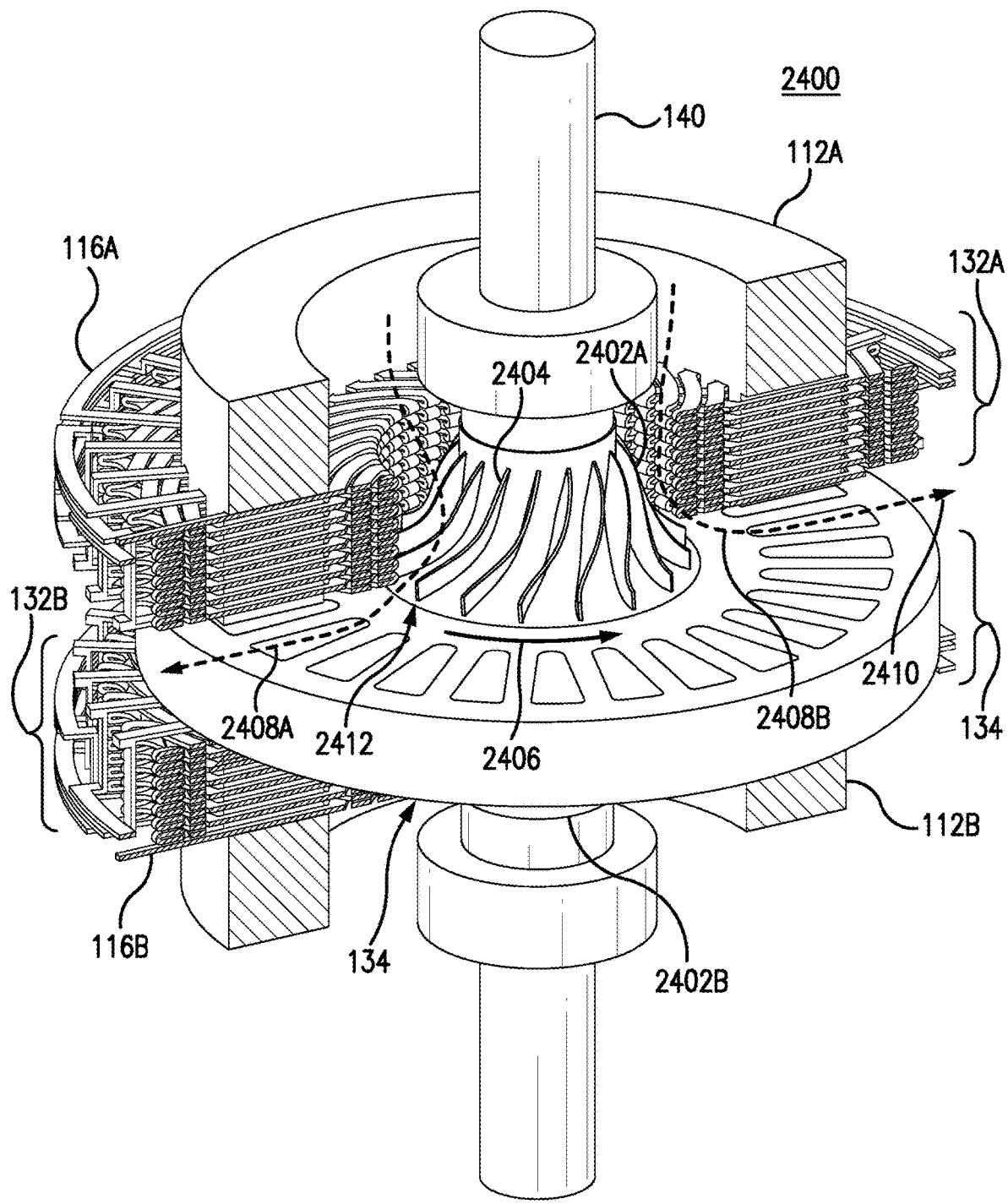
FIGS. 24A-B show a cross-section of a rotating electrical machine with an impeller attached to a shaft for cooling according to some embodiments.
Figure 24B:
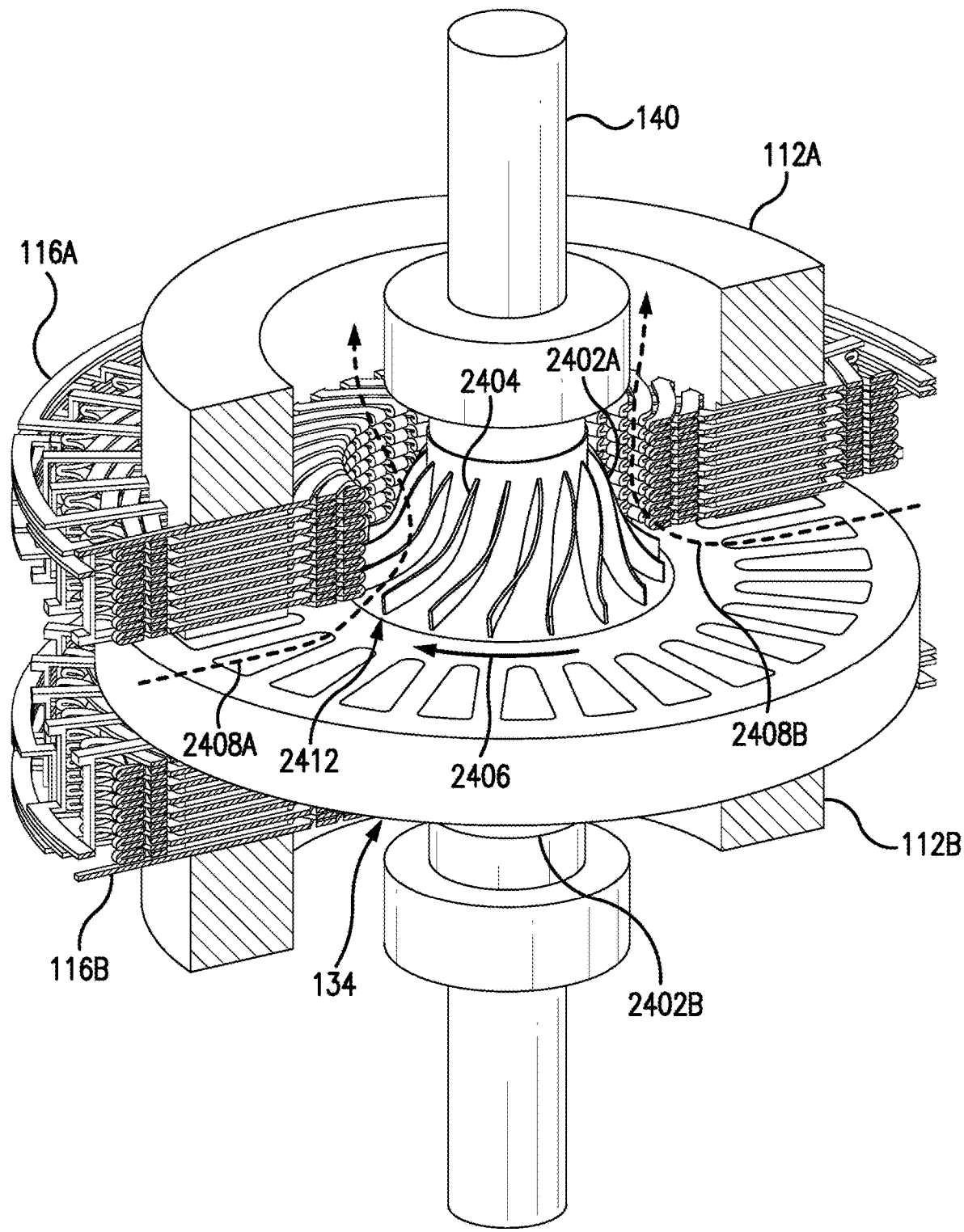
Figure 25:
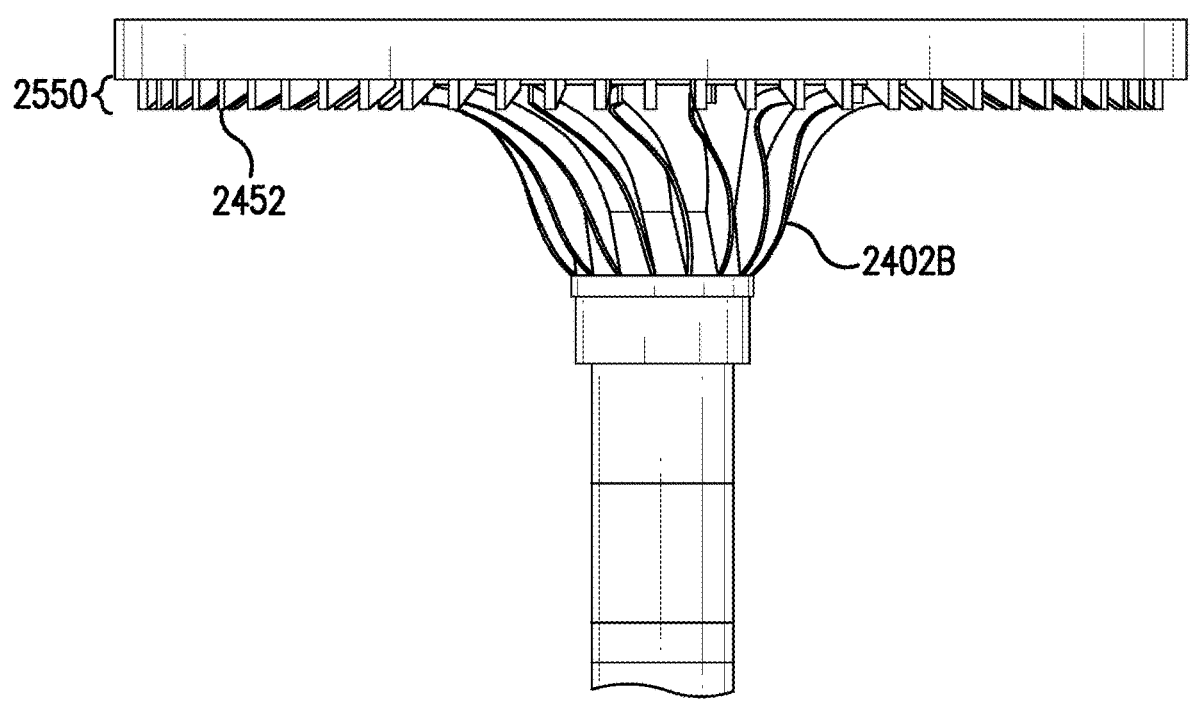
FIG. 25 illustrates a rotor for a rotating electrical machine that has fins for cooling according to some embodiments.

Reference will now be made in detail to representative embodiments illustrated in the accompanying drawings. First, assembly of an example device is described with reference to FIG. 1. Second, a rotor and its fabrication is described in greater detail with reference to FIGS. 2-4, 5A-D, and 6. Third, a stator and its fabrication is described in greater detail with reference to FIGS. 7, 8A-B, 9, 10A-K, 11, 12A-D, and 13. Fourth, how a stator may be mounted to an endbell is described with respect to FIGS. 14, 15, and 16A-D. Fifth, how a rotor may be mounted to an axel is described with respect to FIGS. 17 and 18A-B. Sixth, various alternative embodiments are described with respect to FIGS. 19-21. Seventh, operation of an axial flux induction machine is described with respect to FIGS. 22A-D and 23A-B. Eighth and finally, FIGS. 24A-B and FIG. 25 illustrate techniques for cooling the axial flux induction machine. It should be understood that the following descriptions are not intended to limit the embodiments to one preferred embodiment. To the contrary, it is intended to cover as many alternatives, modifications, and equivalents as can be included within the spirit and scope of the described embodiments as defined by the claims.

Assembly of an Axial Flux Induction Machine

FIG. 1 shows an assembly for an axial flux machine 100 according to some embodiments. Machine 100 includes two endbells 102A and 102B, two stators 132A and 132B, two bearing assemblies 136A and 136B, shaft 140, and a rotor 134. In this embodiment, rotor 134 is located between stators 132A and 132B. This is one configuration; other embodiments utilizing these components will be described below with respect to FIGS. 20 and 21. Each of these components is described in turn.

Endbells 102A and 102B form a housing that encloses machine 100. Endbells 102A and 102B provide support for bearing assemblies 136A and 136B and provide protection for the internal components of machine 100, including stators 132A and 132B and rotor 134. Endbells 102A and 102B may be mounted to the device utilizing the machine, such as, for example, a vehicle, turbine, or any industrial device that needs to convert electricity to torque, or vice versa.

Endbells 102A and 102B are preferably made of a non-ferromagnetic (preferably diamagnetic), electrically resistive material such as stainless steel 310 or 304 or titanium (whether alloy or commercially pure). Other structurally appropriate non-magnetic materials may be used as well such as polyether ether ketone PEEK), polyethylenimine (PEI), or a carbon fiber-, glass fiber-, or aramid fiber-resin composite (where the resin could be either a thermoset or thermoplastic).

Endbells 102A and 102B have holes, illustrated with hole 130, down their center axis for machine 100's shaft 140 to pass through. Endbell 102B also has a hole 138 for wiring connecting to stators 132A and 132B to pass through. In embodiments, endbells 102A and B may also have holes for cooling the machine, such as for transmission of gases or other cooling substances. A skilled artisan would recognize various methods in the art used to circulate air or other substances through machine 100 for cooling. The other substances may be forced through machine 100, perhaps using a fan or other means. In this way, machine 100 may be more actively cooled.

In an embodiment, the space between rotor 134 and stators 132A and B may be between 0.1-2 millimeters. This embodiment may have an advantage of improved airflow/gas flow, which allows heat to be removed from the rotor disk, stator, and windings more effectively.

In another embodiment, endbells 102A and B may be sealed, and perhaps pressurized. For example, endbells 102A and B may include hydrogen gas. Hydrogen gas is an effective conductor of heat; thus it may help evacuate heat from components of machine 100. In this embodiment, bearing assemblies 136A and 136B may be airtight. In this embodiment, holes may be used to circulate the gas to an internal or external heat exchanger. To circulate the gas, an internal fan, screw, blower, or regenerative turbine may be used.

Within endbells 102A and B are stators 132A and B and a rotor 134. This is one embodiment; others will be described below with respect to FIGS. 19-21. Stators 132A and B each include a respective stator core 112A and 112B and a respective stator winding 116A and 116B. Stator cores 112A and 112B preferably are made of a magnetically permeable, highly resistive material such as SMC powder or silicon steel. In one example, stator cores 112A and 112B may be made of a strip of laminated electrical steel wound into a bobbin and cut to form the appropriate shape.

Stator windings 116A and 116B are preferably made of an electrically conductive material. For example, stator windings 116A and 116B may be made of copper, aluminum, silver, gold, or other high conductivity electrical materials. Current is passed through stator windings 116A and 116B to induce a magnetic field in stator cores 112A and 112B. Stators 132A and B and how they may be fabricated are described in greater detail below with respect to FIGS. 7-13.

Stators 132A and B may be mounted in a fixed manner to the respective endbells 102A and 102B. If stator cores 112A and 112B are made of material with appreciable tensile strength, such as silicon steel, holes may be drilled in stator cores 112A and 112B to attach stator cores 112A and 112B into the correct position in respective endbells 102A and 102B.

If stator cores 112A and 112B are made of material that does not have appreciable tensile strength, such as an SMC, other methods of mounting stators 132A and 132B to endbells 102A and 102B may be employed. One such method is described below with respect to FIGS. 14, 15, and 16A-D.

Also mounted to endbells 102A and 102B are bearing assemblies 136A and B.

Bearing assemblies 136A and B provide a rigid support for shaft 140 while allowing shaft 140 to spin with a minimal amount of friction. Any number of common techniques may be used to attach bearing assemblies 136A and B to shaft 140 and to the respective endbells 102A and B. Bearing assemblies 136A and B may include a spring to effect a preload and centering that reacts against the inner axial wall of the endbell (as shown with spring 104A and outer portion 107) and an inner portion that attaches to shaft in a fixed manner (as shown with inner portion 118B). The inner portions may include a bore that supports bearings 110A and B and allows them to spin with minimal friction. In different embodiments, bearings 110A and B may be ball bearings or roller bearings. In this way, bearing assemblies 136A and B allow shaft 140 to spin while providing adequate support.

Shaft 140 is attached to, and abuts perpendicular from, rotor 134. More detail on how bearing assemblies 136A and B support shaft 140 and how shaft 140 is attached to rotor 134 is provided below with respect to FIGS. 17 and 18A-B.

Rotor 134 includes a plurality of cores, such as core 106, a rotor winding 114, and a band 108. Each core is placed within a cavity of rotor winding 114. The rotor winding 114 is surrounded by band 108. Rotor winding 114 carries the current induced by stators 132A and B. In an embodiment, rotor winding 114 consists of a solid disc of conductive material that comprises a plurality of cavities. The disc may be a flattened cylinder in shape. The rotor and its fabrication are described in greater detail with reference to FIGS. 2-4, 5A-D, and 6.

In addition, machine 100 may include a position sensor (not shown). The position sensor may be able to detect the position, direction of rotation, and/or the rotational velocity of rotor 134 and/or shaft 140. The position sensor may be mounted either within the interior or upon the exterior of endbells 102A-B. Data collected from the position sensor may be used to control the phase and amplitude of current applied to stator windings 116A-B.

Rotor for an Axial Flux Induction Machine

Figure 2:
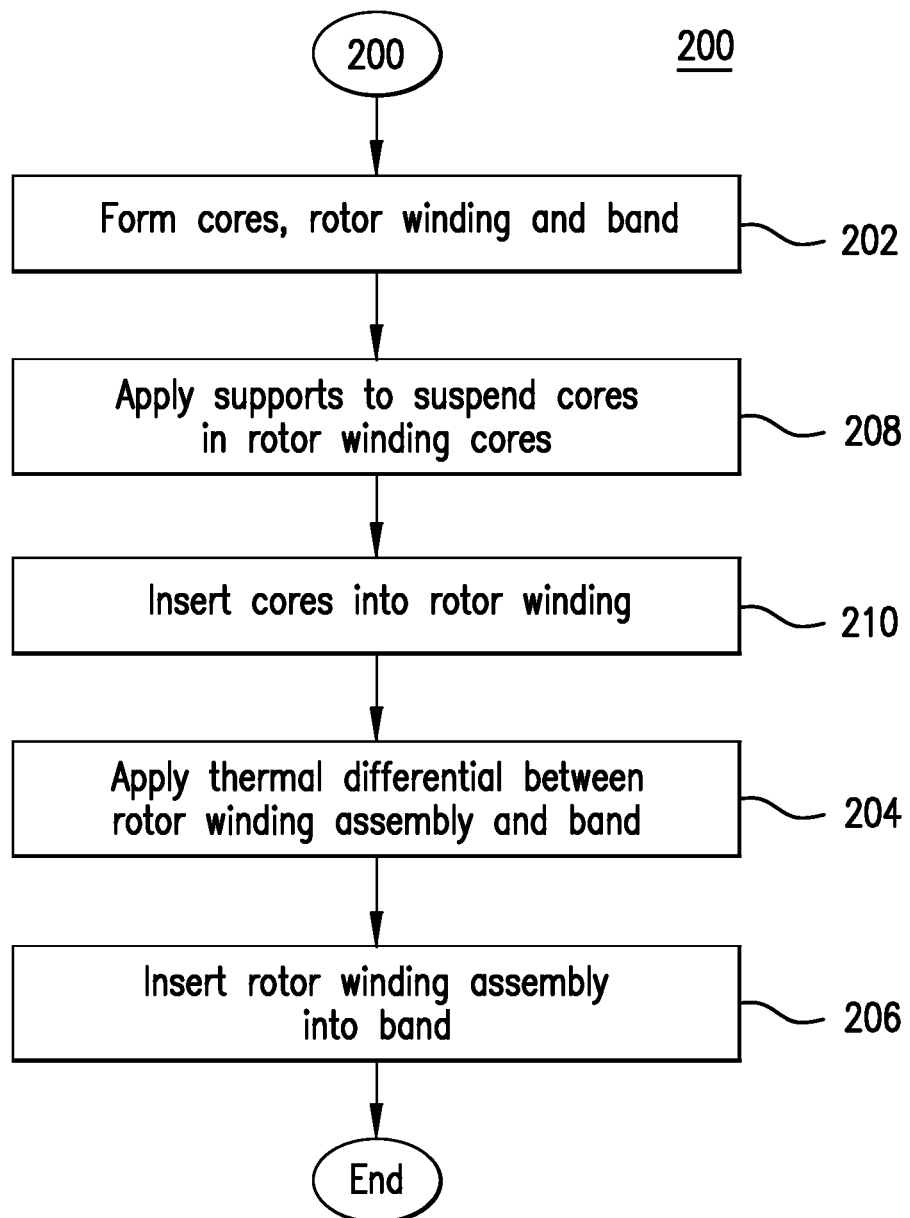
FIG. 2 shows a method of making a rotor for an axial flux machine according to some embodiments.

FIG. 2 shows a method 200 of making a rotor for an axial flux machine according to some embodiments. Method 200 starts at a step 202 with fabrication of a plurality of cores, a rotor winding, and a band. Each of these components may be fabricated separately as described below.

Each of the plurality of cores, such as core 106 in FIG. 1, may be made of an electrically resistive, isotropic ferromagnetic powder such as a soft magnetic composite material, for example, the SOMALOY 700 3P SMC powder. Respective grains of the isotropic ferromagnetic powder may be iron coated with an insulating layer. The grains may be insulated from one another with a coating, e.g., magnetite, silica, or other insulating oxide. An example of such a powder is the SOMALOY composite powder available from Höganäs AB of Höganäs, Sweden. In this way, embodiments avoid laminating material while controlling eddy currents.

Core 106 may not be a permanent magnet, but may have to be excited to transmit a magnetic flux. In embodiments, core 106 has a saturation magnetic flux density greater than 1.5 T or even 2.0 T. Core 106 has magnetic flux density of at least 1.1 T, or even at least 1.5 T, when the core is subjected to a magnetic field of 4,000 Amps/m. Core 106 may have a magnetic permeability of at least 1, 1.5, or even 2. Core 106 may have a thermal conductivity of less than 40 W/m*K. Within core 106, the ferromagnetic powder may have a density between 7.25 g/cm$^3$ and 7.60 g/cm$^3$. Alternatively, the ferromagnetic powder may have a density between 7.49 g/cm$^3$ and 7.58 g/cm$^3$.

Figure 3:
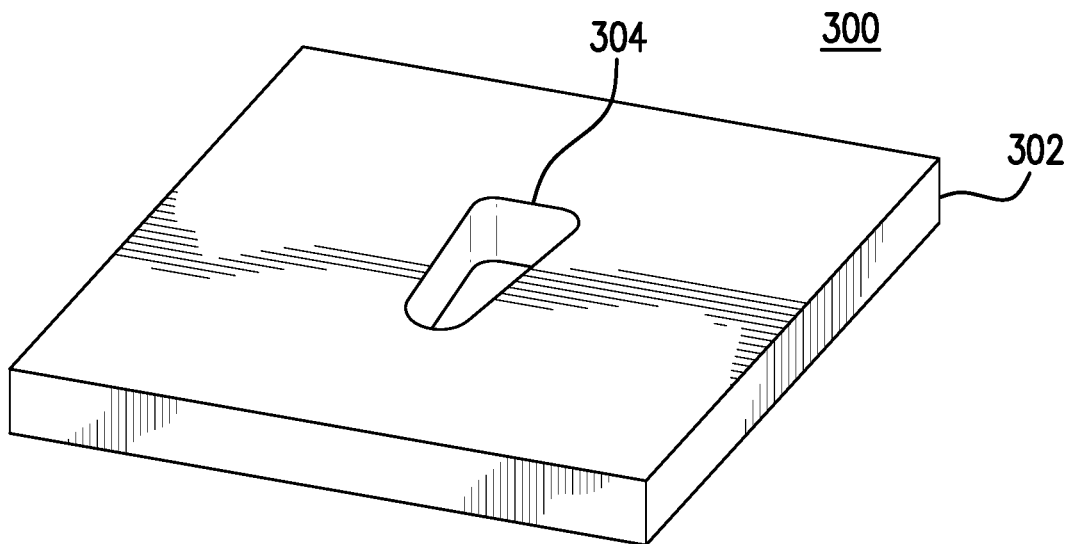
FIG. 3 shows a core for a rotor for an axial flux induction machine according to some embodiments.
Figure 4:
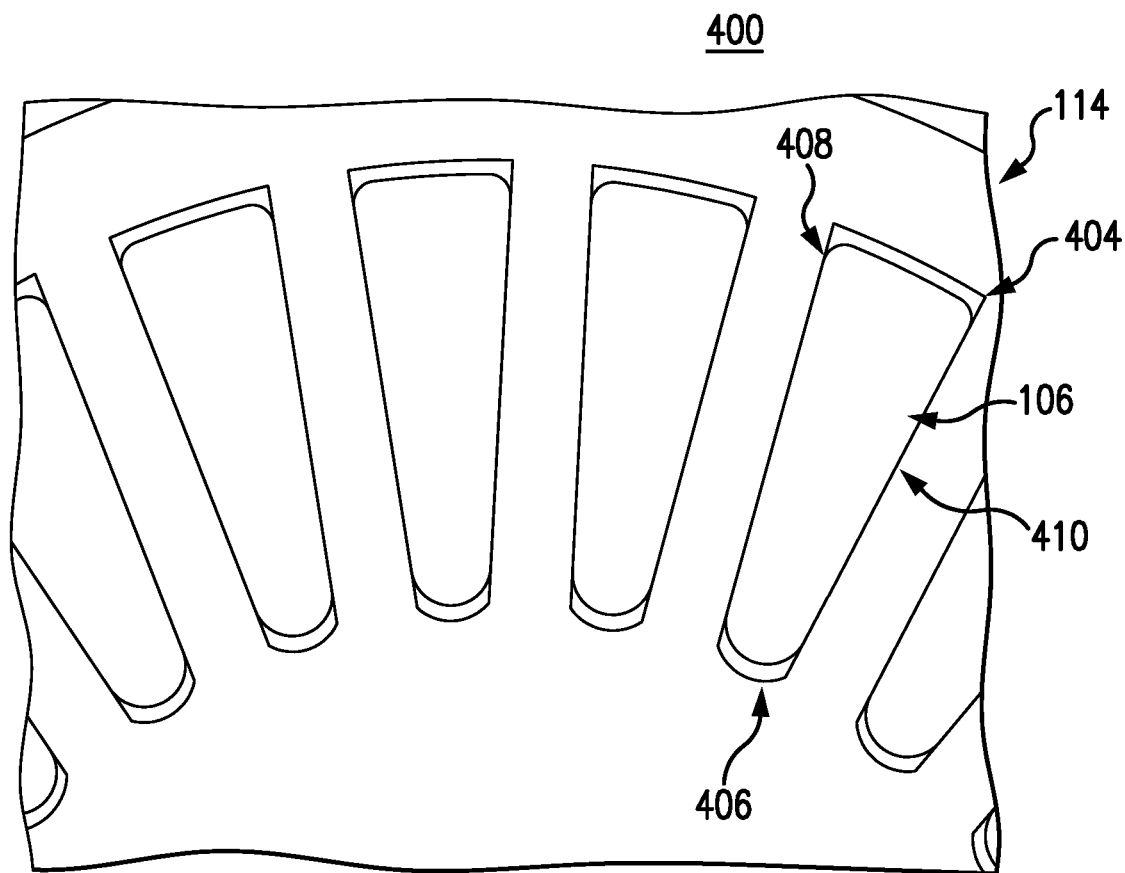
FIG. 4 is a diagram that shows how cores are suspended by supports in a rotor winding according to some embodiments.

To achieve such density, the SMC powder may need to be compressed in a die as illustrated in a diagram 300 in FIG. 3. Diagram 300 illustrates a die 302 having a mold 304 in the shape of core 106. The powder may be placed in mold 304 and compressed with between 550 and 800 Megapascals (or 39.9 to 58.0 short tons per square inch) of compaction pressure. The powder may be repeatedly inserted and compressed until it reaches sufficient density. After the powder is compressed into a core, the core is heated to 900° C. in a nitrogen atmosphere to evaporate the die lube and to activate the phosphorus binding agent and give the core mechanical strength. Subsequently, the core may be heated to substantially 600° C. in a steam atmosphere. These various treatments may cause the powder to bond together into a solid mass (specifically a sol colloid).

In other embodiments, core 106 may be made of lamination stacks, a coiling made of ferromagnetic material, and/or soft bulk ferromagnetic cores, or some combination thereof. A lamination stack may be a stack of sheets laminated from one another to promote resistivity. A coiling made of ferromagnetic material may be a stack that is wrapped around a central axis in such a way as to laminate each layer within it from one another. An example of a soft bulk ferromagnetic core is Vanadium Permendur (also known as Hiperco 50). Vanadium Permendur is an iron-cobalt-vanadium ferromagnetic alloy.

Returning to FIG. 2, a rotor winding is also fabricated in step 202. As described above, the rotor winding may consist of a solid disc of conductive material. The disc may be a flattened cylinder in shape.

Figure 5B:
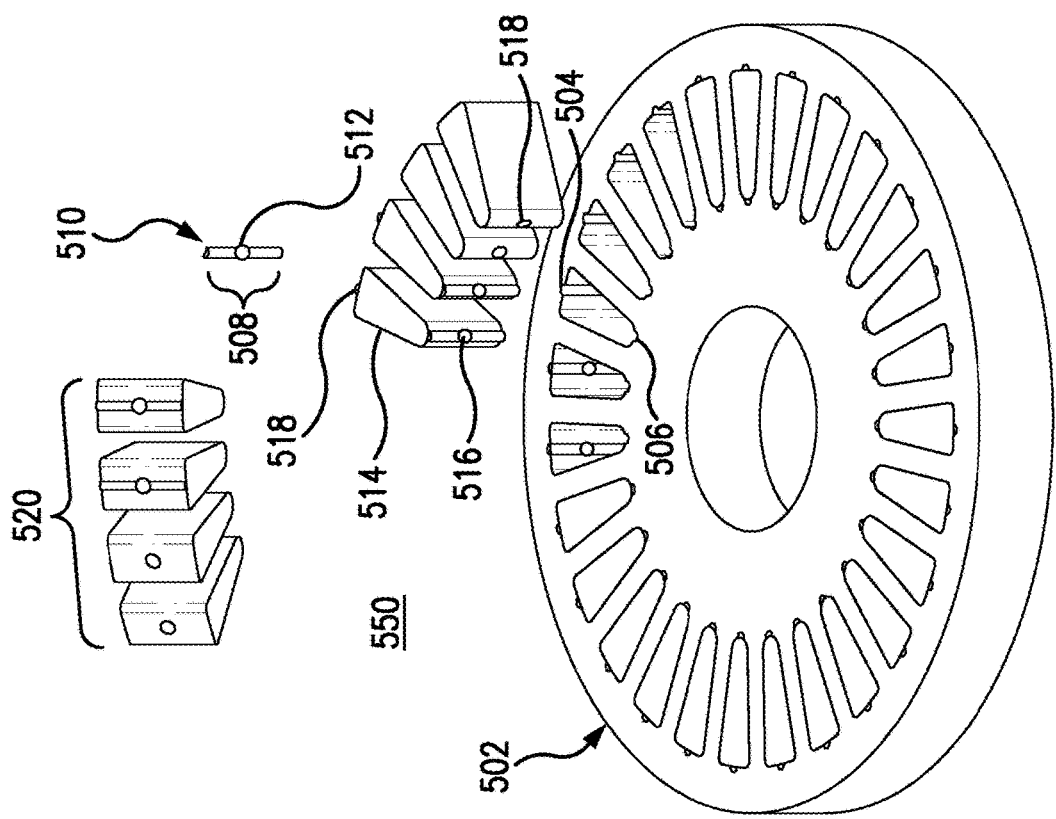
FIGS. 5A-D are diagrams illustrating different ways to suspend cores in a rotor winding according to some embodiments.
Figure 5A:
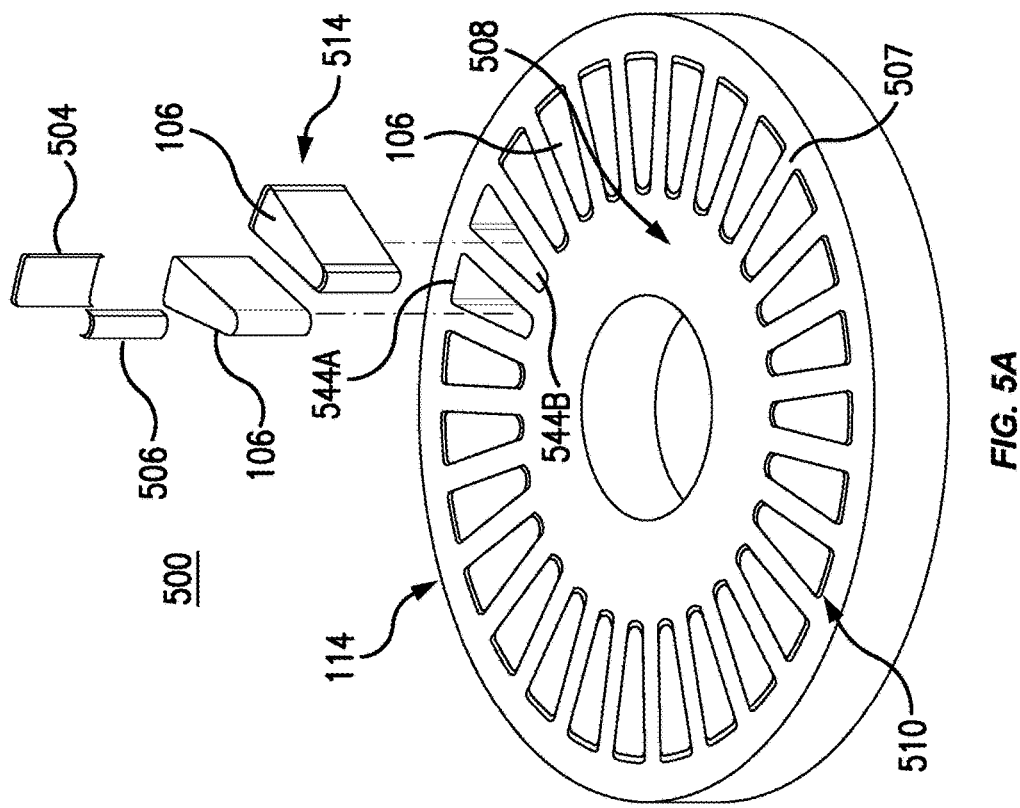

One example rotor winding 114 is illustrated in FIGS. 5A-B. As shown in those figures, rotor winding 114 comprises a plurality of cavities 544A . . . N. Between each of the cavities, rotor winding 114 includes rotor bars, such as rotor bar 507. A current is induced in the rotor bars in response to the time and spatially varying magnetic field flux that is applied by the stator axially across the airgap and into the rotor. This induced current in the rotor bars itself produces a magnetic flux that opposes (but is less than enough to balance) the applied magnetic flux passing through the rotor. The induced current in the rotor bars produces Lorentz force reactions in response to the net magnetic field and thereby generates torque. The rotor bars are configured to be narrow enough to cleanly transmit the induced current, avoiding eddy currents to the greatest extent possible, but wide enough to carry the induced current without too much resistive losses.

Connecting the rotor bars are two shorting rings: a shorting ring 508 and shorting ring 510. Shorting ring 508 and shorting ring 510 are rings that short the respective rotor bars. Shorting ring 508 is in the interior portion of rotor winding 114, and shorting ring 510 is in the exterior portion of rotor winding 114.

As described above, rotor winding 114 may be a single piece of conductive metal. Thus, shorting ring 508, shorting ring 510, and the rotor bars 507 may be different regions of the same piece of metal. In one embodiment, rotor winding 114 may be made of a chrome-copper alloy, which offers technical advantages in cost-effectiveness, conductivity, and strength. In a second embodiment, rotor winding 114 may be made of aluminum or an aluminum alloy, which offers technical advantages in terms of having a higher strength to weight ratio than copper, but perhaps at the expense of conductivity. In a third embodiment, rotor winding 114 may be made of silver or a silver alloy, the former of which offers the technical advantage of being more conductive than either copper or aluminum, but perhaps at the expense of cost.

In other embodiments, rotor winding 114 may be made of an alloy or composite of any of those metals and flake graphene. Adding graphene may offer additional technical advantages in terms of added strength and electrical conductivity, but perhaps at the expense of added cost and manufacturing difficulties.

Graphene-metal composite may be produced in several ways. In one method, graphene flakes are mixed with copper powder and incorporated with one another through ball milling. The resulting mixture may be centered and compressed into the composite. In another method, the composite may be produced by 3D printing, or additive manufacturing, to apply layers of graphene flakes and copper powder, perhaps with a binding agent. A sintering process may follow to solidify the composite and drive out the binding agent, by means of ball milling graphene flakes and copper powder.

As mentioned above, each of the cavities 544A . . . N in rotor winding 114 has a similar shape and orientation to accept cores with the same size. Each core may be substantially equidistant from an axis of the rotor. The cavities may be angled at a skew angle. The skew angle may be selected to minimize torque ripple and to ensure that the forces are applied to the rotor winding and rotor core relatively evenly.

As mentioned above, the rotor winding and rotor cores may be made of different materials having different coefficients of expansion. The coefficient of thermal expansion is an intrinsic material property that is indicative of the extent to which a material's volume, and thereby linear dimensions, changes with temperature. Different substances expand by different amounts.

Turning to FIG. 2, a band, such as band 108 in FIG. 1, is also fabricated at step 202. Band 108 engages an outer edge of the rotor winding and applies compression to the rotor winding. Band 108 is a circular band centered on an axis with a void sufficient to contain rotor winding 114. The band may be made of a maraging steel. In other examples, the band may be made of a titanium or aluminum alloy, or carbon fiber composite. Band 108 may also be formed by forging, hot rolling, or may be cold rolled and then welded into shape.

Band 108 is in tension owing to an interference fit. Band 108 applies a radial compressive stress such that, within the outermost regions of the rotor, the compressive stress fully or partially cancels out the tensile forces originating from centrifugal acceleration forces acting on the upper portions of the rotor. A function of the rotor band is to prevent excessive radial deformation of the rotor. These compressive forces may act to increase the allowable cyclic loading level (some combination of either the maximum angular velocity or number of cycles to a particular velocity) of some portion of rotor winding 114. It is important to note, however, that the design of winding 114 is such that it prevents said preload compressive force from adversely affecting the enclosed cores.

Returning to FIG. 2, a thermal differential is applied between the assembly and a band at step 204. The thermal differential may involve cooling the assembly to contract it or heating the band to expand it, or both.

Figure 6:
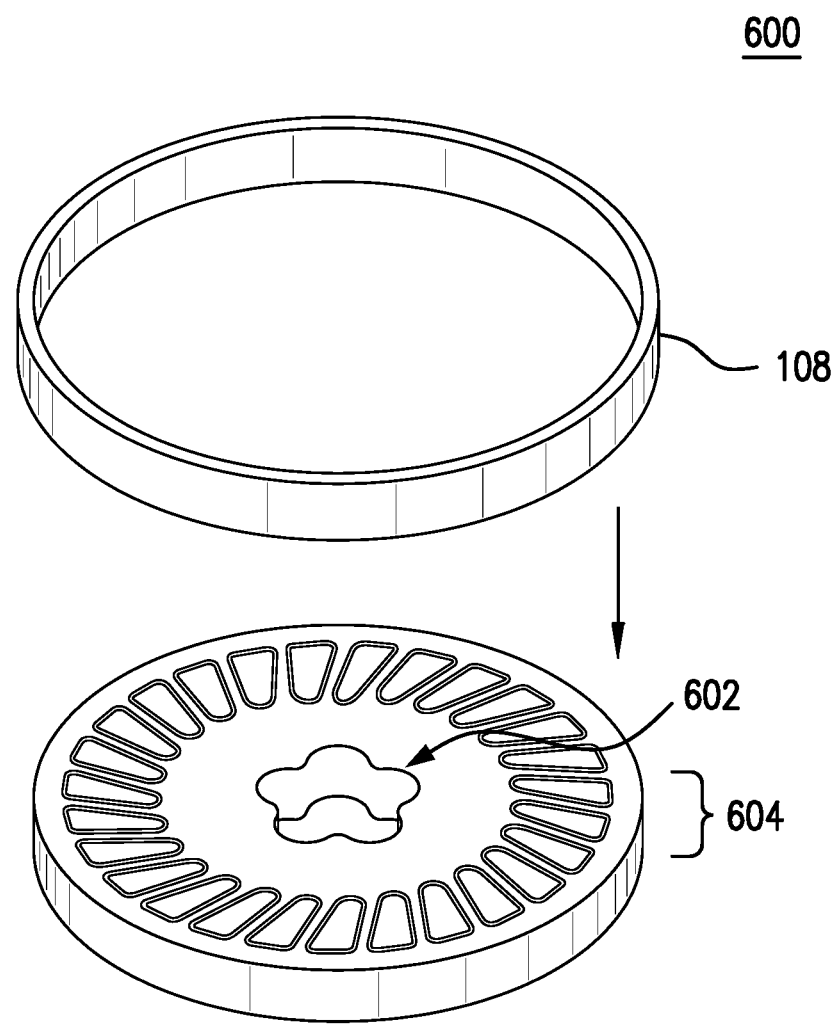
FIG. 6 illustrates how a rotor winding is inserted into a band according some embodiments.

While the thermal differential is applied the winding assembly is inserted inside a band at step 206. Step 206 is illustrated in FIG. 6. FIG. 6 shows a diagram 600 illustrating band 108 installed into a rotor for an axial flux motor. Diagram 600 illustrates an assembly 604 including a rotor winding with supports and cores inserted into its respective cavities. Assembly 604 is inserted into the void within band 108. Assembly 604 also has lobed splines 602 to enable the rotor to mount on a shaft as will be discussed below with respect to FIGS. 17 and 18A-B.

When the thermal differential dissipates and the band and rotor winding are at similar temperatures, band 108 applies a compressive force to the rotor winding. In an example, band 108 may apply between 80 and 300 megapascals of pressure to the rotor winding. Band 108 applies a radial compressive stress within the outermost regions of the rotor. Again, these compressive forces may act to increase the allowable cyclic loading level of some portion of rotor winding 114. And, said rotor band prevents excessive radial deformation of the rotor at high angular velocities. In this way, method 200 creates a rotor for an axial flux induction motor that is more durable and uses materials that are highly conductive and magnetically soft. Thus, band 108 increases the available operating speed of the machine.

In some embodiments, the band has portions removed to balance the rotor when the rotor is spinning. Removing portions in this way from a finished rotor may help align and balance and correct for any imperfections during the manufacturing process. The result is a rotor that has an equal distribution of mass around its axis. In this way, the band may be used to help avoid any wobbling when the finish rotor is spinning.

In some embodiments, the band has appendages to dissipate heat from the rotor. Heat is conducted from the rotor winding to the band, including to the appendages. Convection from the spinning rotor causes heat to dissipate from the appendages to the surrounding air or other gas. In this way, the appendages may circulate air to cool the rotor when the rotor is spinning.

Returning to FIG. 2, supports are applied to the cores at step 208 and the cores are inserted into the rotor winding according to step 210. The supports may be added before or after the cores are inserted as described above.

At step 208, supports are applied to suspend cores in respective cavities of the rotor winding. As discussed above, the cores, such as core 106 in FIG. 1, may be brittle and of low tensile strength. Secondly, for electromagnetic design reasons, it may not be possible to make the rotor core in a shape that prevents bending or tension under acceleration and/or vibration loading. Finally, the thermal expansion coefficient of the rotor inserts is often rather different from that of the conductive rotor material. For these three reasons, it is therefore difficult or impossible to realize a direct interference fit between rotor and rotor cores that works across all temperature ranges that the motor or generator may experience (from, e.g., −40° C. to +200° C.

Moreover, as mentioned above, the coefficients of expansion for SMC composite and the material of the rotor winding are different. If the SMC composite were merely inserted, after applying a large enough temperature differential, to the rotor winding, the unequal compressive forces applied by the rotor winding might destroy the rotor core. Alternatively, again because of the different coefficients of expansion, the SMC composite may become too loose when the rotor winding is heated. Embodiments disclosed herein avoid this problem by using alternate fixing methods, for instance, suspending the cores using supports as illustrated, for example, in diagram 400 in FIG. 4.

Diagram 400 includes rotor winding 114 that, just as in FIG. 1, contains in its cavities a number of cores, such as core 106. Core 106 is attached to rotor winding 114 by respective supports 404 and 406. Support 404 is an outer support that attaches to an outer portion of core 106 toward a perimeter of the rotor, that is, its outer shorting ring. Support 406 is an inner support that attaches to an inner portion of core 106 toward the rotor's inner shorting ring. Support 404 may have a width between core 106 and rotor winding 114 of between 0 and 1.5 mm. Support 406 may have a width between core 106 and rotor winding 114 of between 0.1 and 5 mm.

Supports 404 and 406 are made of a material that is rigid enough to hold the cores and at the same time accommodate the different coefficients of expansion for the cores and winding. Thus, the material must be flexible enough to adapt to different manufacturing tolerances of the cores and winding. Example materials include an elastomer, such as latex rubber. More specifically, Fluroelastomer or FKM may be used. Fluroelastomer or FKM is a class of synthetic rubber designed for very high temperature operation. FKM provides resistance to chemicals, heat, and oil while providing useful service life above 200° C. FKM is not a single entity but a family of fluoropolymer rubbers. Fluoroelastomers or FKM (sometimes also referred to as FKM Viton) can be classified by their fluorine content, 66%, 68%, and 70% respectively. This means that FKM rubber having higher fluorine content has increasing fluid resistance derived from increasing fluorine levels. In a preferred embodiment, a material having a shore hardness of 90 A or above may be desired.

The elastomer may be vulcanized, such as by hardening by treating it with sulfur at a high temperature. The vulcanization may utilize a variety of agents such as thiocarbanilide, thiourea, cumene peroxide, magnesium oxide, etc.), and in some instances, none at all (one-part cure).

In other examples, different substances may be utilized. For example, supports 404 and 406 may be made of a thermoplastic polymer like polyether ether ketone (PEEK) or polyethylenimine (PEI). In other examples, supports 404 and 406 may be made of a high-temperature epoxy, acrylate or cyanoacrylate.

In one embodiment, the material for supports 404 and 406 may be applied to core 106 before insertion into winding 114. In another embodiment, it may be applied to winding 114 first before core 106 is inserted. In a third embodiment, it may be applied after core 106 is inserted. In that case, when vulcanized elastomer is used for supports 404 and 406, the entire core-winding assembly may be treated to complete the vulcanization process. This may be a mold-in-place operation. With a mold-in-place operation, after the cores are inserted into the various cavities on the rotor winding, elastomer, or other substance, may be injected under pressure, in liquid form, to fill gaps present in the inner and outer portions of the cavities. Then, the entire assembly may be heated to the vulcanization temperature to solidify the material.

Between the inner and outer portions of core 106 are side portions 408 and 410. Alongside portions 408 and 410, an air gap may be allowed between core 106 and winding 114. In this way, the supports suspend the respective core in its respective cavity. Preferably, the air gap should be just large enough to allow for manufacturing tolerances, and no larger. In this way, space reserved for electromagnetic materials is maximized.

Supports 404 and 406 may have various different shapes and may be applied to suspend core 106 in various different ways, as will be described below with respect to FIGS. 5A-D. Supports 404 and 406 may be shims, staves, stakes, or springs.

FIG. 5A illustrates rotor winding 114 with a plurality of cores 106A . . . N suspended using shims. A shim is a thin strip of material used to align and secure parts, making them fit together in a desired fashion. As described above with respect to FIG. 4, cores 106A . . . N are attached to rotor winding 114 with inner and outer shims 504 and 506. Shims 504 and 506 may be rounded on one side to match a shape of a cavity of rotor winding 114 and may be rounded on another side to match a shape of the corresponding core 106. Shims 504 and 506 may be attached to core 106 using an adhesive. Then, a shim-core assembly 514 may be inserted into a respective cavity in rotor winding 114. In this way, while an interference fit may be impossible between cores 106A . . . N and windings 114 directly, an interference fit may be possible between winding 114 and shims 504 and 506, and between shims 504 and 506 and cores 106A . . . N.

FIG. 5B illustrates a diagram 550 with another embodiment where the supports are staves. A stave is a piece of material that interlocks with parts to secure them together. As in diagram 500 in FIG. 5A, diagram 550 includes a plurality of cores, such as core 514, inserted into rotor winding 502. Also as above, the plurality of cores are attached to winding 502 using inner and outer staves 516 and 518. The staves here, however, are shaped to mate with winding 502 and core 514. In this way, staves 516 and 518 extend into orifices in the respective cavities of winding 502 and the respective cores 514 to maintain the cores 514 attached to and stationary within rotor winding 502.

In embodiments, the orifices may be grooves, spheres, or both cut or molded into rotor winding 502, core 514, or both.

Staves 516 and 518 may have shapes matching the respective orifice. The orifices and corresponding staves may be placed both on the inner portion of core 514 and outer portion, as illustrated at 520. In this way, the corresponding staves and orifices mate with one another, making the core more secure.

Respective orifices on the rotor winding 502 and core 514 may join to one another to form a tube extending into the interior of a surface of a rotor. A stave may be fabricated by injecting a polymer material, in its liquid form, into the tube between core 514 and rotor winding 502. Once injected, the polymer material would solidify and harden to create a secure fit.

Figure 5C:
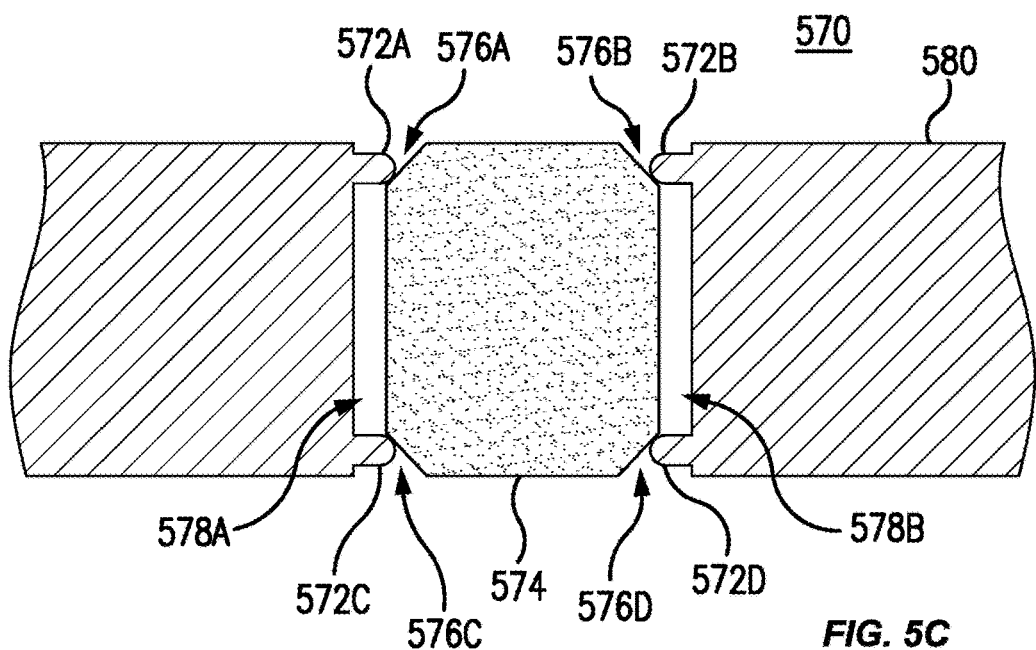

FIG. 5C illustrates a diagram 570 with a third embodiment using staking to secure the core in the winding. Diagram 570 includes a rotor winding 580 and a core 574. In diagram 570, core 574 is held in place by rings 572A-D. Here, staking is used to keep in place the core. Staking is just an operation done on the copper rotor at the perimeter of the cavity edge, on both the bottom and top. Staking involves pressing on this ledge, causing the ledge or ring to deform to create a permanent encasing ring feature around the core. These rings fit into the corresponding chamfer relief with which the inserts are made.

In this embodiment, rings are formed as 572A-D outcroppings from rotor winding 580 by pressing along the edges of the rotor cavity. Rings 572A-D may be made of the same materials as the rotor winding, preferably a chrome-copper alloy. For example, rings 572A-D may also be pressed and then post-machined to tolerances.

Rings 572A-D are configured to extend and fit into respective notches 576A-D. Notches 576A-D are located at the corners of core 574. Notches 576A-D may be beveled edges of core 574. When core 574 is pressed to shape, notches 576A-D may be formed from the die.

Rings 572A-D are strong enough to retain core 574. In this way, rings 572A-D may in some instances maintain an interference fit with core 574. As core 574 and rotor winding 580 heat, they expand at different rates according to their different coefficients of expansion. Rings 572A-D can slide against notches 576A-D to accommodate the different deformations of core 574 and rotor winding 580. In this way, rings 572A-D continue to press against notches 576A-D in core 574, holding core 574 in place within rotor winding 580 as the rotor is heated.

Figure 5D:
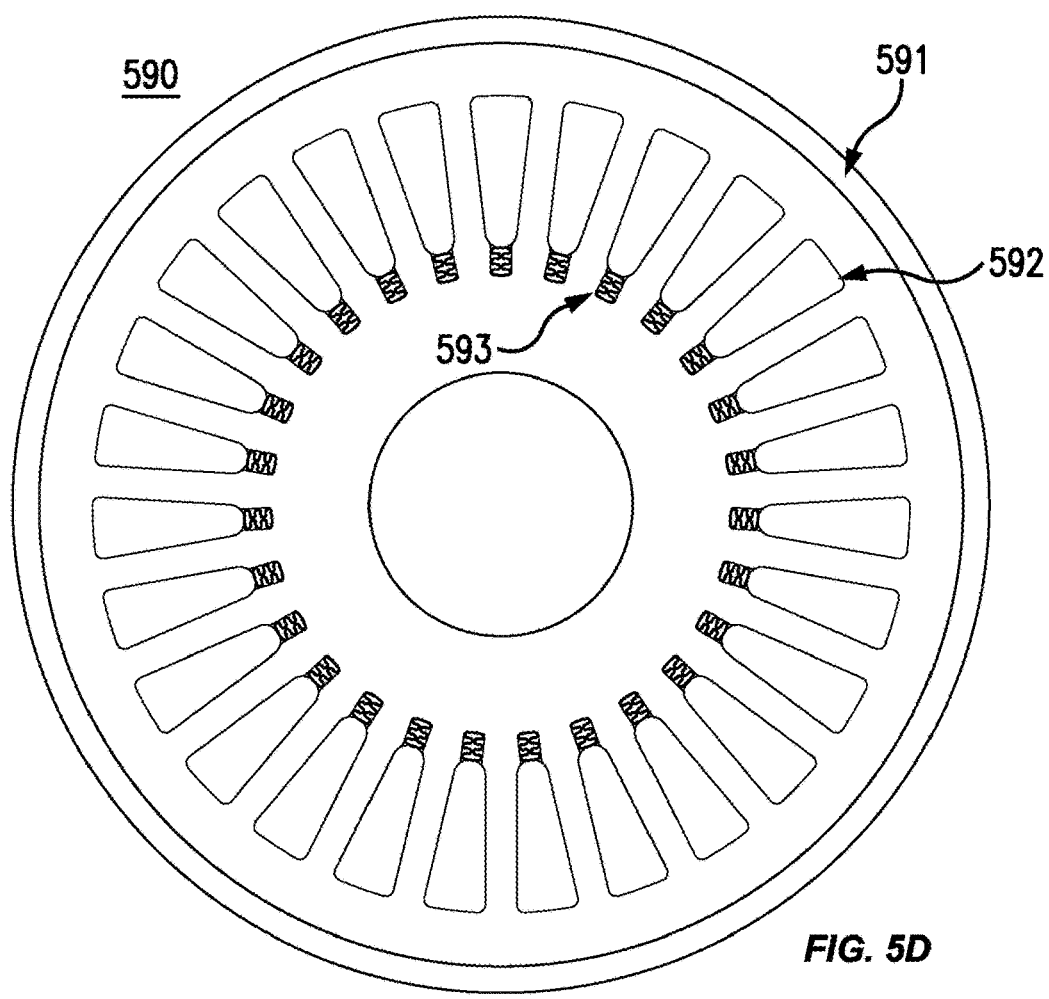

FIG. 5D illustrates a diagram 590 with a fourth embodiment where the supports are springs. Diagram 590 includes a rotor winding 591 holding a plurality of cores, such as a core 592. Each of the plurality of cores is held in place within a cavity in rotor winding 591 using a spring, such as spring 593.

Spring 593 may be a resilient device that can be pressed or pulled but returns to its former shape when released. Spring 593 may be compressed when core 592 is inserted. Once inserted, spring 593 will exert (nearly) constant pressure on core 592 against a cavity within rotor winding 591. In a different example, spring 593 may be a helical compression spring, disc or Belleville spring. Spring 593 may be made of a resistive, non-ferromagnetic metal.

As rotor winding 591 and core 592 are heated, spring 593 accommodates the difference in sizing between the two pieces, keeping core 592 fit snugly within rotor winding 591. In this way, spring 593 maintains core 592 within rotor winding 591 despite differences in coefficients of expansion between the two pieces.

While method 200 is illustrated with an example rotor illustrated in FIG. 1, a skilled artisan would recognize the same manufacturing technique may be used to manufacture other rotors having similar properties.

While various supports are described to attach cores to the rotor winding, a skilled artisan would recognize that, in other embodiments, the cores may be attached to the rotor winding using soldering or brazing techniques.

As mentioned above, an adhesive may be used to attach the support to the core and winding. In another embodiment, the cores may be attached directly to the winding with an adhesive. In that embodiment, a gap of roughly 0.5 mm between the core and the rotor winding may be filled in with adhesive. In examples, the gap may be between 0.3 mm and 0.7 mm in thickness. In either case where a support is used or an adhesive is used directly, the adhesive may be an epoxy adhesive such as EP-830. The adhesive may have a glass transition temperature of at least 175° C. and a temperature rating of at least 180° C.

Stator for an Axial Flux Induction Machine

Figure 7:
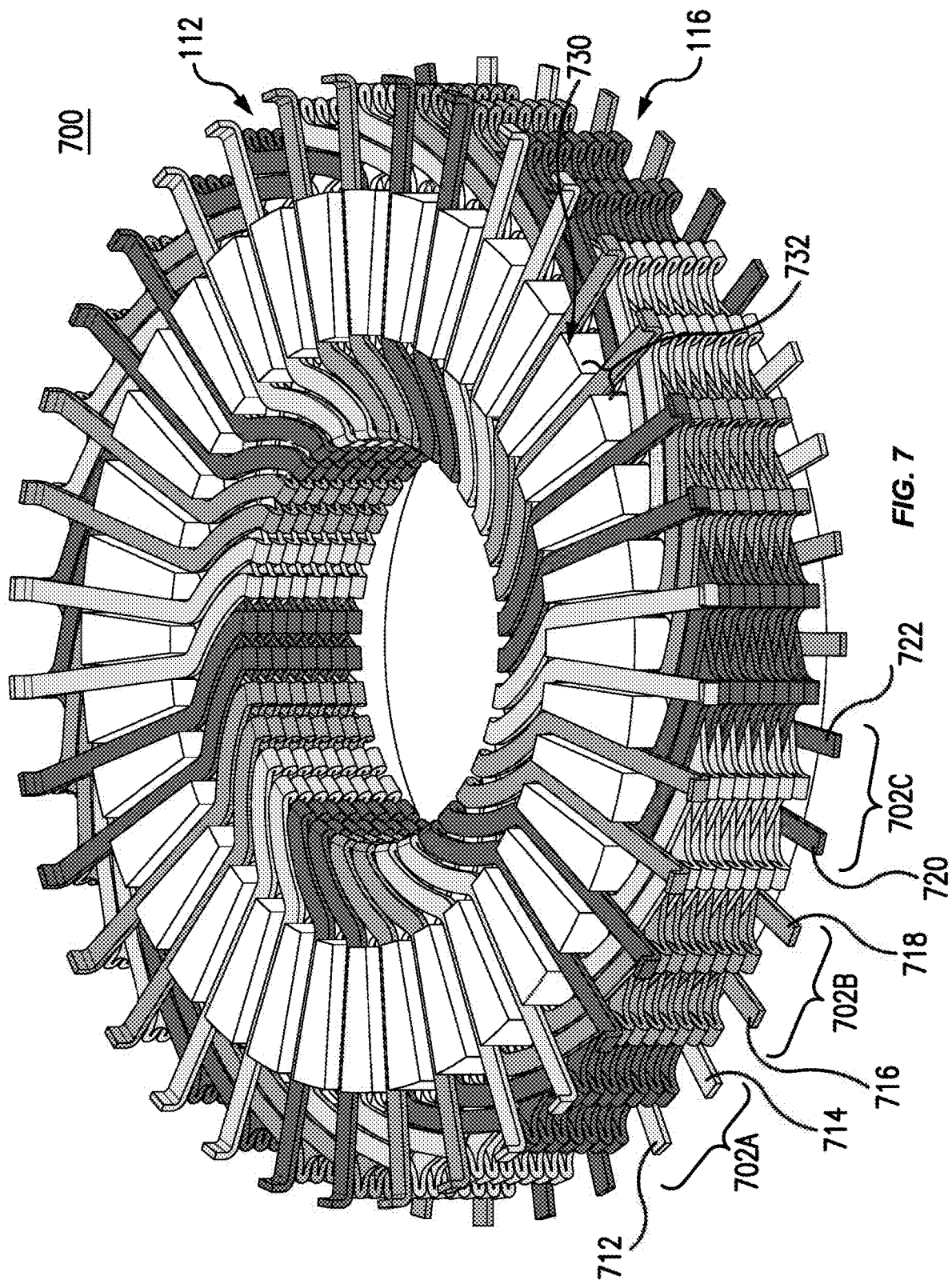
FIG. 7 illustrates a stator including a stator core and stator windings according some embodiments.

FIG. 7 illustrates a stator 700, similar to stators 132A-B in FIG. 1, including a stator core and stator windings according some embodiments. Stator 700 includes stator core 112 and stator windings 116.

As described above, stator core 112 may be made of SMC or other magnetically permeable material. It may have a base and a number of teeth, such as tooth 730. The teeth are separated by slots, such as slot 732. The teeth protrude upward from the base and the base shorts magnetic circuits between the respective teeth. In a preferred embodiment, stator core 112 may have 36 teeth.

Surrounding the teeth are stator windings 116. Stator windings 116 include a plurality of coils such as coils 712, 714, 716, 718, 720, and 722. In a preferred embodiment, stator windings 116 may have a number of coils that corresponds to a number of teeth in stator core 112. For example, in a preferred embodiment, stator core 112 may have 36 teeth. Thus, stator windings 116 may have 36 coils.

The coils in stator windings 116 may have three phases, each representing a different, closed electrical circuit. The coils in each phase make up a coil group. In the preferred embodiment shown in FIG. 7, two coils having a common phase are placed immediately next to each other (making a coil pair) following the two alternate phases. For example, coil 714 is adjacent to coil 712. Both coil 714 and 712 are part of a first phase, labeled phase 702A. That pair of coils in phase 702A is adjacent to a pair of coils in a different phase, phase 702B. The adjacent pair of coils in that phase is coils 716 and 718. Following those coils is a third pair of coils, coils 720 and 722, in a third phase, phase 702C. This pattern, AA, BB, CC, repeatedly continues around the stator for all 36 coils.

Figure 8A:
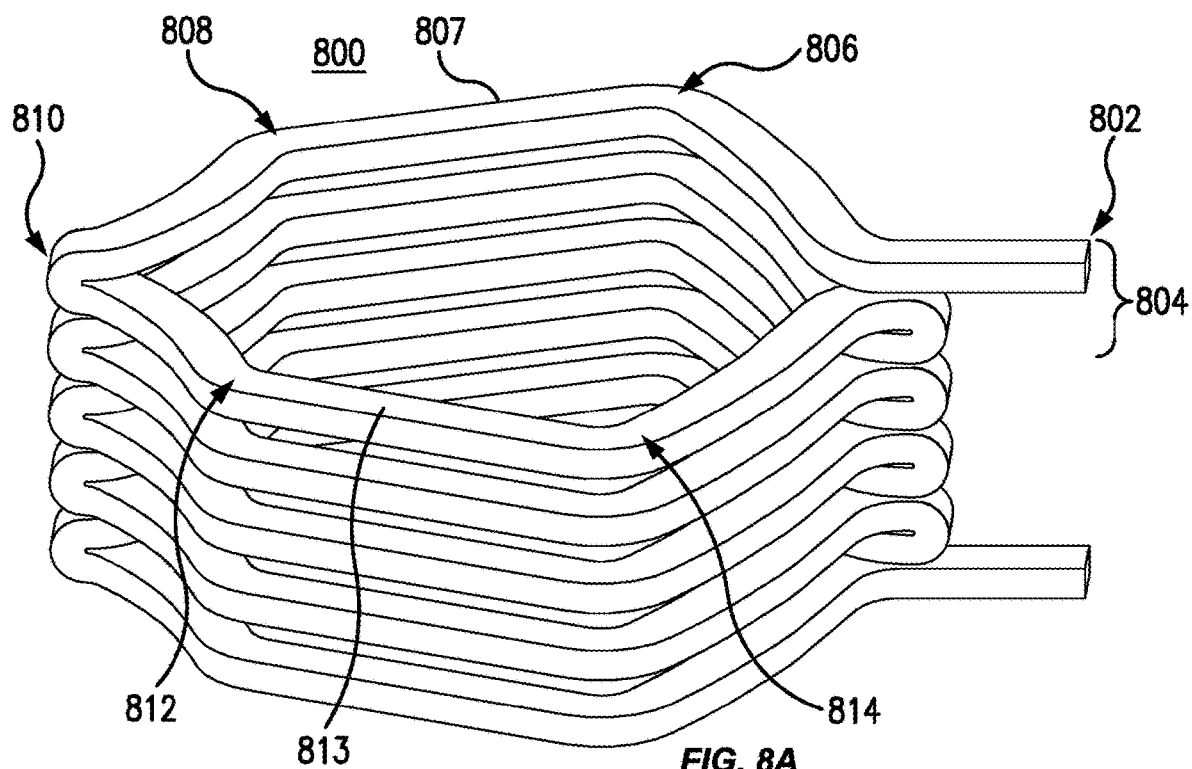
FIGS. 8A-B illustrate how a coil for stator windings according some embodiments.

FIG. 8A illustrates a coil 800 for stator windings according to some embodiments. Coil 800 may be insulated rectangular wire. In one embodiment, wire may be made of ETP or OFHC copper. The width of the wire may correspond to a width of the slots. For example, each slot may be wide enough to fit a single wire across plus a small allowance for insulating paper and manufacturing tolerance.

Coil 800 has a plurality of turns, such as turn 804. Each turn represents a loop of the winding back to its original lateral point. In the preferred embodiment in FIG. 8A, a coil may have five turns, all of common shape. The number of turns corresponds to a thickness of the rectangular wire in the axial direction and a height of the stator teeth to maximize the volume of space in the slot occupied by copper.

In this embodiment, turn 804 is bent to enclose four stator teeth. Based on the number of teeth that the coil encloses, turn 804 may have different geometries and shapes. In the embodiment shown in FIG. 8A, coil 800 is bent at angles 806 and 808 such that a segment 807 of wire between angles 806 and 808 extends a radial direction (that is, a direction extending from an axis along a radius of a machine). This segment of wire is positioned to pass between two stator teeth, though the slot. At bend 810, coil 800 is bent 180° between a direction facing the axis of the machine back toward a direction facing the perimeter of the machine. Extending back around turn 804, coil 800 is bent at angles 812 and 814 such that a segment 813 between angles 812 and 814 also extends a radial direction. Finally, coil 802 finishes turn 804 at its initial position in the radial dimension.

To form turn 804, coil 800 extends outward in alternating directions in each half-turn: first in a direction towards angles 806 and 808 and segment 807, then in a direction towards angles 812 and 814 and segment 813. These alternating directions provide the ability for the coils to interlace and lap on top of one another. In other words, a segment 807 of an adjacent coil (not shown) can rest on top of segment 813. This can be extended to several different coils. For example, three or four coils may be interleaved into coil 800 when assembled into the stator windings. By having the segments that extend out radially from the axis of rotation, the windings form a unique "truncated pie wedge" shape.

These coils then have their free ends bent into tabs. These tabs allow the coil ends to be welded or brazed to interconnect bars (or wires).

Figure 8B:
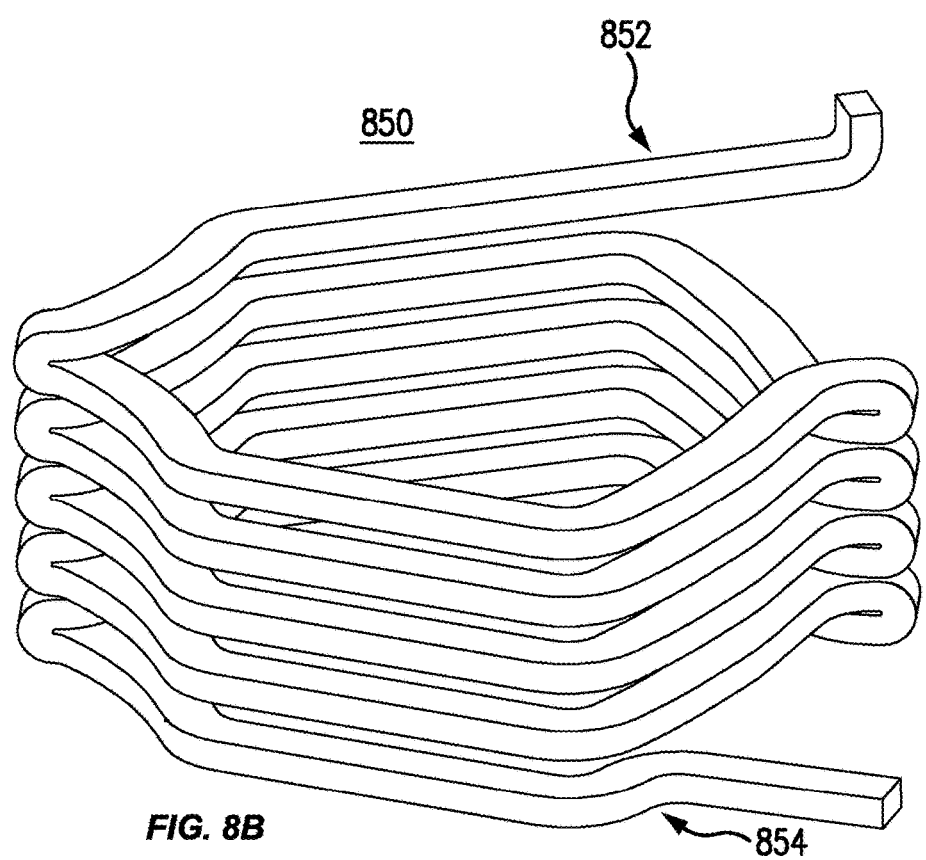

FIG. 8B illustrates a coil 850. Coil 850 is similar to coil 800 in FIG. 8A. However, coil 850 has ends 852 and 854 that do not return to the same lateral position, but instead extend in a radial direction away from the rotor. This has the effect of changing how interconnects may be welded to connect different phases of the stator winding.

Figure 9:
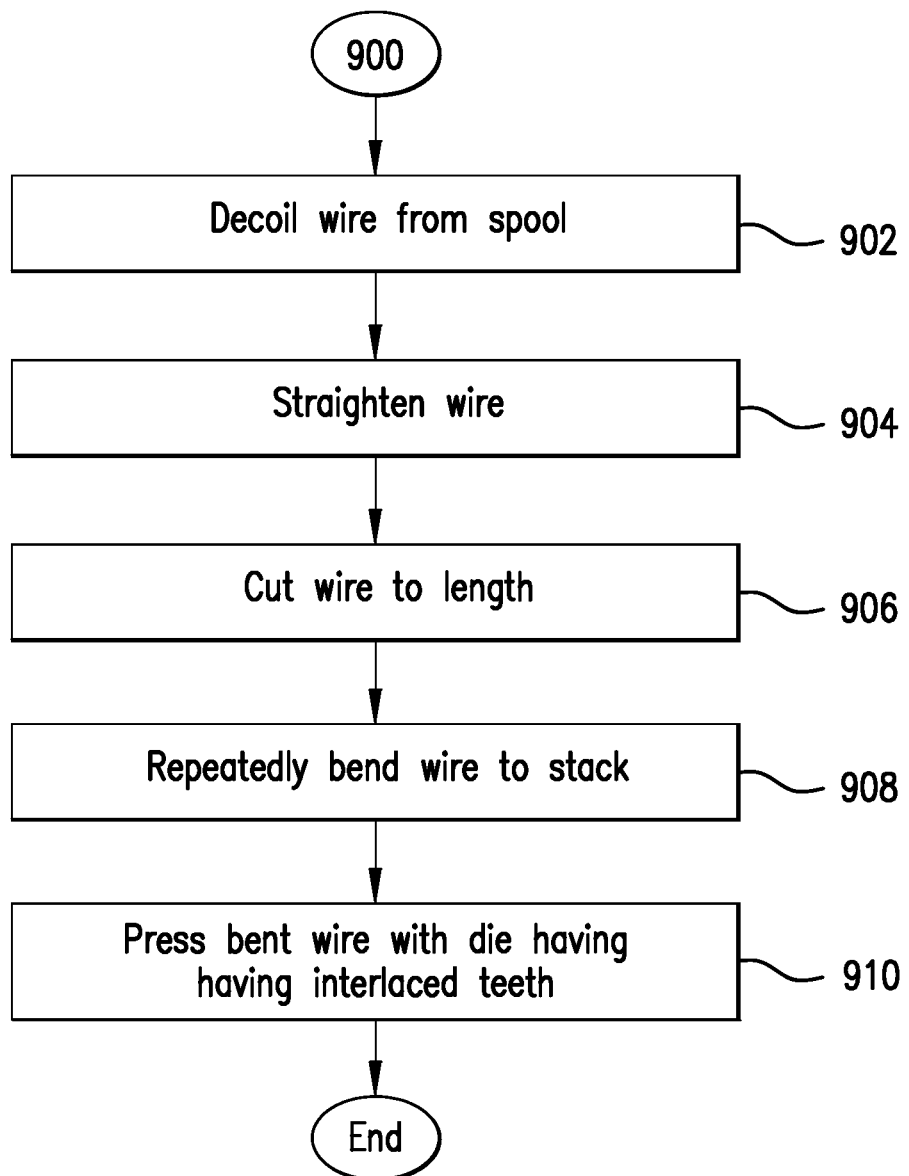
FIG. 9 illustrates a method for manufacturing a coil for a stator winding according to some embodiments.

FIG. 9 illustrates a method 900 for manufacturing a coil, such as coil 800 in FIG. 8A, for a stator winding according to some embodiments. This is one embodiment. In other embodiments, the coils and their interconnections can be made with additive manufacturing techniques. Also, the coils and/or their interconnects may be cast. After casting or 3D printing, the metal may be dipped into a substance that serves as insulation. For illustrative purposes, method 900 is described with respect to examples in FIGS. 10A-K. FIGS. 10A-K are diagrams illustrating an example operation for the method for manufacturing the coil.

Method 900 begins by de-coiling wires from a spool at step 902. This is illustrated in diagram 1000 in FIG. 10A. Diagram 1000 shows a spool 1002 with two pulleys 1006 and 1008. Wire 1004 is spun out from spool 1002 around pulleys 1006 and 1008. Pulleys 1006 and 1008 are friction devices that serve to keep tension on wire 1004 to prevent overrunning as wire 1004 un-rolls from spool 1002.

Figure 10A:
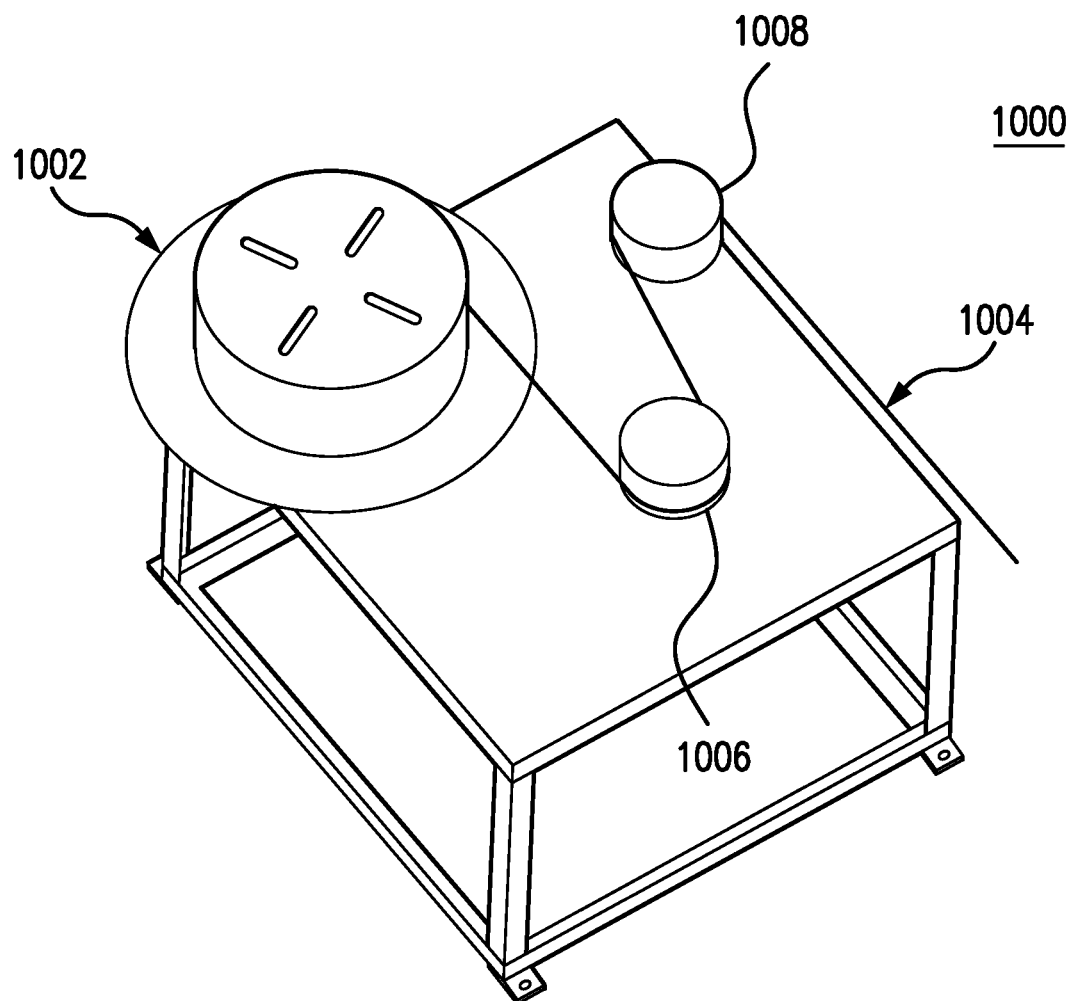
Figure 10B:
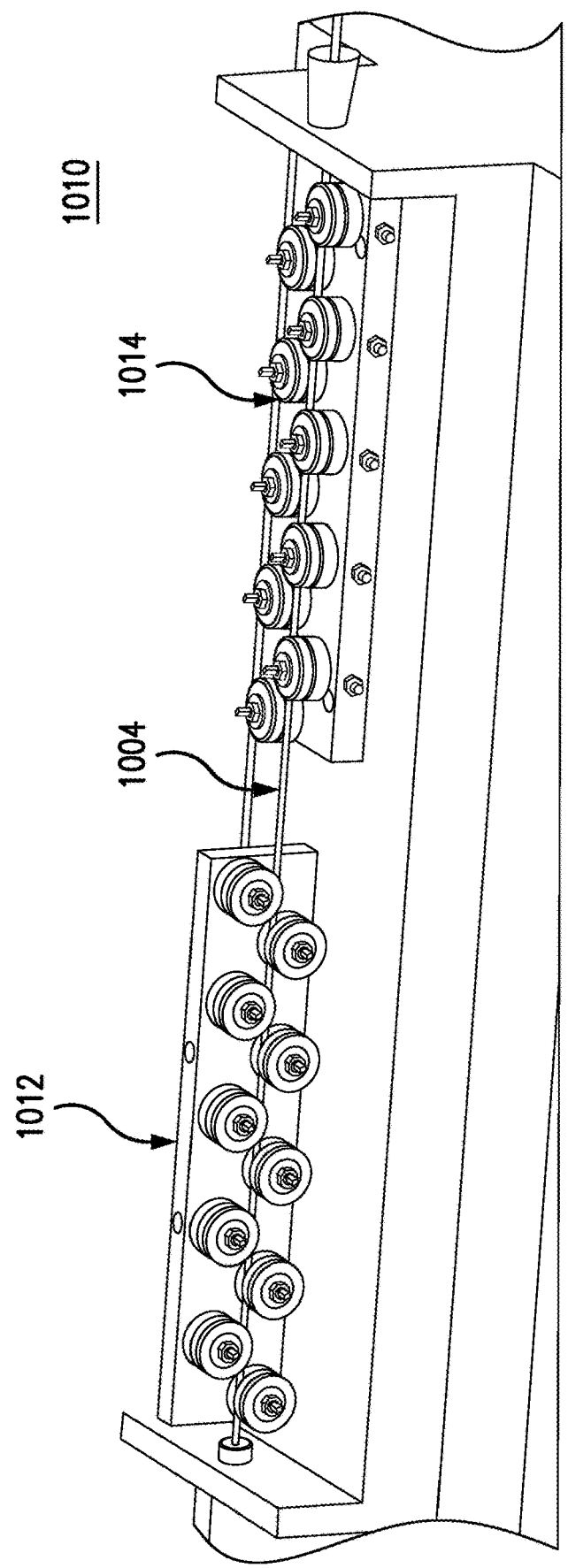
Figure 10C:
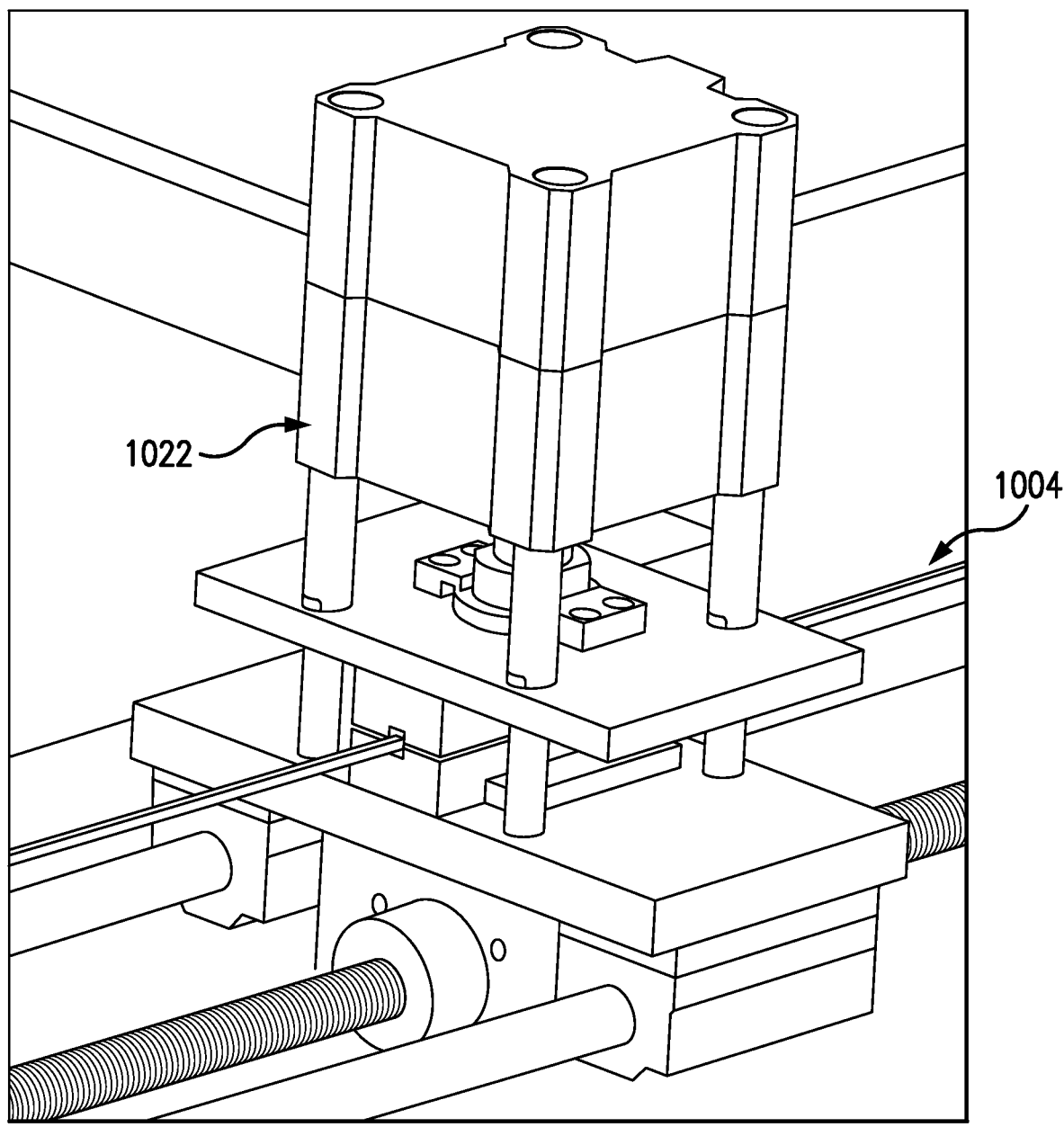
Figure 10D:
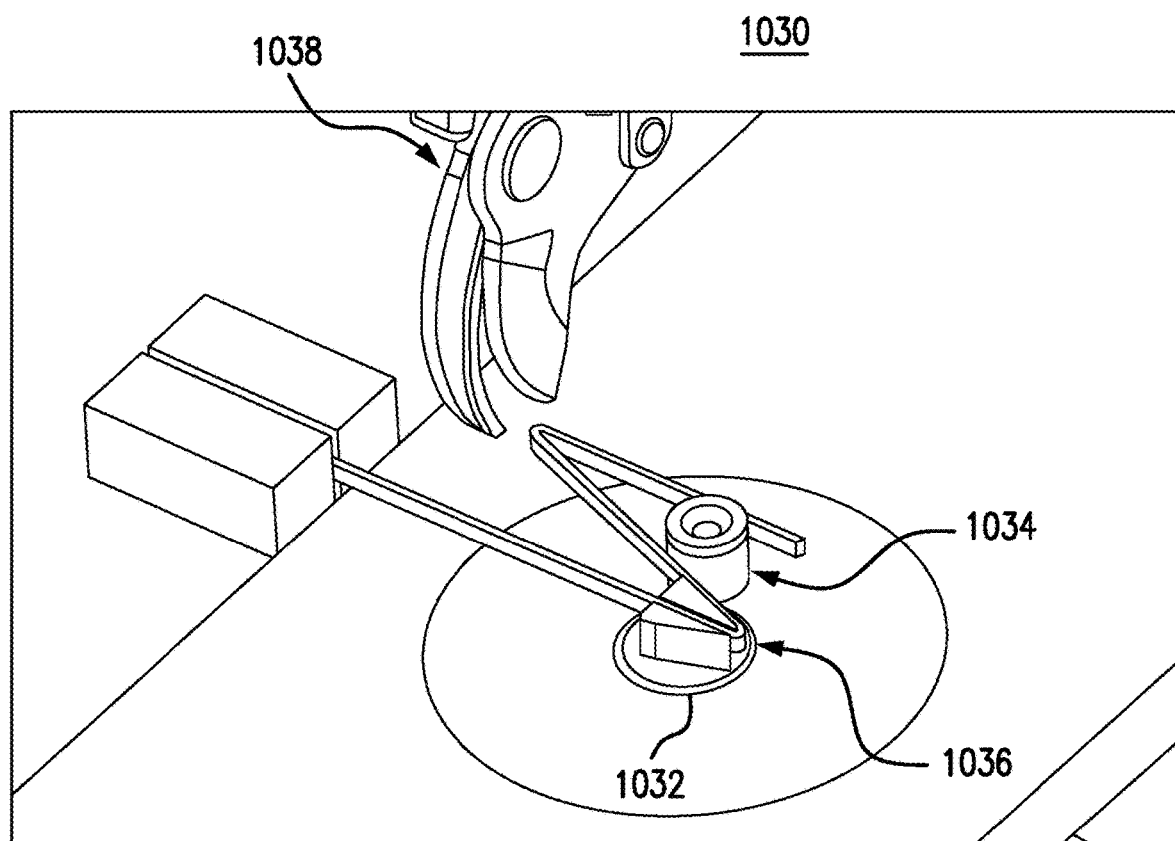
Figure 10E:
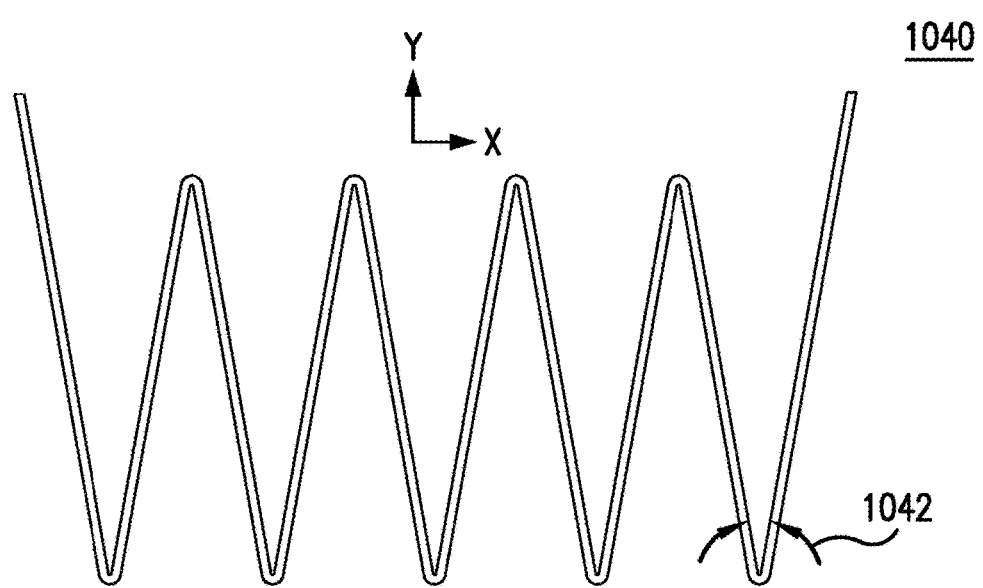
Figure 10G:
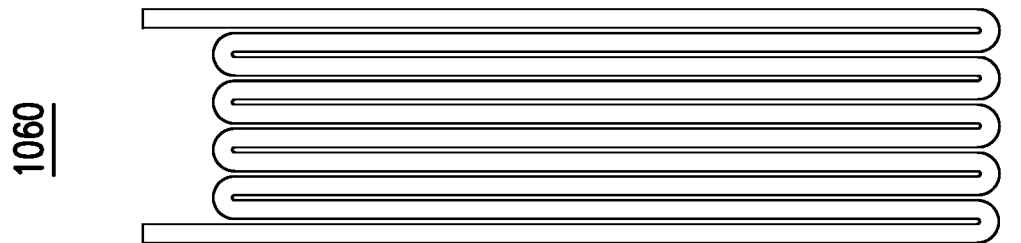

After de-coiling, the wire is straightened at step 904 as illustrated in diagram 1010 in FIG. 10B. To straighten the wire, it is passed through a two plane straightener. The first plane is illustrated by straightener 1012 and the second plane is illustrated by straightener 1014. Each straightener includes a plurality of rollers oriented on either side of wire 1004 to straighten the wire along its respective x or y dimension. In this way, straighteners 1012 and 1014 eliminate the set of the coil and present consistent material to follow on coil forming devices.

After the wire is straightened, the wires are cut to length at step 906. To measure and feed the appropriate length of wire to subsequent processes, a feed unit is illustrated in diagram 1020 in FIG. 10C. Diagram 1020 includes a feed unit 1022. The unit 1022 is servo controlled to feed each leg of the coil to the desired length. The length of the coil can be, e.g. programmed using the operator HMI touchscreen, or it can be saved in the controller memory or programmed via a networked control supervisory program (such as a CODESYS, TwinCAT, RSLogix, or DeltaV supervisory control program). The length of the coil may be determined based on the size of the turn, the size of the stator teeth, the number of teeth the coil encapsulates, and the number of turns in the coil. Turning to diagram 1030 in FIG. 10D, the wire may be cut using a pair of wire cutters 1038.

Returning to method 900, the wire is bent into a stack-up in an axial direction (along an axis) of the machine in step 908. To form the stack-up, the wire is fed through a bend unit shown in diagram 1030 in FIG. 10D. The bend unit is servo controlled for precise degree rotation. The bend unit includes a following die 1032. Following die 1032 has an angle 1036. Once the wire has been advanced to a sufficient degree, that is, the amount of wire needed to complete half a turn, a cam 1034 presses the wire against die 1032 forming a band having an angle 1036. The result is shown in diagram 1040 in FIG. 10E, which shows a wire having a zigzag pattern with a number of angles, such as angle 1042.

Figure 10F:
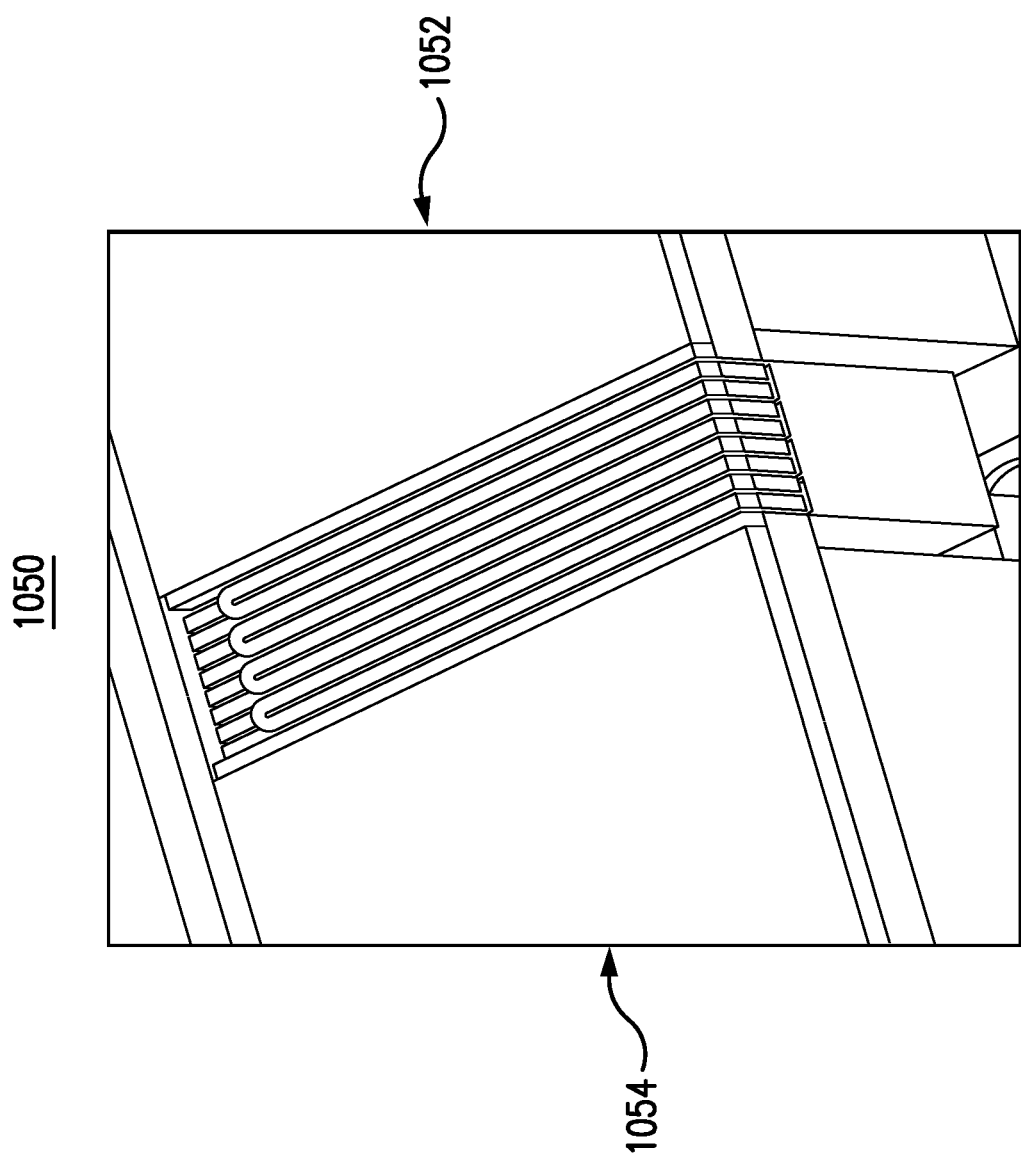
Figure 10I:
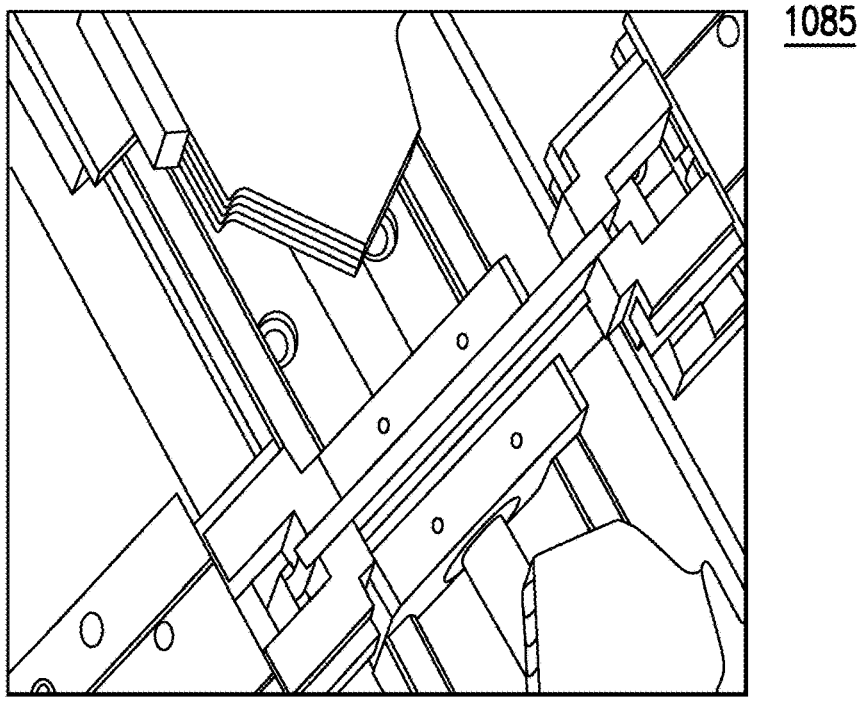
Figure 10J:
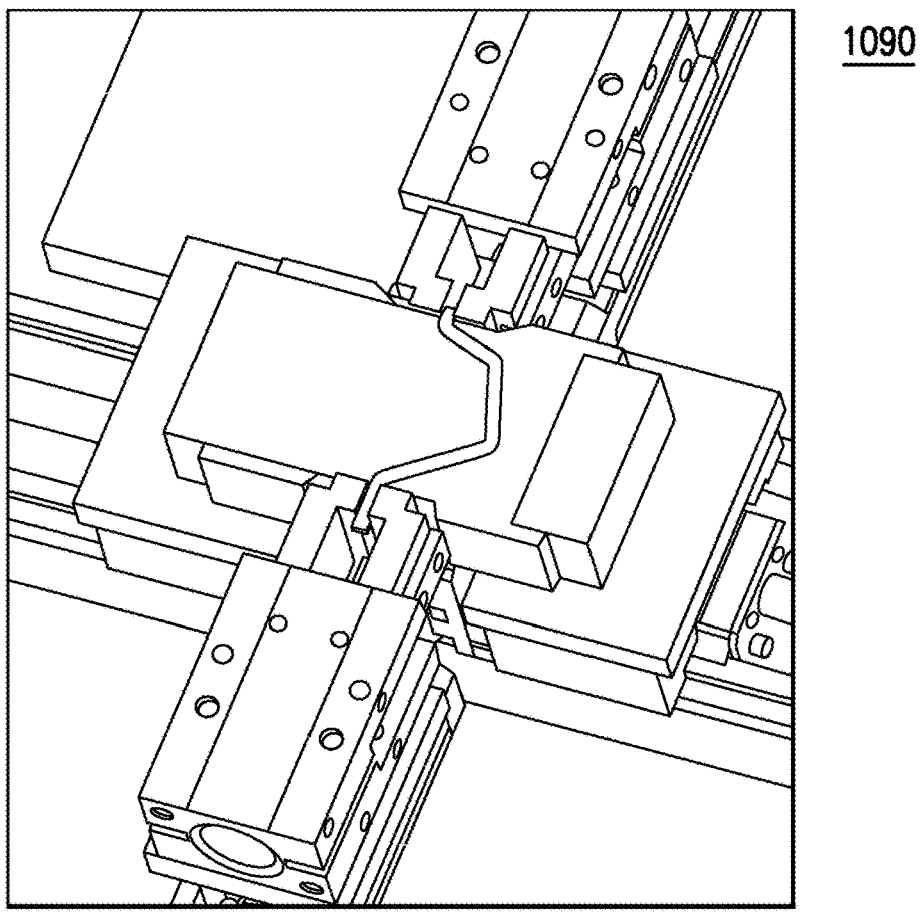
Figure 10K:
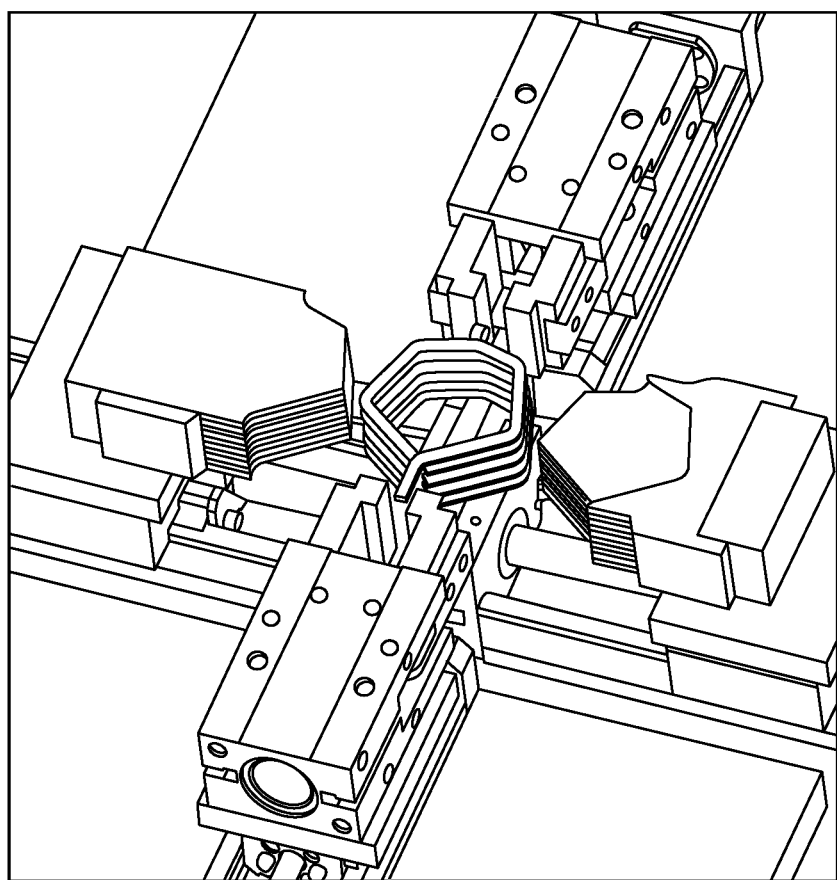

The bent wire with a zigzag pattern shown in diagram 1040 is then pressed into a stack-up as shown in diagram 1050 in FIG. 10F. The result is shown in diagram 1060 in FIG. 10G. The stack up is bent back and forth in an axial direction. The number of bends corresponds to the number of electrical turns in the coil. For example, the stack up may include two layers for every turn. Thus, in the case where the coil has five turns, the stack up shown in diagram 1060 has 10 layers, and is bent nine times.

Returning to FIG. 9, the bent, stacked wire is transversely pressed with a die having a pattern of alternating forming teeth at step 910. Such a press is illustrated in diagram 1070 in FIG. 10H. Diagram 1070 illustrates a forming unit. The forming mechanism may have clamp dies 1072A and B that hold the stack-up in place. Clamps 1072A and B may be controlled by servo systems 1074A and B. Clamps 1072A and B may hold the ends of the stack, when oriented in a radial direction.

With the wire stack clamped on both longitudinal locations (at the end turn folds), the pressing dies 1076A and B may press the wire stack in the transverse direction, corresponding to the direction of rotation of the machine. As the press pushes in, the clamp moves in as well to relieve the stress in the radial direction caused by pressing dies 1076A and B. Pressing dies 1076A and B are powered by servo mechanisms 1078B. Pressing dies 1076A and B have alternating sets of forming teeth. The shape of these forming teeth are designed such as to form the wire to fit over at least one tooth of the stator. How the alternating sets of forming teeth create the form of the part during pressing is illustrated in greater detail in diagrams 1085, 1090, and 1095 in FIGS. 10I-K.

Figure 11:
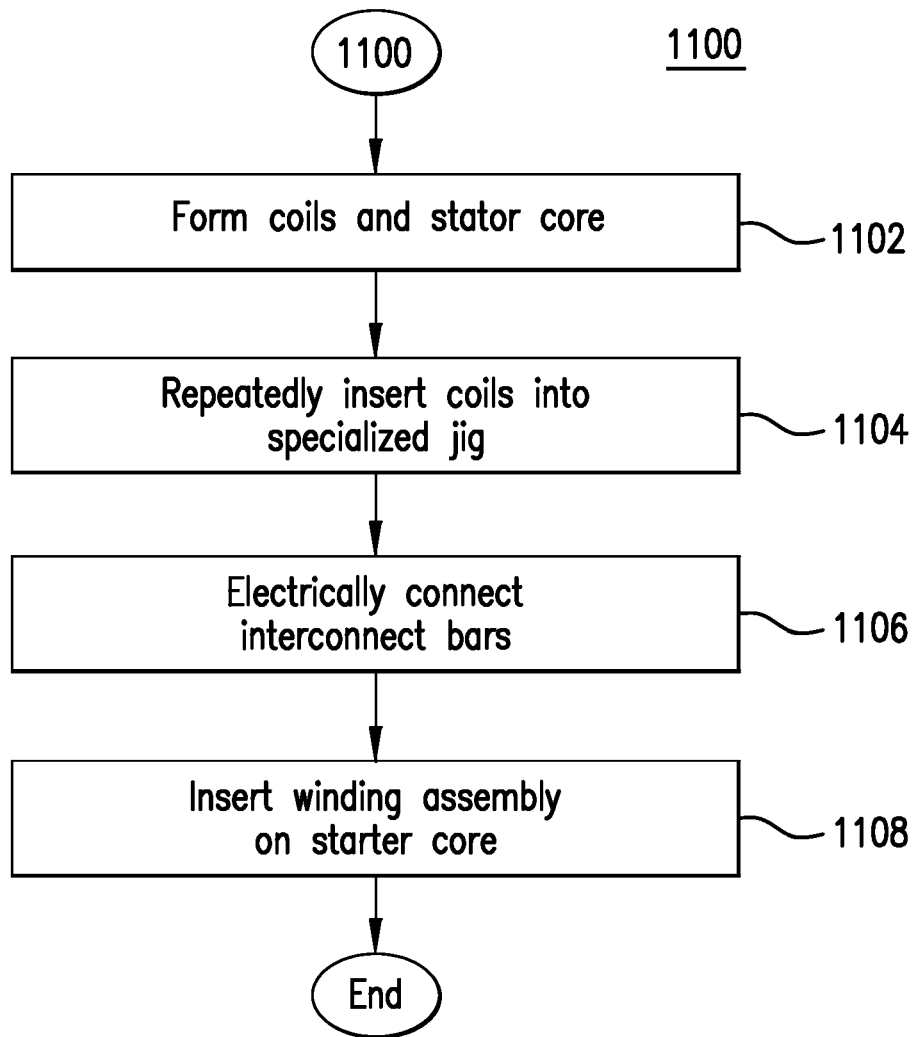
FIG. 11 illustrates how coils are interlaced, interconnected, and inserted on an open stator.

FIG. 11 illustrates a method 1100 describing how coils are interleaved, interconnected, and inserted on an open stator.

Method 1100 begins at a step 1102 by fabricating coils and stator cores. The coils may be fabricated as described above with respect to FIG. 9. As mentioned above, the stator core could be made of a laminated silicon steel or a soft magnetic composite (SMC) material. As described above, if the stator core is made of SMC, it may be manufactured by repeatedly compressing the SMC powder it into a die having the correct shape until it reaches needed density. When such a density is achieved, the green part is then exposed to the two-part heat and steam treatment outlined above.

After the coils are formed, a set of them are inserted into a specialized jig at step 1104. At step 1104, the coils are inserted, one at a time, into a jig where they are held in correct position to be welded to interconnects and then later fit into the stator as an assembly. This is illustrated in FIGS. 12A-B.

Figure 12A:
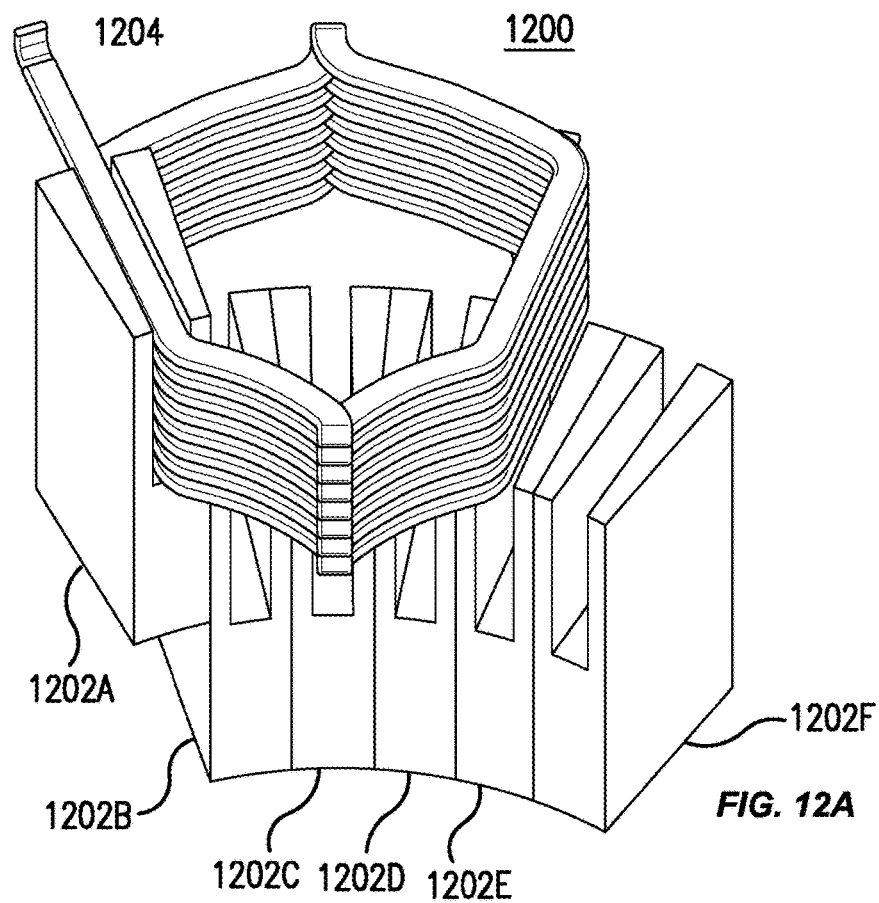
FIGS. 12A-D illustrate two coils lapped on one another with interconnects welded on to joints.
Figure 12B:
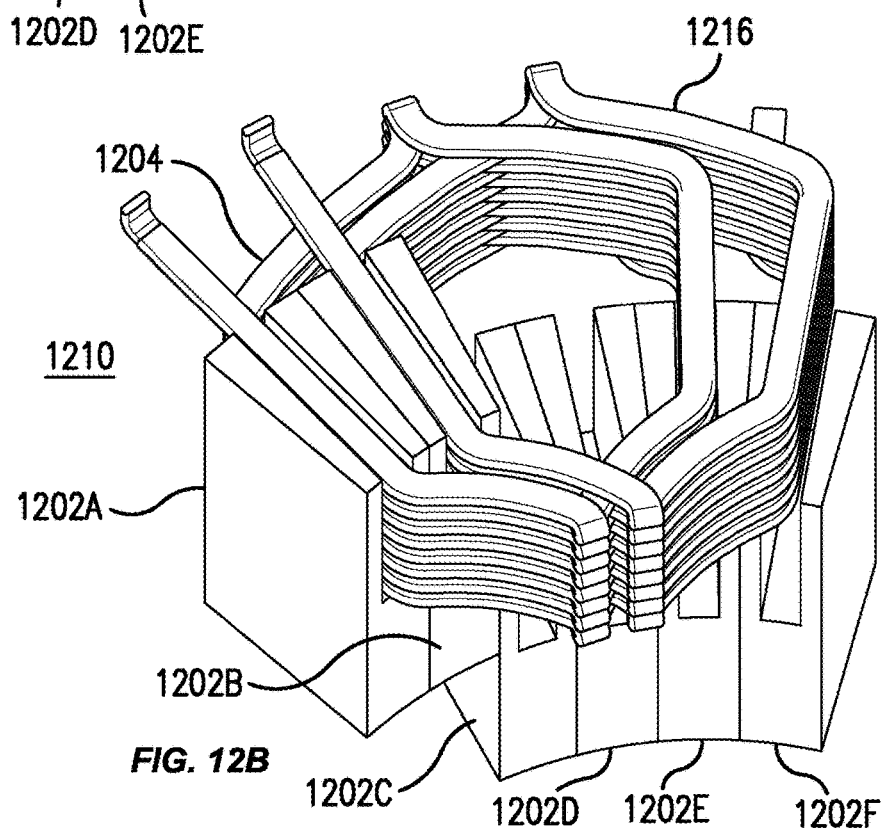

FIGS. 12A-B illustrate using a specialized jig to assemble the coils into a winding. FIG. 12A is a diagram 1200 showing a number of columns 1202A-F, which are part of the specialized jig. The jig may have a number of columns corresponding to the number of coils. For example, for a winding that has 36 coils, the jig may have 36 columns.

Each of columns 1202A-F may have a clamp that holds a coil, such as coil 1204, in place. Each of columns 1202A-F can extend and retract to allow coils to be slid or rotated into their laps or interlaced position. In diagram 1200, column 1202A is extended and clamps a coil 1204. Coil 1204 may be the first coil of the winding assembled. All the other columns (e.g., 1202B-F) are retracted.

Turning to diagram 1210 in FIG. 12B, another coil 1216 is slid and rotated within the plane of the rotation of the machine to interleave with alternating turns from coil 1204. Coil 1204 laps over coil 1216. Coil 1216 is moved to the correct axial location and then rotated into the existing coil group. Once coil 1216 is positioned correctly, it is held stationary by column 1202B, which clamps it in place. After coil 1216 is in place, column 1202B is extended to clamp coil 1216 in place. The process is repeated for each coil until all coils in the winding are in place. The columns may extend repeatedly as each coil is positioned and may resemble teeth of the stator. In this way, the columns may hold the coils in place.

Returning to FIG. 11, once all of the coils are inserted, the coils are then electrically connected to the interconnect bars/wires by (either laser, electrical resistance, or ultrasonic) welding at the coil tabs at step 1106. The welding is discussed below in greater detail with respect to FIGS. 12C-D.

After interconnect welding, the coil assembly is then finally inserted into the stator at step 1108. This may be done by first installing the slot insulation (Kapton film and/or Nome 410/411 paper and/or bonded Mica tape) over the windings and tack gluing them into place while the stator winding rests on a locating table. The slot insulation protects wire insulation from damage when windings are overlaid and improves insulation between stator phase coils and the conductive stator, which can be at ground potential. The slot insulation, once fully potted, also dampens vibration and restrains the movement of the coil end turns.

The stator core is then picked up by a retractable mandrel or arbor that, respectively, would contact the inner or outer base portion of the stator, and would then be inserted upside down over the coil assembly until it fully seats against the jig table face. The stator manipulator is then released and removed from the stator. Once the stator is seated, the stator is compressed/sandwiched against the jig table face by a plate on the back side, and this compression jig is then used to transport the coil assembly to the potting step, where the stator and coil assembly are potted with, e.g., a high temperature epoxy or polyimide potting. Prior to this step, the windings may also have a Nomex or Kevlar tow lacing applied to further restrain movement and strengthen the assembly.

Once the stator core is vacuum impregnated with varnish and/or is potted with a filled or unfilled resin (e.g. high temperature epoxy), and after said resin or potting has cured, it is then released from the sandwich jig, has dimensions checked (via, e.g., CMM, Go/No-Go gauges, optical inspection, height comparator, etc.) and may have finish machining operations applied as needed to, e.g., true the axial faces of the stator, size to final dimension, etc. Once these operations are complete, the stator is ready to again have the manipulator inserted to ready it for placement into an endbell. Shims for the stator are first inserted into the endbell, and the stator is then placed atop of these shims and is then affixed to the endbell by the appropriate fasteners.

Figure 12C:
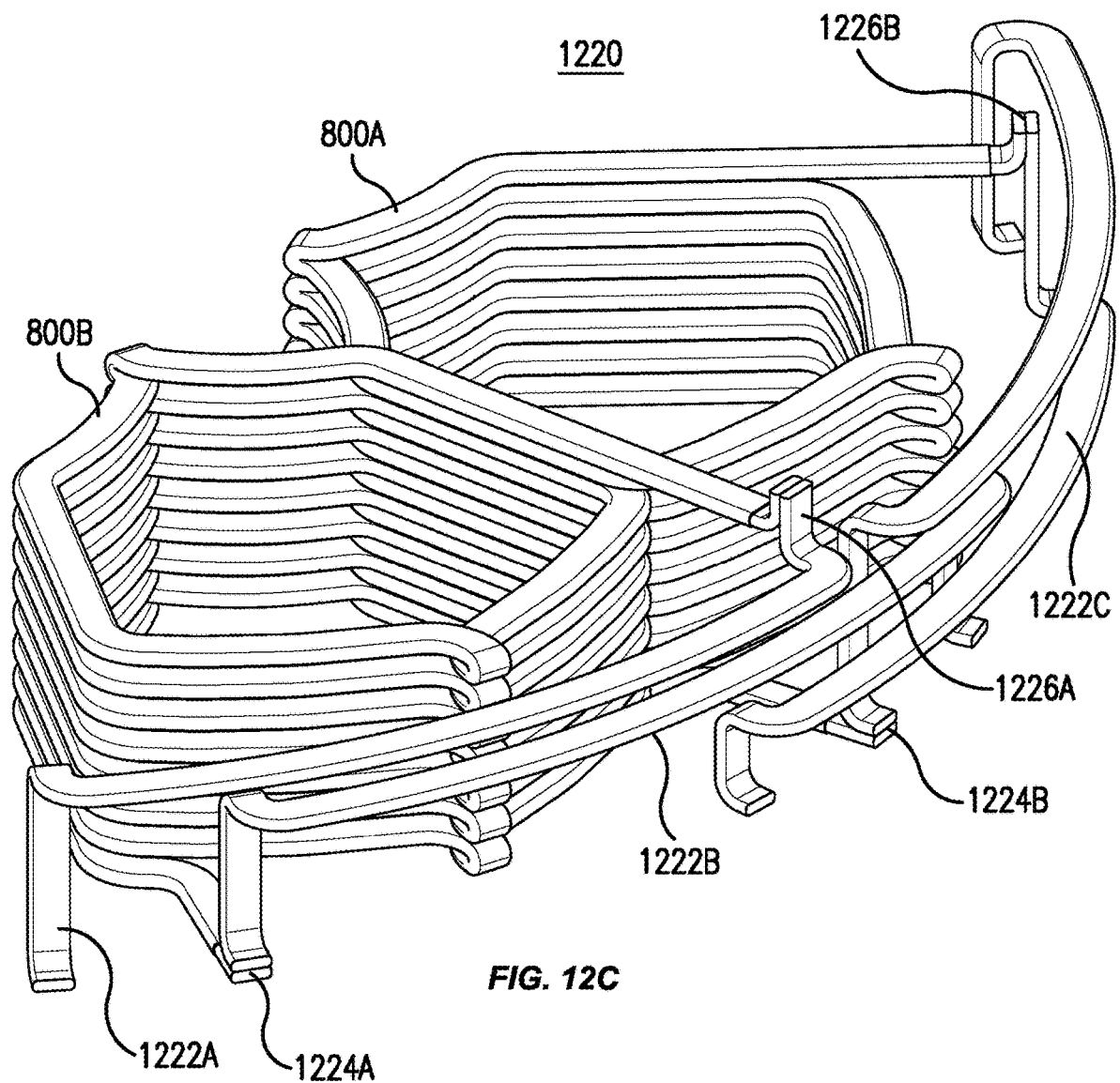

FIG. 12C illustrates a diagram 1200 with two coils 800A and 800B lapped on one another with interconnects welded onto joints. For example, coil 800A has interconnect 1222C welded at an upper joint 1226B. Upper joint 1226B represents the end of the coil closest to the rotor. Coil 800B has interconnect 1222B welded at a lower joint 1224A. Lower joint 1224A represents the end of the coil farthest from the rotor. The joints may be welded by first removing insulation in the desired region, perhaps by laser etching or mechanical abrasion (sanding or scraping), and then welding the interconnects to the coil end. The interconnects may be rectangular wire having the same dimensions as the wire used for the coil, or larger dimensions to decrease losses. The interconnects may be shaped to be joined with coils from the same phase and to extend the phase circuit around a perimeter of a stator winding. Laser welding, resistance welding/brazing, ultrasonic welding, or manual TIG or gas torch welding or brazing may be used as the joining method.

Figure 12D:
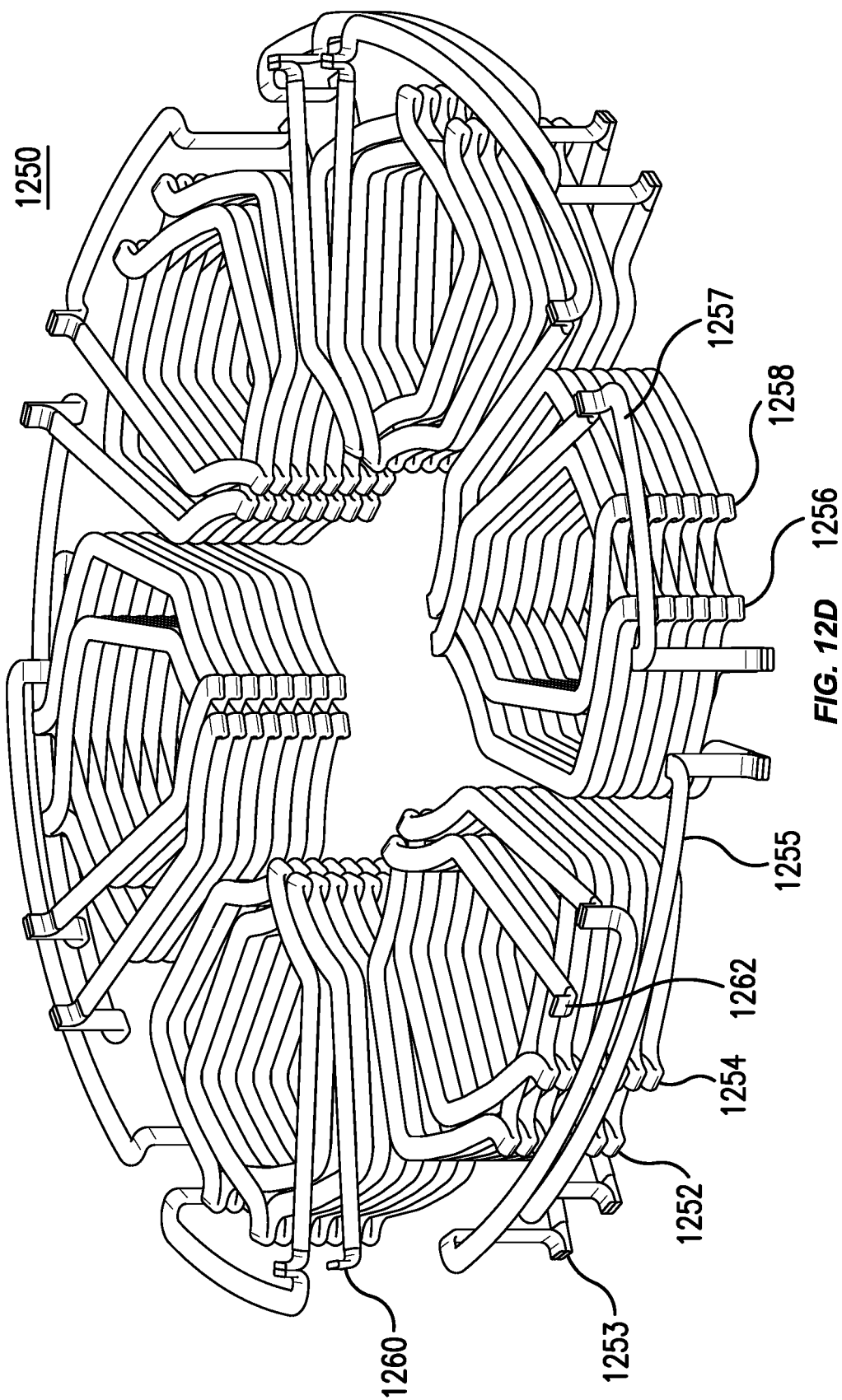

FIG. 12D illustrates a diagram 1250 that shows a single phase of a stator winding interconnected together. Adjacent coils 1252 and 1254 are connected with interconnects 1253. The pair of adjacent coils 1252 and 1254 are connected with another adjacent pair of coils 1256 and 1258 via a longer interconnect 1255. This pattern continues to join all of the applicable coils (in this instance, 12 coils) into the phase group (there are 3 phase groups in the overall stator coil assembly). Joints 1260 and 1262 represent points that are loaded with a periodically varying electrical signal as illustrated in FIG. 13.

Figure 13:
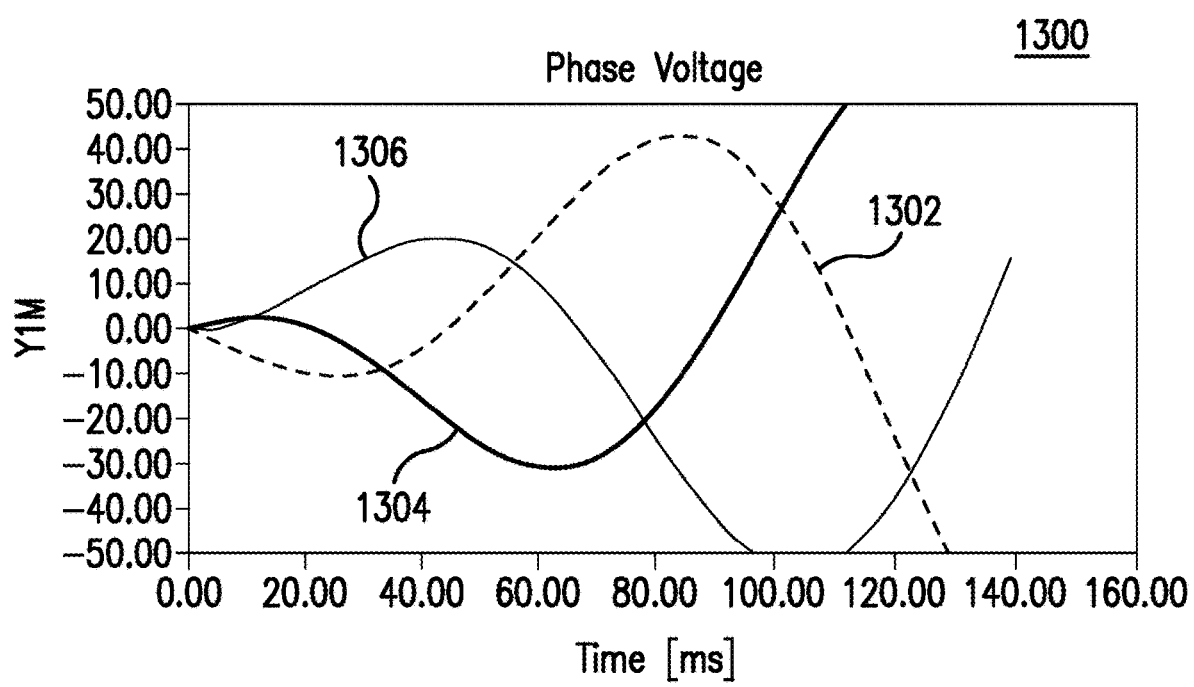
FIG. 13 illustrates example signals applied to three phases of the stator coils.

FIG. 13 illustrates a diagram 1300 showing example signals applied to three phases of the stator coils. The signals shown here are illustrative of a three phase machine. In other embodiments, a different number of phases may be present. In particular, diagram 1300 shows a signal 1302, a signal 1304, and a signal 1306. Each of signals 1302, 1304, and 1306 may be periodically varying electrical signals, such as sine waves. The sinusoidal signals 1302, 1304, and 1306 are offset by 120° of phase from one another. In embodiments having a different number of phases the offsets may be different. By varying the amplitude, frequency, and absolute phase of these signals (but not their relative phase angle relationship), operation of the electric motor may be controlled.

The electromagnetic torque depends on stator currents and slip. Slip is the ratio between the shaft angular velocity and the synchronous magnetic field angular velocity. Slip is a result of mechanical load applied to the shaft. In general, the more voltage that is applied to the stator winding, the more current is generated and the more torque created. More slip has the same effect. When the load applied to the shaft is increased the slip is increased too. More currents are induced in the rotor winding and more currents are produced in the stator winding as the impedance of the rotor-stator equivalent circuit reduces as the mechanical loading increases.

For example, increasing the voltage of input signals 1302, 1304, and 1306 results in more current passing through each phase of the stator winding. More stator current in turn produces more magnetic flux, and more magnetic flux induces more rotor currents and hence more torque, as will be described below in more detail with respect to FIGS. 22A-D. Thus, given a constant slip value, more voltage in signals 1302, 1304, and 1306 will produce more torque.

However, if the torque applied to the motor is changed while the voltage is held constant, the slip value will change. This is because, given a constant voltage, a reduced externally applied torque will result in an increased rotational velocity (e.g., rotations per minute) of the rotor. Thus, if the frequency of the signals passing through that stator winding is held constant, the slip will decrease because the shaft is rotating more quickly. Decreased slip will result in decreased rotor currents and torque generated.

If more external mechanical load is applied (and the voltage and frequency of the signal applied to the stator winding is held constant), the shaft's rotational velocity will decrease and the slip will increase, generating more torque. To avoid a decrease in speed, rotor overheating, or reaching the rotor's tripping point, the voltage and frequency of the signal in the stator winding can be increased. In this way, a circuit that generates the signals for the stator winding can control torque and rotational speed by calculating an appropriate voltage and frequency of the signal in the stator winding based on a rotational speed of the shaft detected based on a position sensor. The circuit may be configured to calculate the appropriate voltage, phasing/commutation, and frequency to minimize the heat generated in the motor.

There may be situations when the rotor is locked; that is, the rotor is not spinning at all. This may occur, for example, when a vehicle is just beginning to move. When a position sensor detects a locked rotor condition, the voltage and frequency may be slowly ramped up from zero to produce the needed torque for adequate acceleration while minimizing power consumption and thus heat production.

When a position sensor detects movement from a locked rotor, ideally the voltage and frequency would ramp up as a linear function of shaft speed, keeping electromagnetic torque at the needed level to accelerate to the needed speed.

In an embodiment, the circuit that generates the signals applied to the stator winding may be an inverter that converts DC voltage from, for example, a battery. In another embodiment, the signals may be generated directly from the 50 or 60 Hertz signals found on the power grid. Embodiments using grid-tied power may be preferred for applications involving, for example, household appliances.

Mounting a Stator to an Endbell

Figure 14:
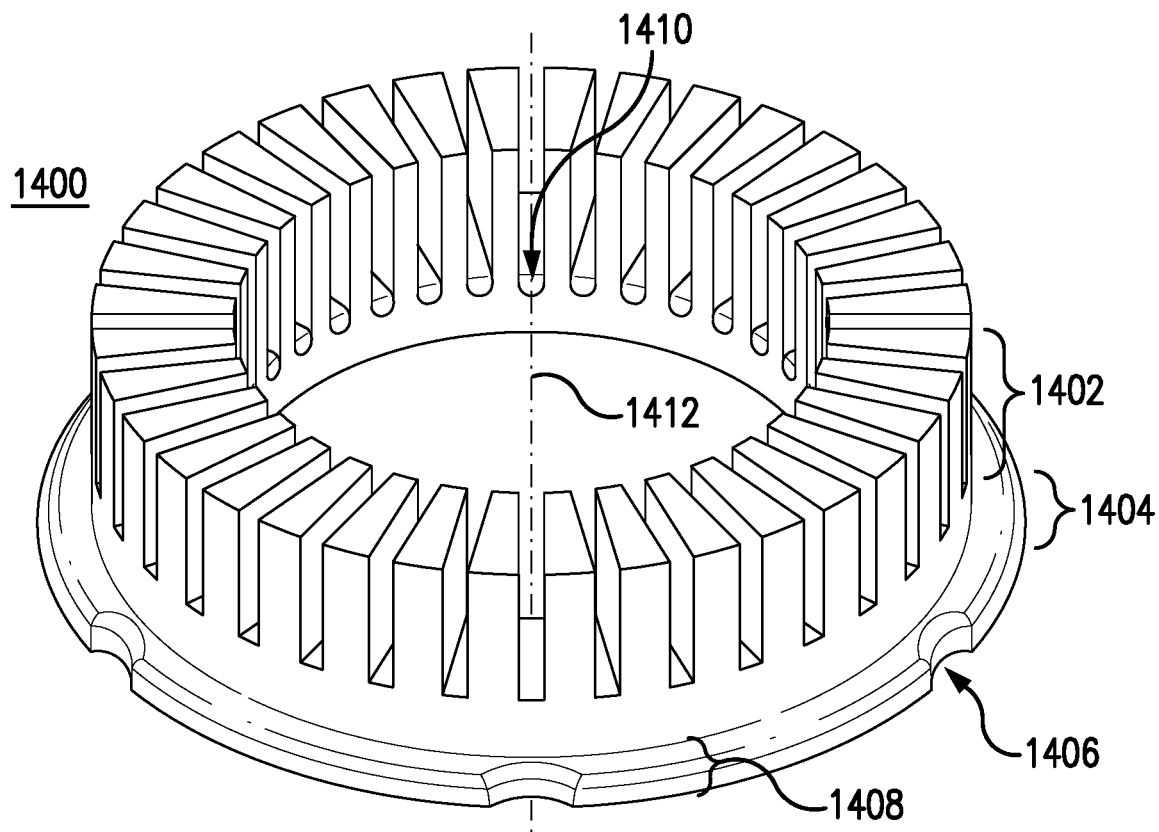
FIG. 14 illustrates a stator core manufactured from soft magnetic composite according to some embodiments.

FIG. 14 shows a stator core 1400. Stator core 1400 may be a unitary structure or may be formed of layers. For example, stator core 1400 may be made of SOMALOY to reduce eddy currents in stator core 1400. Stator core 1400 may also be formed from laminated layers of steel, iron, or other magnetic materials. The use of laminated layers of magnetic materials may also reduce losses due to eddy currents during operation of the motor.

In some embodiments, teeth 1402 extend from a base 1404 of stator core 1400. Teeth 1402 may have straight, flat sides and may narrow inwardly as one moves in the radial direction toward a center point of stator core 1400. For example, tooth 1402 may be narrower nearer axis of rotation 1412 and may be thicker further from axis of rotation 1412. In some embodiments, teeth 1402 may widen at the top (which is axially away from the base), configured to both retain windings 116A-B and to reduce magnetic flux density spikes. The space between adjacent teeth 1402 defines slots 1410. Slots 1410 are configured to receive windings 116A-B. A retaining lip 1408 may extend from base portion 1404.

Retaining lip 1408 is configured to mate with additional structural elements to retain stator core 1400, for example, in an endbell 1500 mounting as described further below. Stator 1400 may also be retained using notches 1406 configured to receive fasteners. In some embodiments, notches 1406 may be holes or voids cut into base 1404 or retaining lip 1408.

Figure 15:
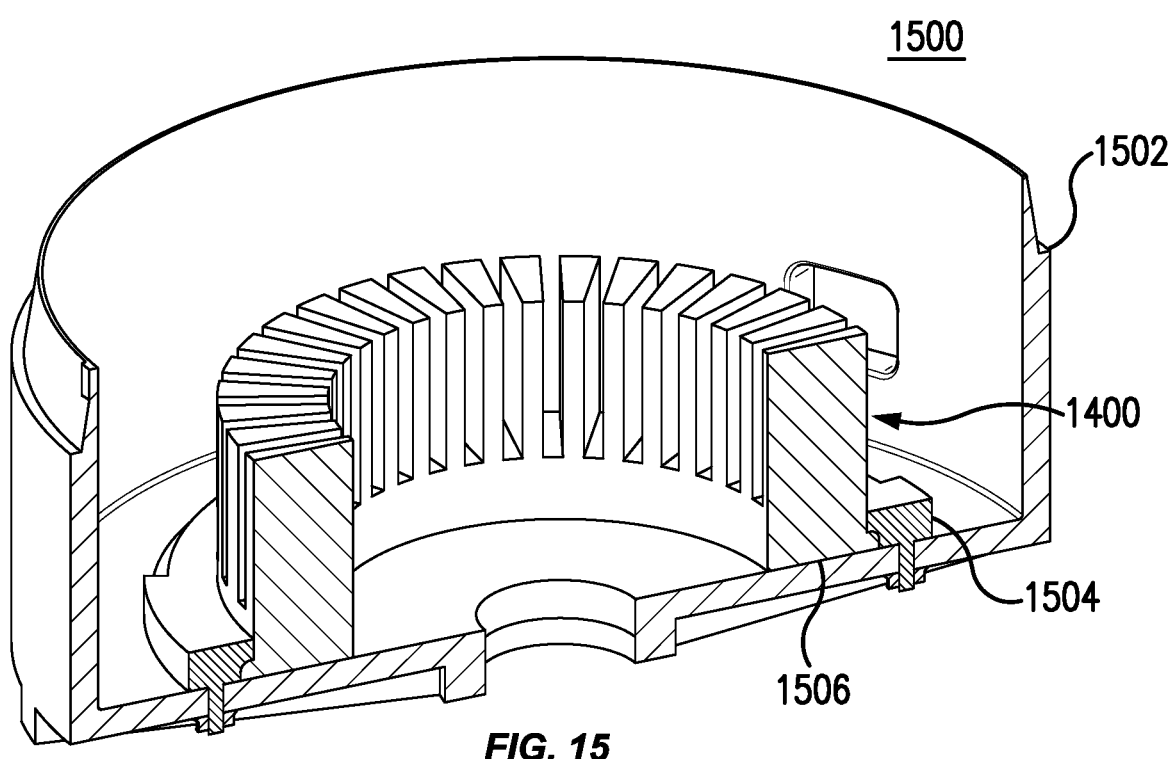
FIG. 15 is a cross-section illustrating how the stator core is mounted onto an endbell of a rotating electrical machine according some embodiments.

FIG. 15 shows stator core 1400 mounted in an endbell 1500. Endbell 1500 has a side wall 1502. Two endbells 1500 may come together to form an endbell housing, as illustrated with endbells 102A and 102B in FIG. 1.

Stator core 1400 is held stationary within endbell 1500 using a bracket 1504. Bracket 1504 attaches to the endbell and engages with the lip of stator core 1400 to hold stationary stator core 1400 in endbell 1500. In an embodiment, bracket 1504 may hold stator core 1400 flush to endbell 1500 as shown at 1506. In another embodiment, shims may be used between stator core 1400 and endbell 1500 to ensure that stator core 1400 is positioned correctly within endbell 1500. By using a bracket 1504 to attach stator core 1400 to endbell 1500, embodiments avoid the need to machine stator core 1400, which could adversely affect its magnetic properties.

Figure 16A:
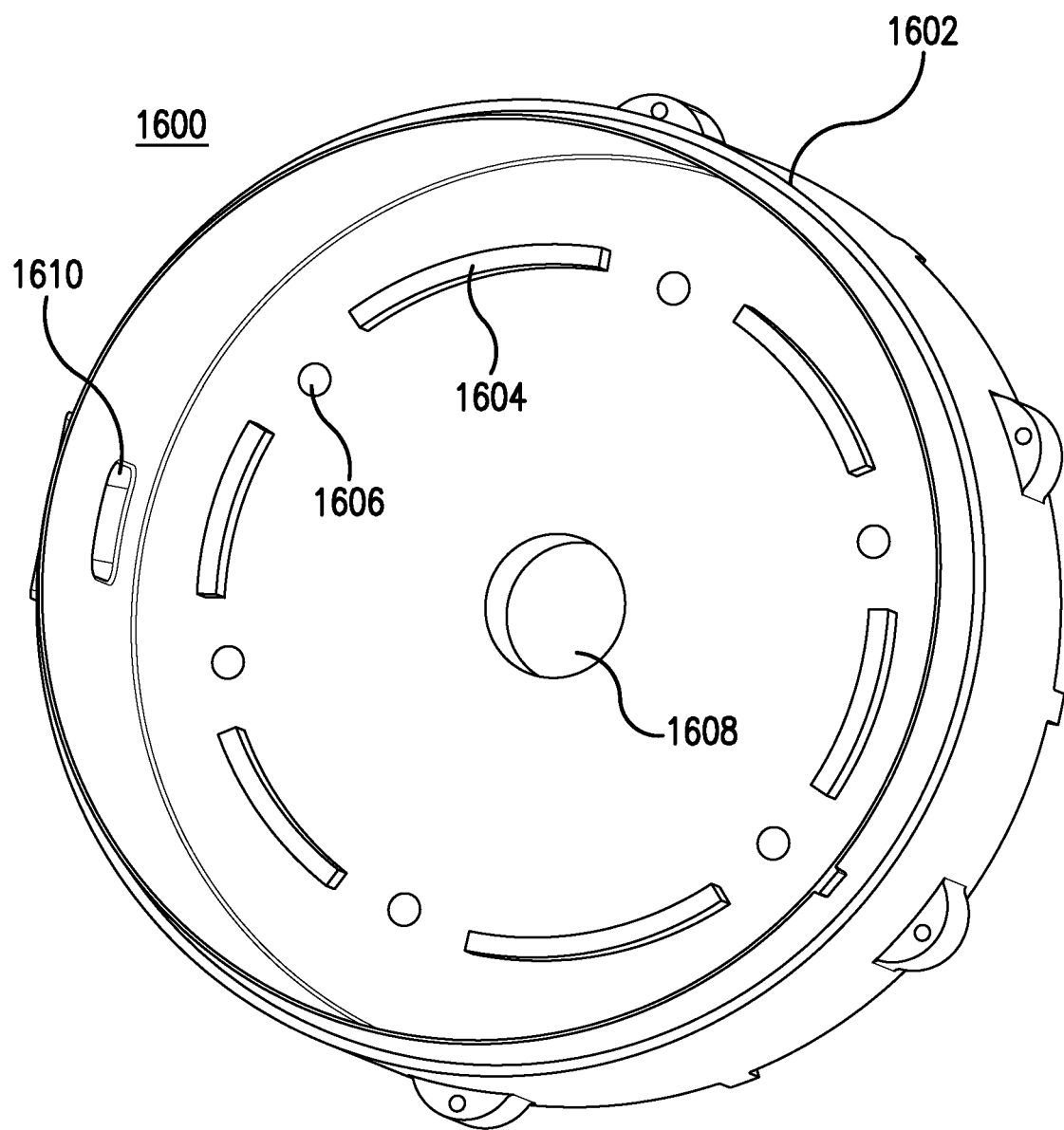
FIGS. 16A-D show in greater detail how a stator can be mounted to an endbell according to embodiments.

FIG. 16A shows endbell 1600. Endbell 1600 has an axle shaft hole 1608 through which a shaft 140 may pass. Endbell 1600 also includes a retaining ridge 1604 and fastener receiver 1606. Retaining ridge 1604 is a guide that allows for proper positioning of bracket 1504 within endbell 1600. To provide proper positioning, retaining ridge 1604 mates with bracket 1504 and interlocks with it at the proper position in the endbell.

In some embodiments, fastener receiver 1606 may be a through-hole in endbell 1600 configured to receive fasteners 1630. Fasteners 1630 may extend through fastener receivers 1606 to an exterior of endbell 1600. A portion of fasteners 1630 on an exterior of endbell 1500 may then be secured using any one of a variety of techniques. For example, fasteners 1630 may be secured using threaded members, such as nuts or screws. As an advantage of using a threaded member, shimming may be used to adjust the position of the stator in endbell 1600. In an alternative embodiment, fasteners 1630 may also be secured using welding.

Figure 16B:
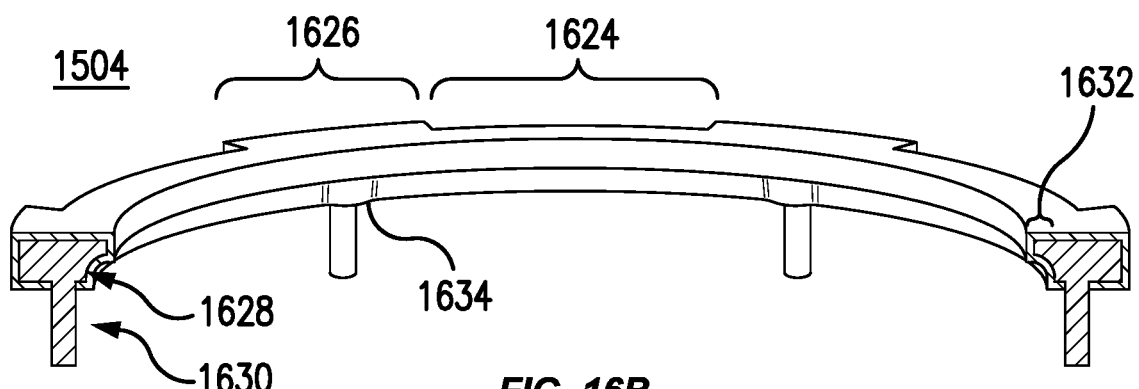

Turning to FIG. 16B, fasteners 1630 may be secured to bracket 1504 to secure stator core 1400 to endbell 1600. Bracket 1504 may have a lip portion 1632 configured to engage retaining lip 1408 of stator 1400. Lip portion 1632 and retaining lip 1408 may be formed such that the two tightly mate. When bracket 1504 is laid over stator 1400 in endbell 1500, bracket 1504's lip portion 1632 may engage retaining lip 1408 and fasteners 1630, which may extend from bracket 1504 and pass through fastener holes 1606.

Fasteners 1630 may be rigidly coupled to bracket 1504. In some embodiments, fasteners may mate with a slot or other member of bracket 1504 such that fastener 1630 does not disengage from bracket 1504. In some embodiments, bracket 1504 couples stator 1400 to endbell 1500 using only a friction connection. The tightening of fasteners 1630 on the outside of endbell 1500 tightens the connection between endbell 1500 and stator 1400 by using a mechanism to secure fasteners 1630 on the exterior of endbell 1500. This connection limits the number of items that could break or otherwise become dislodged during operation, which could interfere with the rotation of the motor.

In some embodiments, bracket 1504 may have a coating 1628 covering a non-ferromagnetic metal. The non-ferromagnetic metal and stator core 1400 may have different thermal coefficients of expansion. The coating between the non-ferromagnetic metal and the lip may be configured such that the stator core remains attached to the endbell at a given operating temperature range of the machine given the different coefficients of expansion of bracket 1504 and stator core 1400. In an embodiment, coating 1628 may be made of vulcanized rubber or other suitable thermoset elastomer.

As mentioned above, endbell 1600 includes a retaining ridge 1604 that mates with bracket 1504. In particular, retaining ridge 1604 mates with an inner portion 1624 of bracket 1504 and is held in place with outer portions of bracket 1504, such as outer portion 1626. Bracket 1504 also has protrusions 1632 that mate with stator core 1400, aligning it to the proper orientation. In this way, bracket 1504 serves to ensure that stator core 1400 lines up appropriately. Stator core 1400 may line up appropriately when respective phases of a stator winding engage with the counterpart phases on the opposite stator in the rotating electrical machine.

Figure 16C:
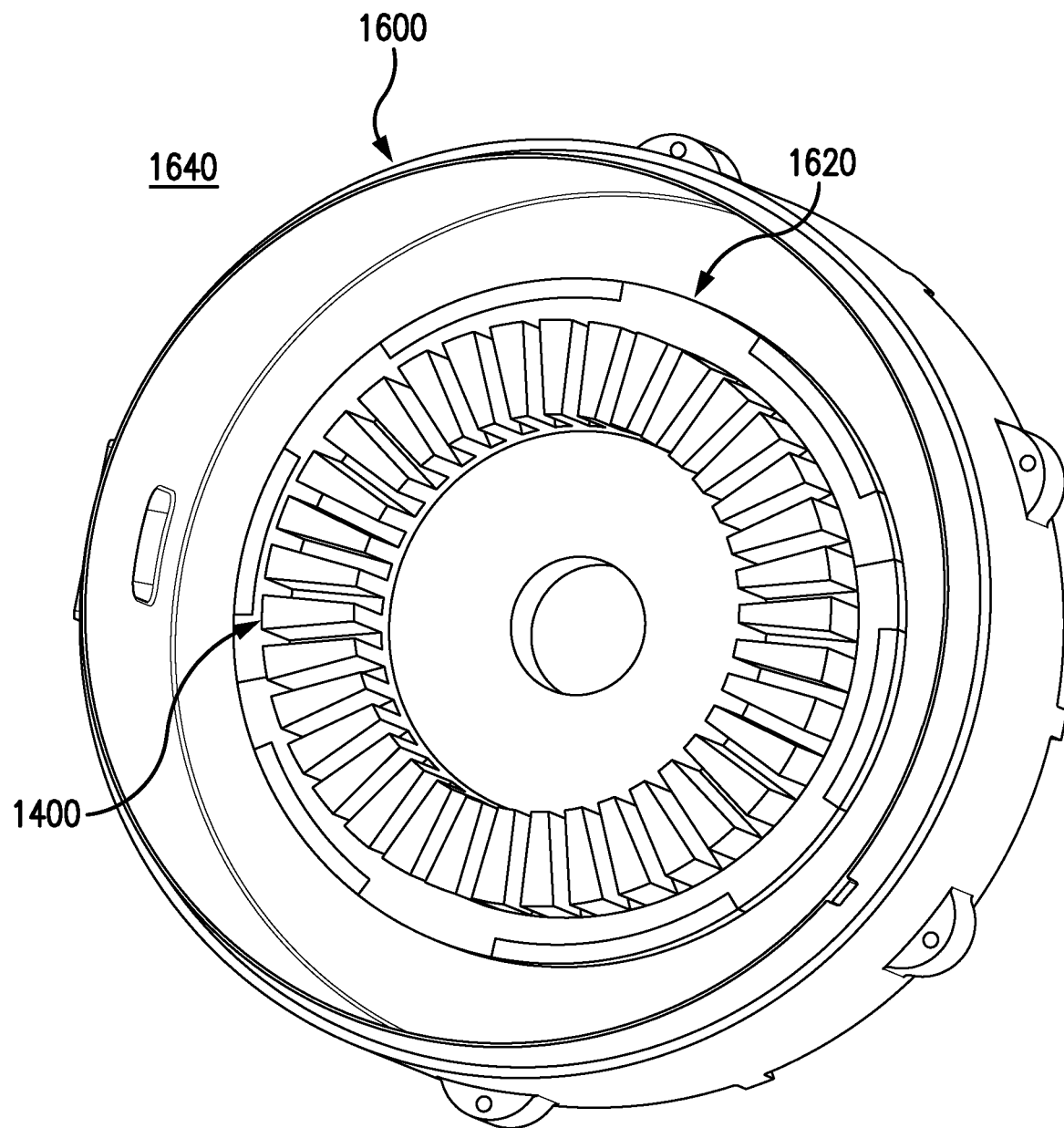
Figure 16D:
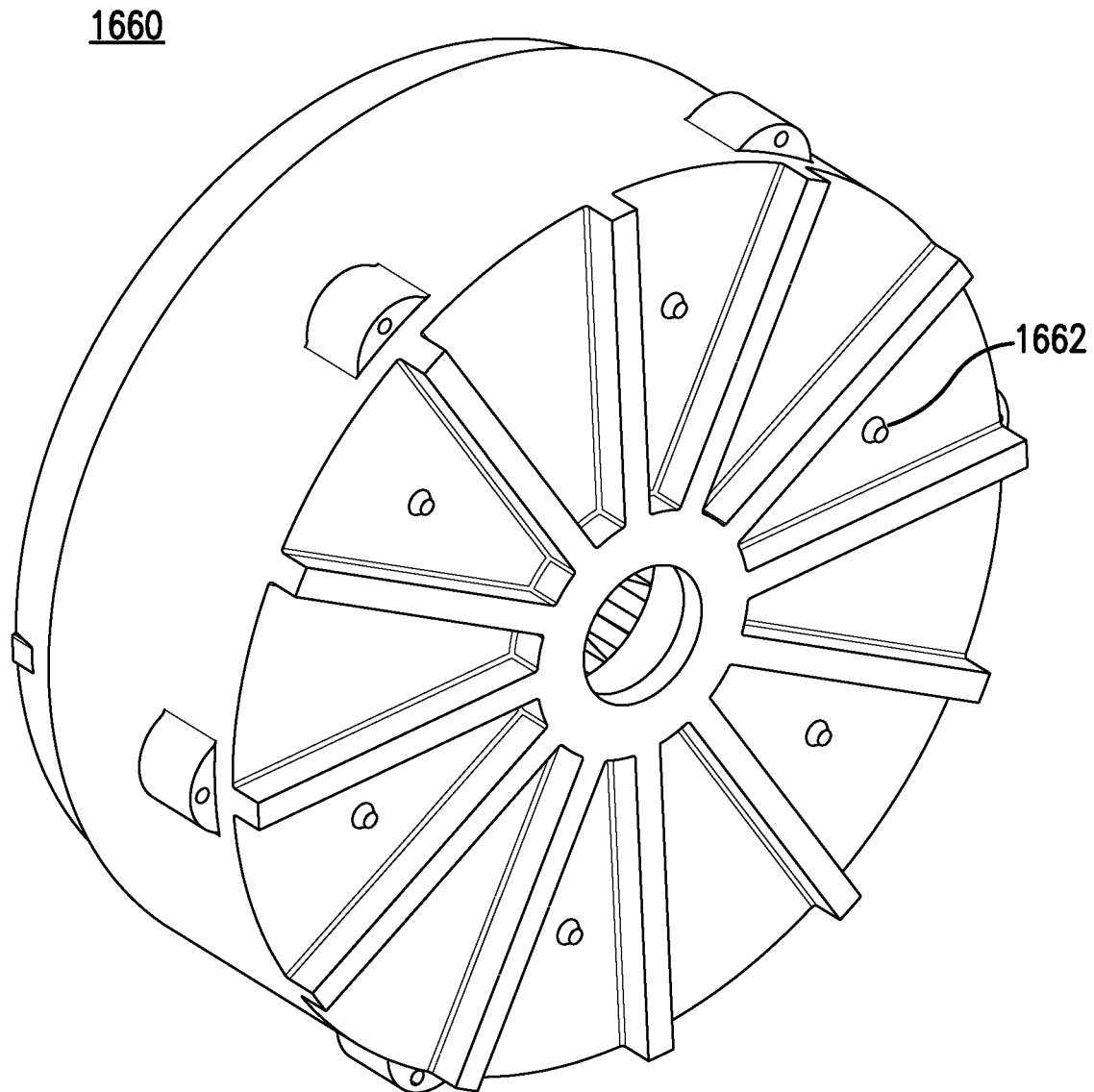

FIG. 16C shows an assembly 1640 with an endbell 1600 holding stator core 1400 in place with a bracket 1620. FIG. 16D is an exterior 1660 of assembly 1640 with fasteners from the bracket attached with nuts, such as nut 1662.

Mounting a Rotor to a Shaft

Figure 17:
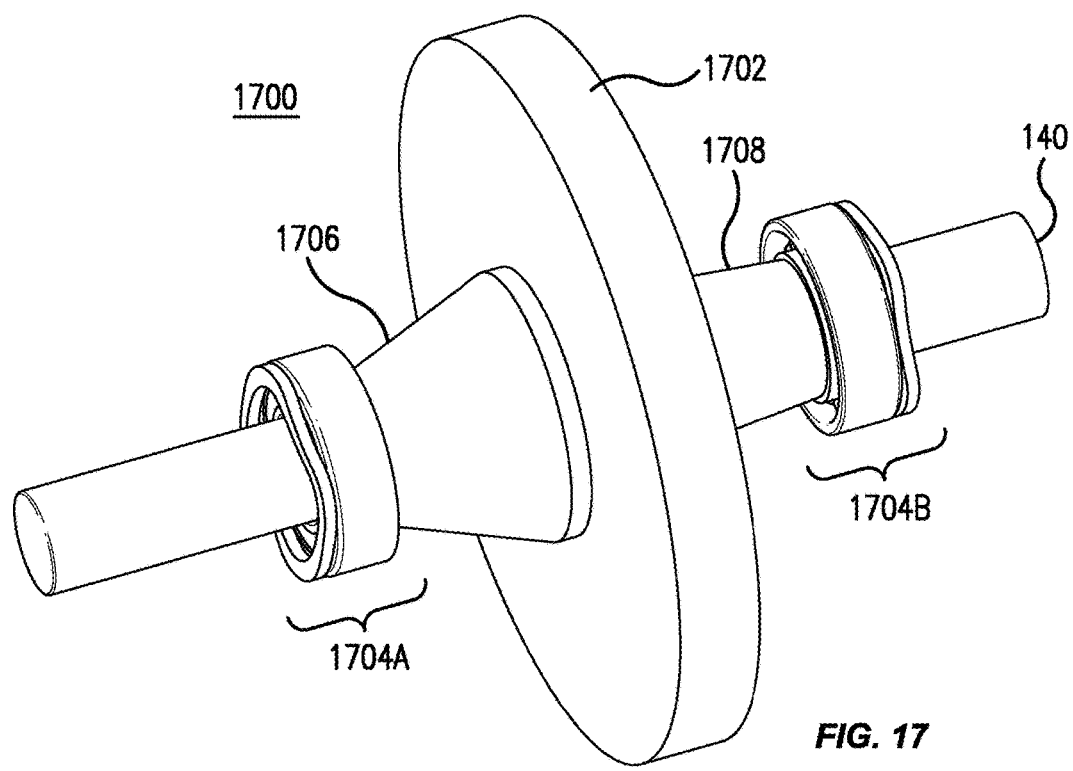
FIGS. 17 and 18A-B show how a rotor can be mounted to a shaft according some embodiments.

FIG. 17 shows a diagram 1700 illustrating how a rotor is mounted to a shaft in a rotating electrical machine. Diagram 1700 includes shaft 140 held in place with two bearing assemblies 1704A and B. Shaft 140 is affixed to a rotor 1702 that applies torque to spin shaft 140.

Shaft 140 may be a unitary structure and made of high strength, non-ferromagnetic materials. For example, shaft 140 may be made of steel or steel alloy. In some embodiments, shaft 140 has features to accommodate the mounting of additional components on shaft 140.

Figure 18A:
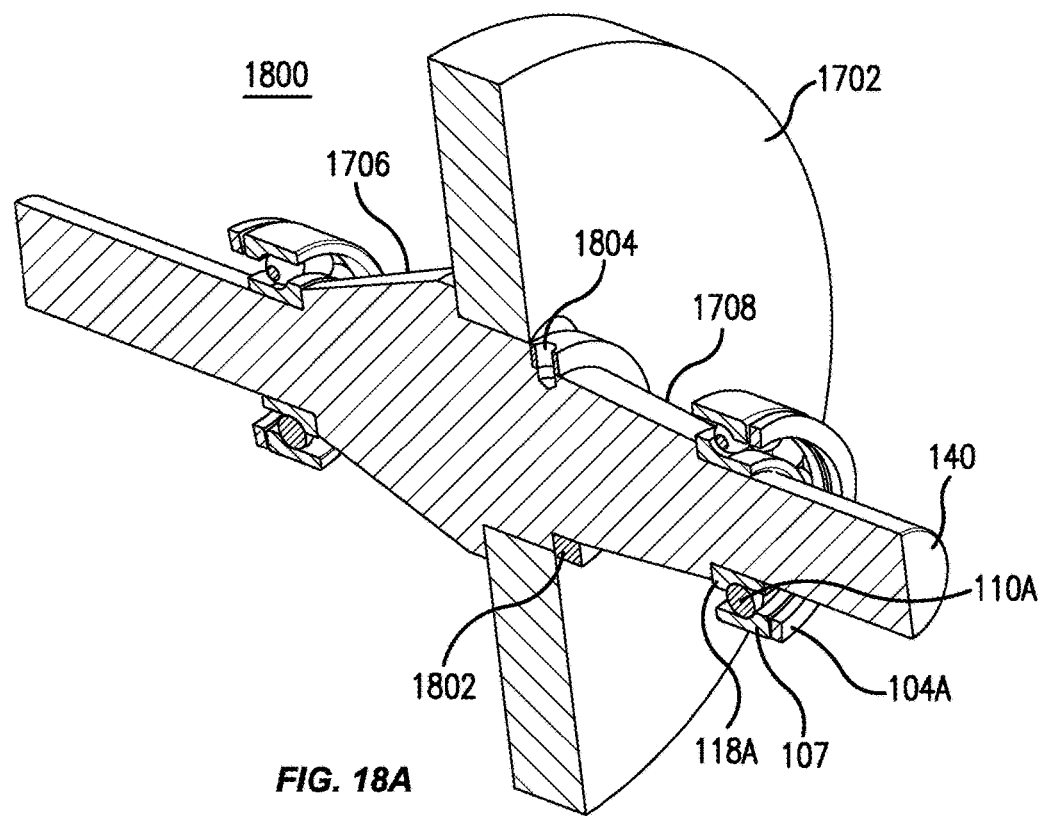

For example, as shown in FIGS. 17 and 18A, shaft 140 is shaped such that it has two conical frusta extending from the midsection that truncate at shoulders 1706 and 1708 on shaft 140. A first side of the shoulder 1706 abuts a bearing assembly 1704A. Bearing assembly 1704A is configured to permit the rotation of shaft 140 and is supported by the bearing cup/bore of endbell 1500. Another bearing assembly 1704B is located along shaft 140. The second bearing assembly 1704B is also supported by the bearing cup of endbell 1500 and also permits the rotation of shaft 140.

FIG. 18A illustrates a cross-section 1800. As shown in cross-section 1800, a locking member (lock ring) 1802 is placed up against rotor 1702 to hold rotor 1702 in place and prevent it from moving along shaft 140. Locking member 1802 may be held in place by a dowel placed in hole 1804. Shaft 140 locks into rotor 1702. Lock ring 1802 and shaft 140 have dowel holes aligned in the theta and axial directions to permit precise location of the lock ring relative to the now entrapped rotor 1702 as illustrated in FIG. 18B.

Figure 18B:
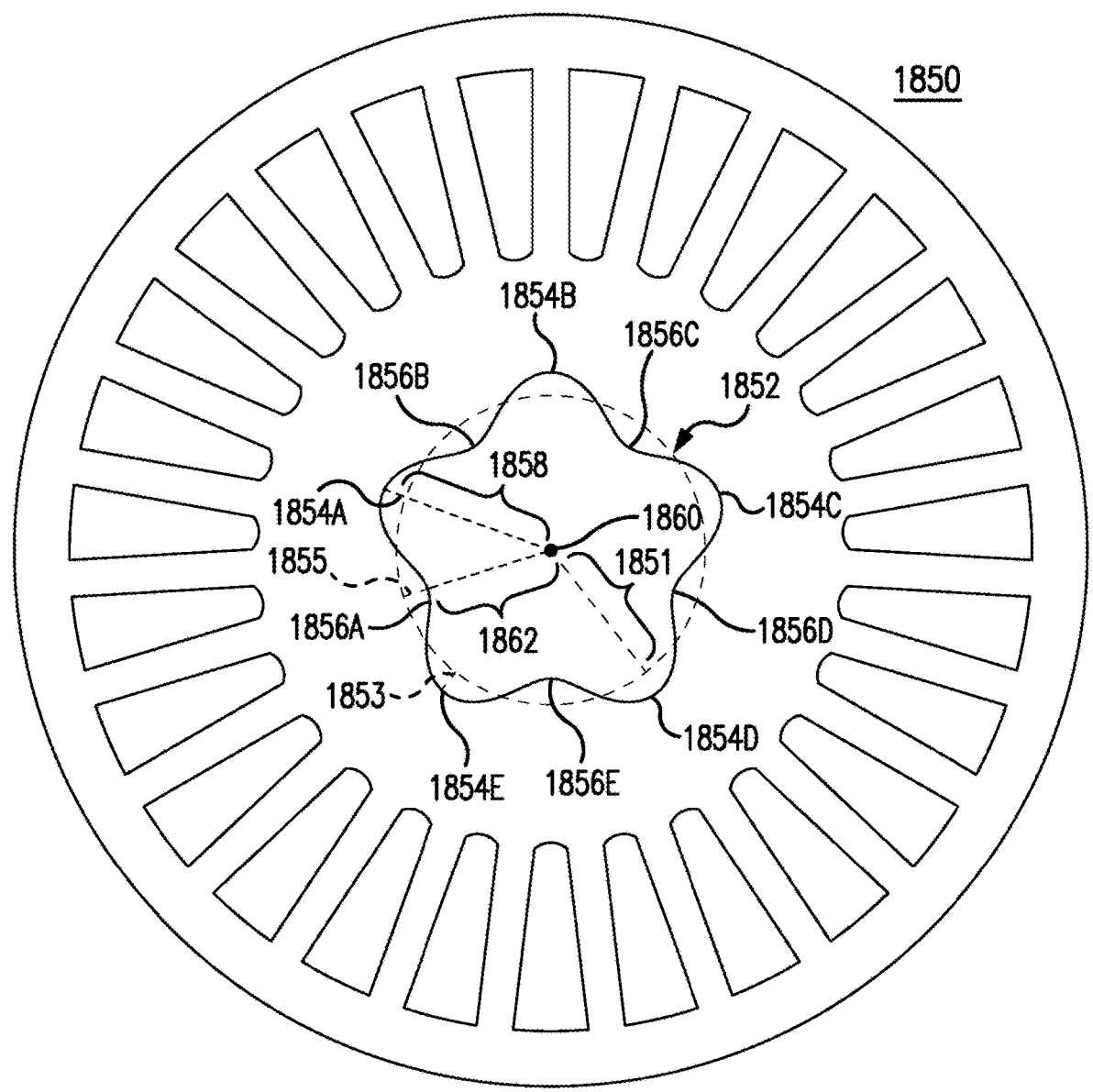

FIG. 18B illustrates a rotor 1850 with a void 1852. Void 1852 is centered along an axis of rotation 1860. Void 1852 is a curved lobed spline. The spline lobes may be sinusoidally shaped. Inner spline lobes 1854A-E mesh with counterpart outer spline lobes on the shaft to transmit torque to the shaft.

The spline lobes may be shaped substantially according to the equation:

$$r(\Theta) = r_{midline} + (r_{lobe\_size} * \sin(n*\Theta));$$

where n is the desired number of lobes, $\Theta$ is an angle around axis of rotation 1860, $r_{midline}$ is a distance 1851 from the axis of rotation 1860 to a median of the curved lobed spline, and $r_{lobe\_size}$ is an amplitude of the lobe, that is, the distance 1853 and 1855 between maximum and minimum distances to axis of rotation 1860 or the different between distances 1858 and 1862.

As mentioned above, sinusoidal splines 1854A-E are used as a means to transmit torque between the rotor and shaft. The use of a curved spline dramatically reduces stress concentration at the root of the rotor, where stresses are typically at a maximum due to centrifugal loads, and enables transmission of torque while reducing fatigue.

Various Alternatives

Figure 19:
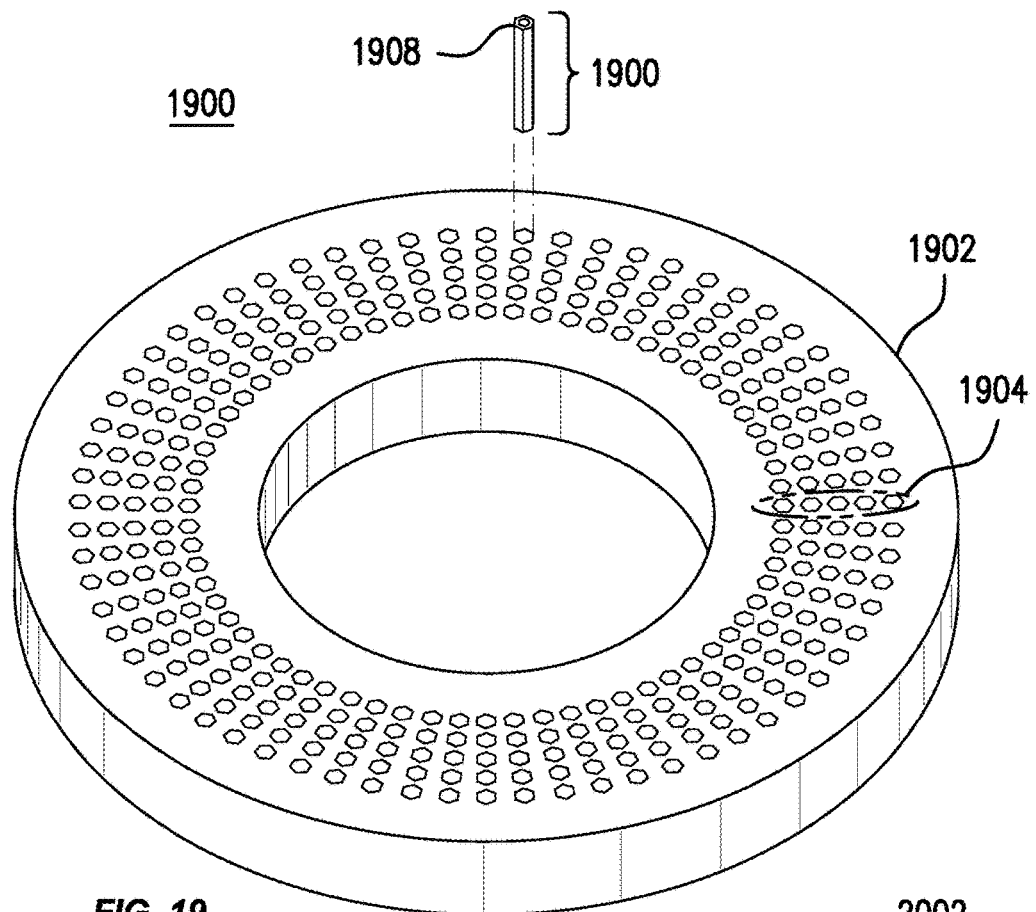
FIG. 19 shows a rotor for an axial flux machine according to some embodiments.

FIG. 19 shows a diagram 1900 illustrating another rotor assembly in an alternate embodiment. Diagram 1900 illustrates a rotor winding 1902 with a plurality of rows of cavities extending radially outward on the winding. Alternatively, the cavities could be at a skewed offset angle. In addition, the cavities may be organized in a series of concentric circles at illustrated in FIG. 19. Each row, such as row 1904, includes a plurality of cavities. In one possible configuration, the cavities may be hexagonal. As with the rotor in FIG. 6, this rotor could also include a band (not shown).

The rotor assembly in diagram 1900 may also perform well in avoiding eddy currents while producing torque in a compact design. At the same time, this rotor assembly may have an advantage of working equally well rotating in forward and reverse. This may be advantageous in motors for electric vehicle applications.

Having described various rotors for axial flux induction rotating electrical machines and how they are assembled, this disclosure now discusses how the rotors can operate in an example axial flux induction motor.

Figure 20:
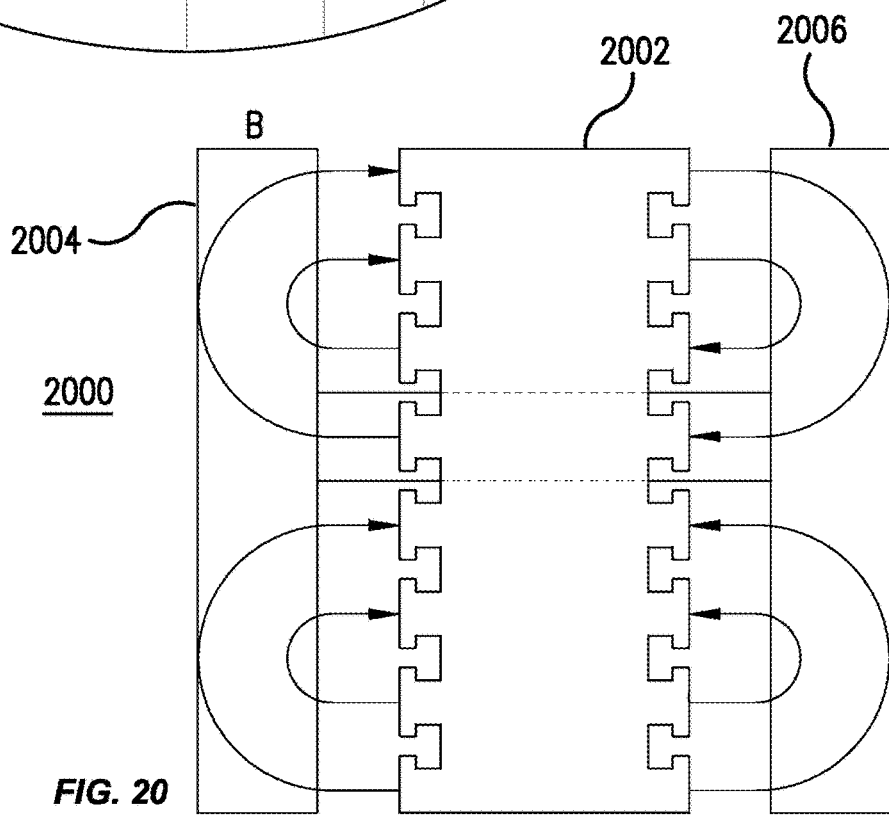
FIGS. 20-21 show an example axial flux motor according to some embodiments.
Figure 21:
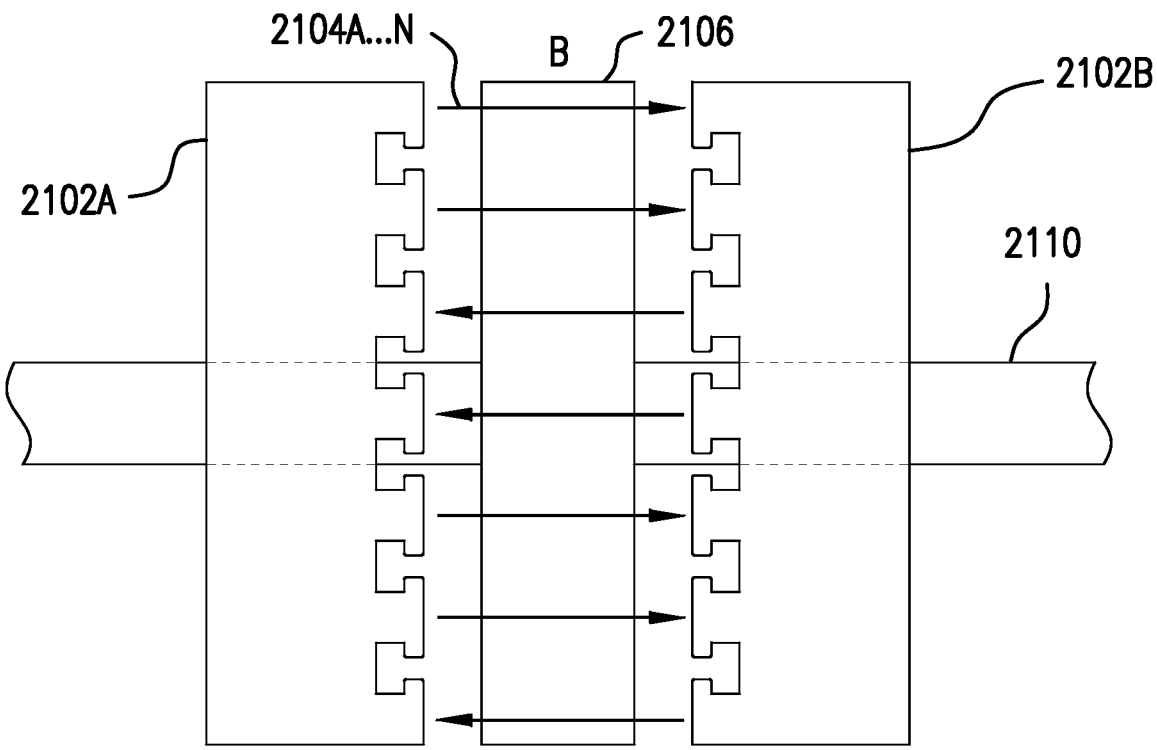

FIGS. 20-21 show axial flux motors according to some embodiments. As described above with reference to FIG. 1, an axial flux induction motor may comprise a rotor sandwiched between two stators. But the opposite, two rotors with a single sandwiched stator, is also possible as illustrated in FIG. 20.

FIG. 20 shows an axial flux induction motor 2000 with a stator 2002 sandwiched between two rotors 2004 and 2006. In other embodiments not shown, the motor may include multiple stators and multiple rotors alternating in position with one another. In still another embodiment, the motor may have a single stator and a single rotor.

FIG. 21 shows an axial flux motor 2100 according to some embodiments. Motor 2100 includes a rotor 2106 sandwiched between two stators 2102A and 2102B. Stators 2102A and 2102B pass magnetic flux, illustrated for example by flux lines 2104A . . . N, parallel to an axis of rotor 2106 which runs along shaft 2110. Thus, motor 2100 is an axial flux motor. The magnetic flux changes over time as the magnetic flux rotates around the stator. The changing magnetic flux induces currents in rotor 2106. The currents in rotor 2106 produce a magnetic flux, which interacts with the magnetic flux produced by the stator, and thus torque is produced. This process is illustrated in greater detail with respect to FIGS. 22A-D.

Operation of an Axial Flux Induction Motor

FIGS. 22A-D illustrate how an axial flux induction motor produces torque according to some embodiments.

Figure 22A:
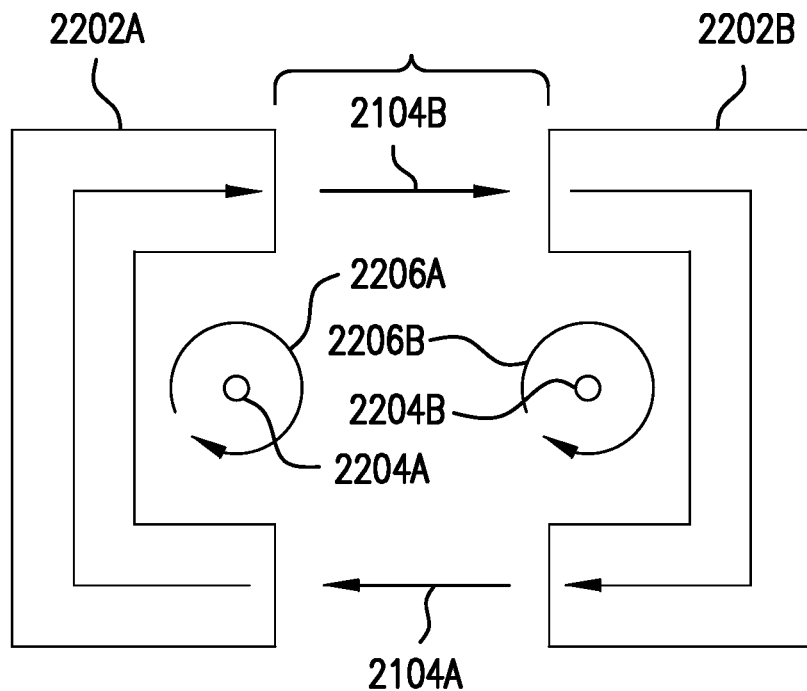
FIGS. 22A-D illustrate how an axial flux induction motor produces torque according to some embodiments.

FIG. 22A shows a diagram 2800 illustrating a winding 2204A around a tooth of stator 2202A and a winding 2204B around a tooth of stator 2202B. Windings 2204A and 2204B may be simple copper wires. A current perpendicular to and oriented INTO the plane of the drawing through winding 2204A creates (via the right-hand rule) a magnetic field 2206A, and a current perpendicular to and oriented INTO the plane of the drawing through winding 2204B creates a magnetic field 2206B. Stators 2202A and 2202B are made of a magnetically permeable material. Thus, magnetic fields 2206A and 2206B magnetize a magnetic circuit which includes magnetic flux lines 2104A and 2104B.

Figure 22B:
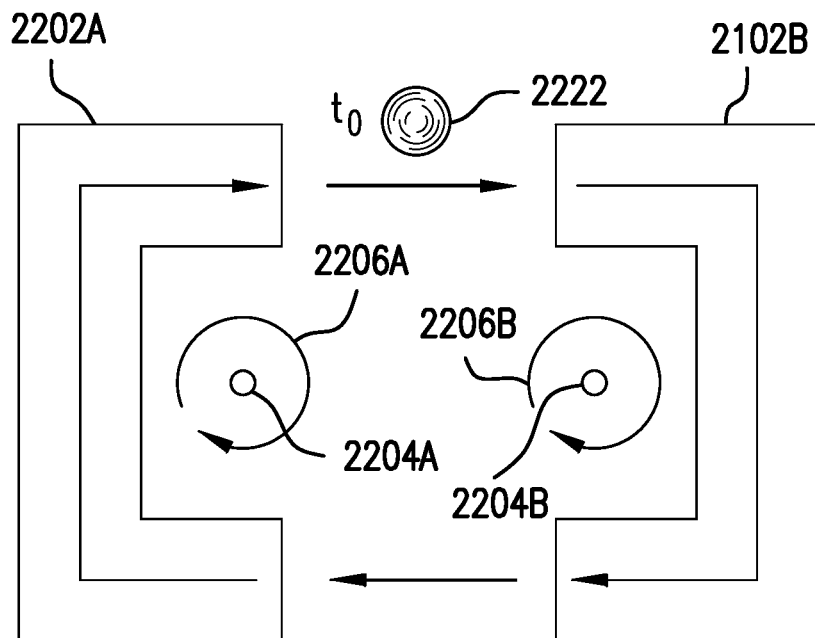

FIG. 22B shows a diagram 2220, similar to diagram 2200 in FIG. 22A. In addition to the components in diagram 2200, diagram 2220 illustrates a rotor bar 2222 at time to.

Figure 22C:
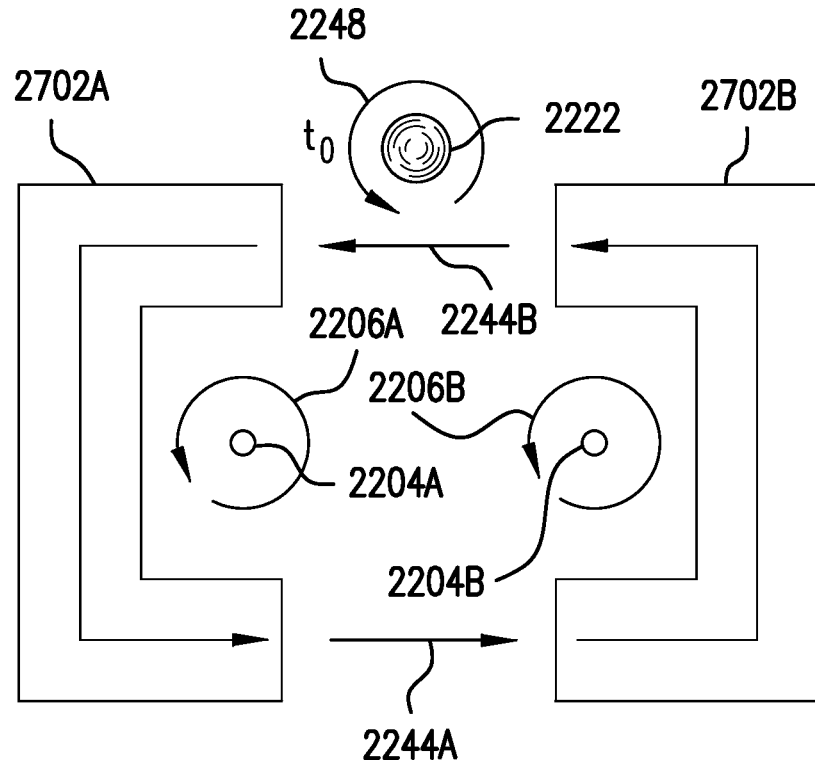

FIG. 22C shows a diagram 2240, advancing to a later time $t_1$. The current going through windings 2204A and 2204B is alternating current and is synchronized. Hence, at the later time $t_1$, current going through windings 2204A and 2204B has changed direction. Because current going through windings 2204A and 2204B has changed direction, the magnetic flux produced by the current and magnetic fields 2206A and 2206B has also changed direction since $t_0$. The changing magnetic fields 2206A and 2206B change the magnetic flux through the stators, illustrated by flux lines 2244A and 2244B. The changing flux induces a current in rotor bar 2222. The current in rotor bar 2222 creates a magnetic field 2248 which is in opposition to the magnetic flux 2244A from $t_0$ to $t_1$. This induced current in rotor bar 2222 creates a torque in accordance with the Lorentz force law.

Note that torque is produced despite the fact that rotor bar 2222 may not have moved. In this way, embodiments can create torque even in a locked rotor situation. In fact, given enough current, significant locked rotor torque can be generated, at least over time periods short enough for heat to dissipate. This provides an advantage over many traditional radial induction motors having the same volume, which do not provide as significant locked rotor torque. Radial induction machines have a lower power density. Therefore, to produce equivalent locked rotor torque, the machine would have to be much larger. Moreover, this locked rotor torque is achieved without the need for permanent magnets as is traditionally necessary to produce the starting torque illustrated in FIG. 22C with equivalent volume and mass in the machine. Avoiding permanent magnets saves cost and avoids environmental damage needed to obtain the rare earth magnets. Also, permanent magnet motors fall off in efficiency at higher RPMs, because the magnetic field produced by the permanent magnets is fixed. In contrast, the induction motors contemplated in the current embodiment are more efficient at higher RPMs, since the rotor excitation can be changed to a needed value with stator voltages, currents and rotor slip.

Induction motors offer a number of other advantages as well. For example, in general they have a more flat torque curve, and importantly, have their torque maxima at close to synchronous speed, which is a very complimentary behavior to that of a PM motor. Another benefit of induction machines is the absence of parts which could be demagnetized irreversibly by applied magnetic field with or without additional temperature. For PM machines, excessive magnetic flux produced by a stator with or without additional temperature may cause reversible or irreversible demagnetization of PMs.

Figure 22D:
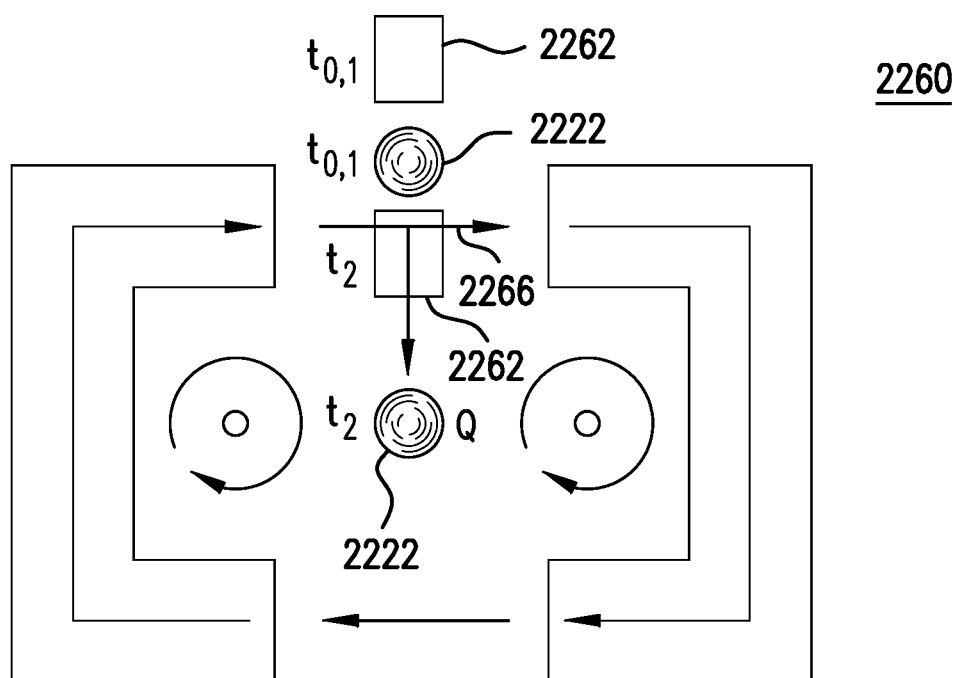

FIG. 22D is a diagram 2260 illustrating how additional torque is created once the rotor begins moving. In addition to the components in FIGS. 22A-C, diagram 2260 also illustrates a core 2262. When the rotor has a winding which is only made of electrically conductive material which has magnetic permeability close to that of air, as shown on FIG. 22C, a significant part of magnetic flux is dissipated on its way from stator 2702B to stator 2702A and vice versa. This way the rotor winding is crossed with less magnetic flux than what is produced by stators.

When ferromagnetic cores 2262 are placed into cavities of a rotor winding, magnetic flux gets a path from stator 2702A to 2702B with less magnetic resistance as equivalent air gap length is significantly shorter. This way less magnetic flux is dissipated and more magnetic flux crosses the rotor winding in perpendicular direction to the rotor winding turns which means the rotor winding gets more flux linkage (Psi), which is changed in time. Voltage induced in the rotor winding is equal to, or substantially corresponds to, $$\text{relation} \frac{dPsi}{dt}$$

which means more flux linkage and more voltage is induced in the winding per single time step. Further the more voltage is induced in the rotor winding the more current is produced in the rotor. And more current in the rotor winding produces more electromagnetic torque in motor.

FIGS. 22A-D provide a simple example demonstrating how rotors according to the embodiment described herein can generate torque in an axial induction motor. FIGS. 22A-D involve just two stator teeth, a single rotor bar, and a single core.

Figure 23A:
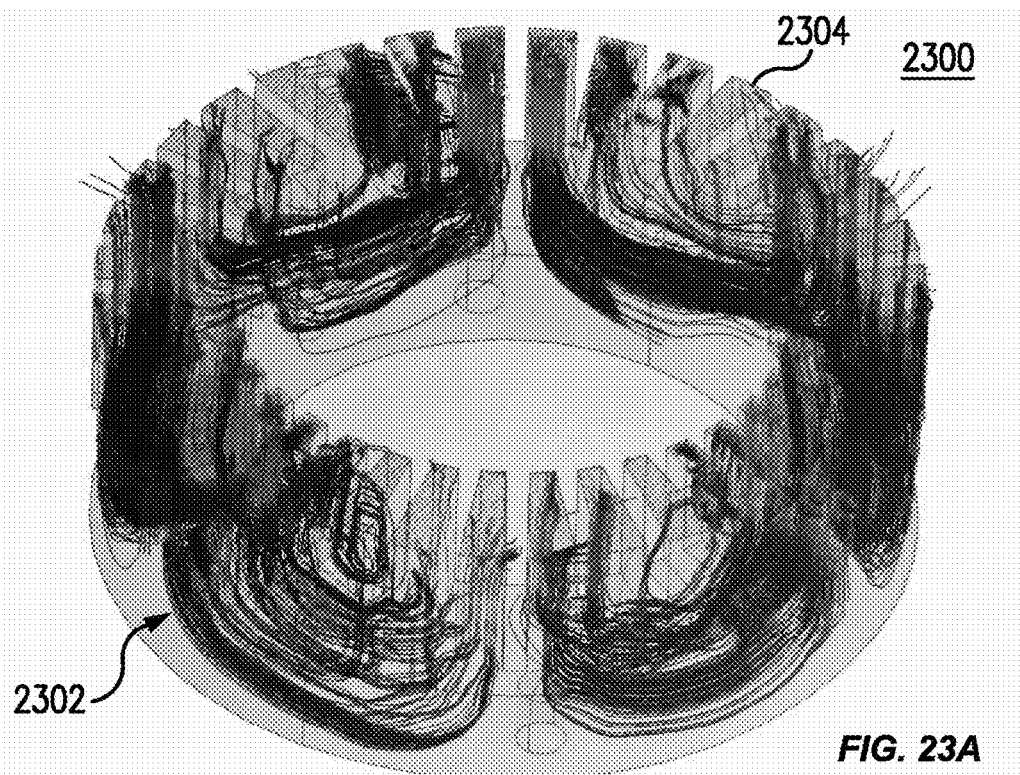
FIGS. 23A-B show a magnetic field and an electric current in a rotor for an axial flux motor according to some embodiments.
Figure 23B:
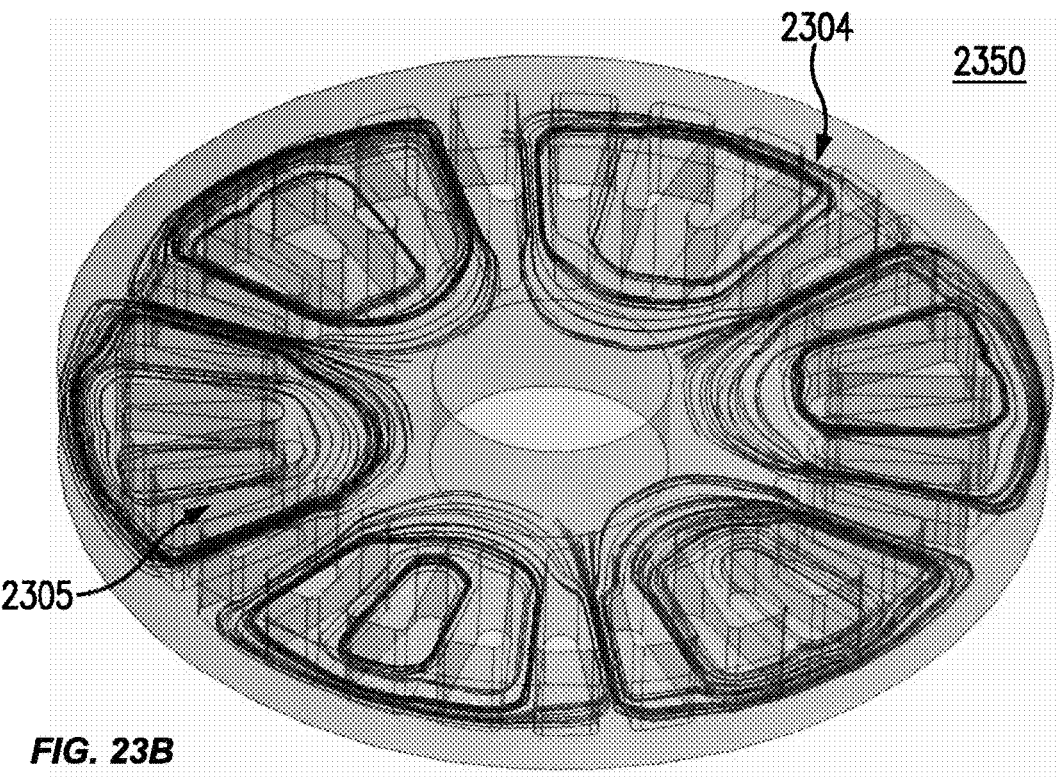

FIGS. 23A-B show a magnetic field and an electric current in a rotor for an axial flux motor according to some embodiments. FIG. 23A shows a diagram 2300 illustrating a magnetic field, and FIG. 23B shows a diagram 2350 illustrating an electric current in a rotor for an axial flux motor according to some embodiments. Diagram 2300 shows magnetic field lines 2302 in a stator 2304. The magnetic flux induces currents 2305 through rotor bars, such as rotor bar 2304, in the rotor. These induced currents produce torque in the same manner described for FIGS. 22A-D.

Cooling Axial Flux Induction Machine

FIGS. 24A-B show a cross-section of a rotating electrical machine 2400 with an impeller attached to a shaft. The impeller operates to cool machine 2400.

As described above with respect to FIG. 1, machine 2400 has stators 132A and 132B, each including a respective stator core 112A and 112B and a respective stator winding 116A and 116B. Machine 2400 also includes a rotor 134. Between each of the two stators 132A and 132B and rotor 134 is an air gap, such as air gap 2410. Rotor 134 spins, applying torque to shaft 140.

As described above with respect to, for example, the operation of an axial flux rotating electrical machine, the process of generating torque involves generating current. As described above, alternating current is applied to stator winding 116A and 116B, which generates a changing magnetic field, which induces current in rotor 134. The currents, both in stators 132A and 132B and in rotor 134, generate heat. If machine 2400 gets hot enough, components could deform and/or break.

To deal with this heat, machine 2400 includes impellers 2402A and 2402B. Each of impellers 2402A and 2402B are mounted to shaft 140. In addition to being affixed to shaft 104, each of impellers 2402A and 2402B abut and are in contact with rotor 134. As illustrated in FIG. 24A, stators 132A and 132B are each roughly circular and have an empty center where the coils are turned. Impellers 2402A and 2402B are located in the empty center portions of stators 132A and 132B.

Impellers 2402A and 2402B each have a plurality of fins, such as fin 2404. The plurality of fins may be arranged substantially equidistant along the circumference of shaft 140. Each fin is an appendage extending along the impeller in substantially the radial direction of machine 2400. As shaft 140 spins, impellers 2402A and 2402B spin as well. The plurality of fins move air through air gap 2410 and along shaft 140. Cool air moving along the surface of rotor 134 removes heat through conduction and convection. Moreover, because the components are in contact with one another and may be made of materials that are conductive of heat, heat is transmitted from rotor 134 to impellers 2402A and 2402B and their respective plurality of fins. Again, as air moves along the channels between adjacent fins, heat is transferred from the fins to the air and forced out of machine 2400.

The plurality fins may be forward facing or backward facing depending on their orientation and the direction of rotation. FIG. 24A illustrates a forward-facing fin arrangement. Shaft 140 rotates in a counterclockwise direction as illustrated at 2406. Moving inward toward the axis of rotation of machine 2400, the position where each fin, such as fin 2404, is affixed to shaft 140 shifts in the direction of rotation, in this case, counterclockwise. Moving in that direction, air is pulled first along shaft 140 then along rotor 134 as shown by lines 2408A and 2408B.

Each fin may be angled such that it angles towards the radius of machine 2400 at each end of the fin. The portion of each fin farthest from rotor 134 (and closest to shaft 140) may taper off towards shaft 140. The portion of each fin closest to rotor 134 (and farthest from shaft 140) may have an edge, such as edge 2412 substantially in the axial direction of machine 2400. The length of edge 2412 may be set according to the width of air gap 2410. In various embodiments, length of edge 2412 may be substantially equal to or slightly larger than the width of air gap 2410.

FIG. 24B illustrates a backward-facing fin arrangement. In this example, shaft 140 rotates in a clockwise direction as illustrated at 2406. Moving inward toward the axis of rotation of machine 2400, each fin shifts opposite of the direction of rotation, in this case, counterclockwise.

FIG. 25 illustrates a rotating electrical machine with a rotor that has a plurality of fins, such as fin 2550, for cooling according to some embodiments. Fin 2550 extends outward from the rotor winding into the air gap between the rotor and stator and may conduct heat away from the rotor winding. In one embodiment, the rotor may have a single fin extending out between each of its cores. The fins circulate air and increase surface area for heat to dissipate from the rotor. The fins may have a height from the rotor less than a width of the air gap.

Figure 26:
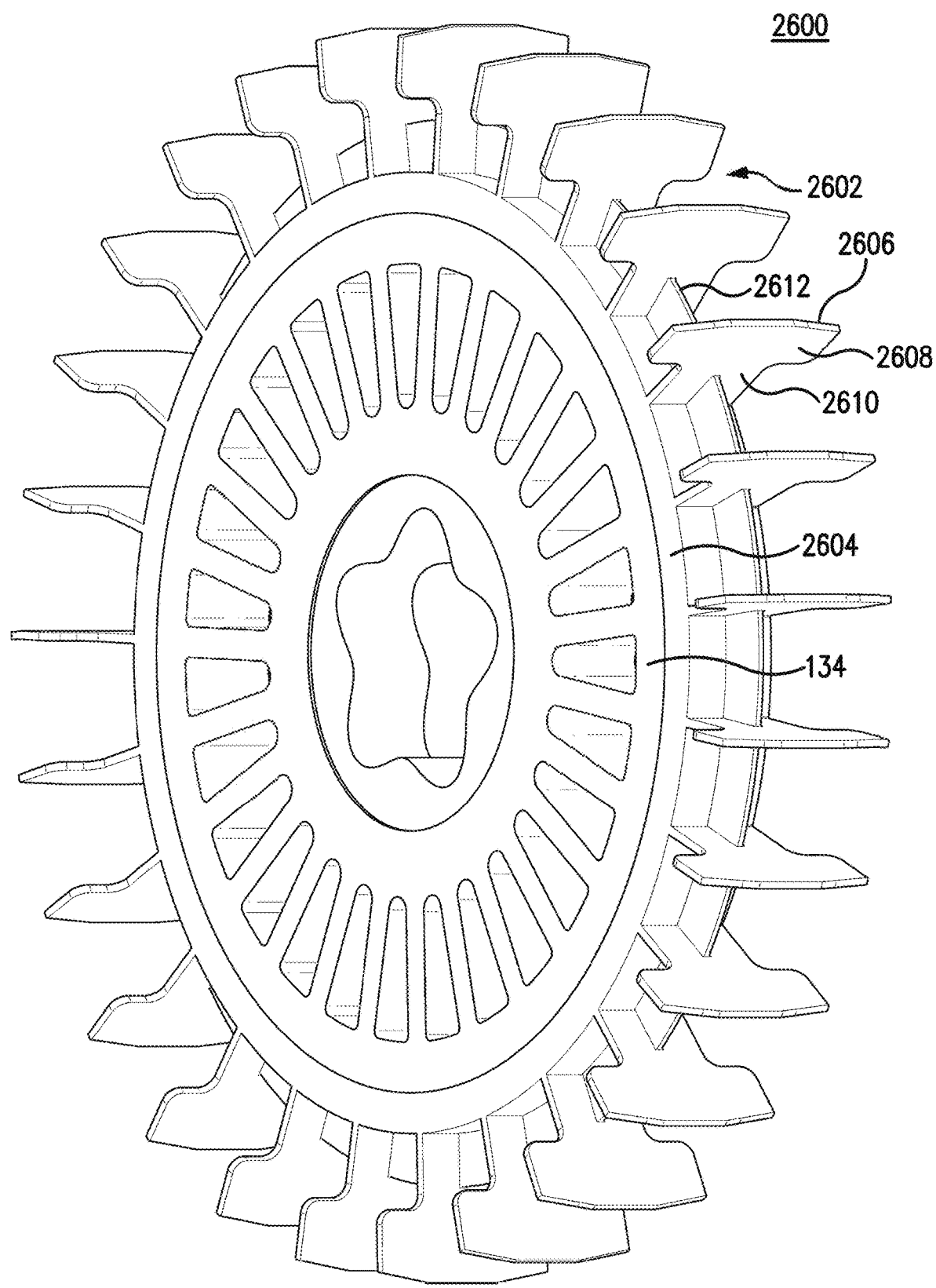
FIG. 26 illustrates a rotor with a cooling fin assembly, according to some embodiments.

In some embodiments, heat is dissipated from stators 132A, 132B and rotor 134 using a cooling fin assembly 2602. FIG. 26 shows rotor 134 with cooling fin assembly 2602. Cooling fin assembly 2602 may include a central portion 2604 configured to attached to rotor 134. Central portion 2604 may attach to the outer surface of rotor 134 using an interference fit to form a fin-cool stator assembly 2600. A plurality of fins 2606 extend radially from central portion 2604.

Fins 2606 may be evenly spaced around central portion 2604. Fins 2606 may be formed in a variety of shapes and sizes. For example, as shown in FIG. 26, fins 2606 are substantially planar. They widen as they extend in the radial direction from the machine, forming a wider upper fin portion 2608 and a narrower lower fin portion 2610. In some embodiments, other features of machine 2400 may dictate the shape of fins 2606. For example, fin 2606 may have narrow lower fin portion 2610 to increase space around rotor 134 for additional components. For example, wider upper fin portion 2608 may enclose stator coils and their connection bars.

In some embodiments, fins 2606 may be angled. Fins 2606 may be angled such that fins 2606 do not extend tangentially from central portion 2604 (i.e. are angled either into or away from the direction of rotation of the rotor 134). In addition fins 2606 may be angled such that fins 2606 do not extend parallel to the central axis of machine 2400. A fin connector 2612 may extend between fins 2606. Fin connector 2612 is an abutment from a ring in compression with the rotor and may provide additional structural support.

In some embodiments, cooling fin assembly 2602 is formed as a unitary structure, that is, as a single piece. For example, components of cooling fin assembly 2602 may be machined, molded, die cast, or 3D printed Components of cooling fin assembly 2602 may be formed from a variety of materials including aluminum, aluminum alloys, titanium and others. In some embodiments, cooling fin assembly 2602 is formed from materials having a high thermal conductivity so heat can effectively be removed from the inner components of machine 2400. For example, cooling fin assembly 2602 may be formed of materials having a thermal conductivity between 100 and 1,000 $Wm^{-1}K^{-1}$. In some embodiments, the material forming cooling fin assembly may be doped to further increase thermal conductivity. This may increase thermal conductivity beyond 1,000 $Wm^{-1}K^{-1}$.

Fins 2606 increase the surface area of machine 2400 to increase the rate of convection heat transfer. In addition, since fins 2606 are attached to rotor 134, fins 2606 increase conduction heat transfer away from rotor 134. As explained above, fins 2606 may be formed with a material having high thermal conductivity to increase the rate of conduction between rotor 134 and fins 2606, and the rate of convection between fins 2606 and the environment. In operation, fins 2606 rotate with rotor 134. The rotation of fins 2606 drives air through machine 2400. This increases the airflow through machine 2400 and contributes to cooling by bringing cooler air in contact with components of machine 2400, including fins 2606.

In some embodiments, the rotation of fins 2606 may increase the airflow through machine 2400 by at least 0.12 grams/second mass airflow. In some embodiments, fins 2606 may increase the airflow through machine 2400 by more. The addition of fins 2606 may keep the temperature of machine 2400, including the rotor, under 170 degrees Celsius.

Cooling fin assembly 2602 may be used in conjunction with other cooling mechanisms. For example, cooling fin assembly 2602 may be used in conjunction with impellers 2402A and 2402B. Using impellers 2402A and 2402B with cooling fin assembly 2602 may increase the rate of airflow through machine 2400 to further increase cooling.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents. Identifiers, such as (a), (b) and (i), (ii) are for ease of identification and are not meant to imply an order.

What is claimed is:

1. An axial flux induction rotating electrical machine, the machine comprising:
   a stator that comprises a plurality of stator coils connected by at least one connection bar;
   a rotor separated from the stator by an air gap, and configured to transmit or receive electromagnetic flux to or from the stator; and
   a cooling fin assembly attached, using an interference fit, to a circumference of the rotor to circulate air through an endbell affixed to the stator and dissipate heat from the machine when the rotor rotates, the cooling fin assembly comprising a plurality of fins, each fin extending in a radial direction of the rotating electrical machine and widening as the fin extends in the radial direction to at least partially enclose the plurality of stator coils and the at least one connection bar.

2. The axial flux induction rotating electrical machine of claim 1, wherein each of the plurality of fins are substantially planar.

3. The axial flux induction rotating electrical machine of claim 1, wherein each of the plurality of fins is substantially a T shape.

4. The axial flux induction rotating electrical machine of claim 1, wherein the plurality of fins are connected by an abutment from the circumference.

5. The axial flux induction rotating electrical machine of claim 1, wherein the cooling fin assembly is formed as a single piece using a molding process.

6. The axial flux induction rotating electrical machine of claim 1, wherein the cooling fin assembly is formed from metal using a die casting process.

7. The axial flux induction rotating electrical machine of claim 1, wherein the cooling fin assembly is formed from metal using a 3D printing.

8. The axial flux induction rotating electrical machine of claim 1, wherein the cooling fin assembly is substantially aluminum.

9. The axial flux induction rotating electrical machine of claim 1, wherein the cooling fin assembly is substantially titanium.

10. The axial flux induction rotating electrical machine of claim 1, wherein the cooling fin assembly is configured to produce at least 0.12 grams/sec mass airflow within a rated cadence of the rotating electrical machine.

11. The axial flux induction rotating electrical machine of claim 1, wherein the cooling fin assembly is configured to keep a temperature of the rotor less than 170 degrees within a rated cadence of the rotating electrical machine.

12. The axial flux induction rotating electrical machine of claim 1, further comprising,
    at least one bearing assembly affixed to the endbell;
    a shaft supported by the at least one bearing assembly and affixed to the rotor such that the shaft is configured to rotate with the rotor.

13. A cooling fin apparatus for an axial flux induction rotating electrical machine, the apparatus comprising:
    a band configured to surround and to fit, using an interference fit, a circumference of a rotor of the induction rotating electrical machine; and
    a plurality of fins affixed to the band and each extending in a radial direction of the rotating electrical machine such that the plurality of fins are configured to circulate air through an endbell affixed to a stator to dissipate heat from the machine when the rotor rotates, widening as the fin extends in the radial direction to at least partially enclose a plurality of stator coils of the stator of the machine.

14. The cooling fin apparatus of claim 13, wherein each of the plurality of fins are substantially planar.

15. The cooling fin apparatus of claim 13, wherein each of the plurality of fins is substantially a T shape.

16. The cooling fin apparatus of claim 13, wherein the plurality of fins are formed as a single piece using a molding process.

* * * * *

UNITED STATES PATENT AND TRADEMARK OFFICE
CERTIFICATE OF CORRECTION

| | | |
|---|---|---|
| PATENT NO. | : 11,081,934 B2 | Page 1 of 1 |
| APPLICATION NO. | : 17/034538 | |
| DATED | : August 3, 2021 | |
| INVENTOR(S) | : Paritee et al. | |

It is certified that error appears in the above-identified patent and that said Letters Patent is hereby corrected as shown below:

In the Specification

In Column 8, Line 45, delete "PEEK)," and insert -- (PEEK), --, therefor.

In Column 19, Line 42, delete "Nome" and insert -- Nomex --, therefor.

In the Claims

In Column 30, Claim 12, Line 17, delete "comprising," and insert -- comprising: --, therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*